(12) United States Patent
Shiota

(10) Patent No.: US 9,874,799 B2
(45) Date of Patent: Jan. 23, 2018

(54) OPTICAL DEVICE, MANUFACTURING METHOD OF OPTICAL DEVICE, AND DISPLAY DEVICE, ELECTRONIC DEVICE AND ILLUMINATING DEVICE INCLUDING OPTICAL DEVICE

(71) Applicant: NLT TECHNOLOGIES, LTD., Kawasaki, Kanagawa (JP)

(72) Inventor: Kunihiro Shiota, Kanagawa (JP)

(73) Assignee: NLT TECHNOLOGIES, LTD., Kawasaki, Kanagawa (JP)

( * ) Notice: Subject to any disclaimer, the term of this patent is extended or adjusted under 35 U.S.C. 154(b) by 0 days.

(21) Appl. No.: 15/119,292

(22) PCT Filed: Dec. 3, 2014

(86) PCT No.: PCT/JP2014/082041
§ 371 (c)(1),
(2) Date: Aug. 16, 2016

(87) PCT Pub. No.: WO2015/122083
PCT Pub. Date: Aug. 20, 2015

(65) Prior Publication Data
US 2017/0010516 A1    Jan. 12, 2017

(30) Foreign Application Priority Data
Feb. 17, 2014   (JP) .................................. 2014-027430

(51) Int. Cl.
*G02B 26/00* (2006.01)
*G09G 3/34* (2006.01)
(Continued)

(52) U.S. Cl.
CPC .......... *G02F 1/167* (2013.01); *G02F 1/13439* (2013.01); *G02F 1/133512* (2013.01); *G02F 1/133602* (2013.01); *G02B 2207/123* (2013.01)

(58) Field of Classification Search
CPC ............. G02F 1/167; G02F 2001/1672; G02F 2001/1676; G02F 2001/1678; G09G 3/344; G09G 3/3446
(Continued)

(56) References Cited

U.S. PATENT DOCUMENTS

| 7,751,667 | B2 | 7/2010 | Daniel et al. |
| 2006/0087490 | A1* | 4/2006 | Ding .................. G02F 1/133377 345/107 |
| 2007/0139765 | A1 | 6/2007 | Daniel et al. |

FOREIGN PATENT DOCUMENTS

| JP | 2002-122891 A | 4/2002 |
| JP | 2009-98480 A | 5/2009 |
| WO | 2006/134554 A2 | 12/2006 |

OTHER PUBLICATIONS

International Search Report of PCT/JP2014/082041, dated Mar. 3, 2015. [PCT/ISA/210].

* cited by examiner

*Primary Examiner* — William Choi
(74) *Attorney, Agent, or Firm* — Sughrue Mion, PLLC

(57) ABSTRACT

An optical device including first and second transparent substrates disposed so that the principal surfaces thereof face each other; conductive light shielding patterns disposed on the principal surface side of the first transparent substrate; a transparent conductive film disposed on the principal surface of the second transparent substrate; a plurality of light transmissive regions disposed on the first transparent substrate; and an electrophoretic element disposed in gaps between each adjacent light transmissive regions is configured such that the dispersion state of electrophoretic particles 61 is changed by externally applied electric fields, thereby changing the range of outgoing directions of transmitted light. Thus, it is possible to relieve a decrease in the
(Continued)

amount of charging of an electrophoretic element caused by the ingress of incident light and to ensure operation stability.

20 Claims, 42 Drawing Sheets

(51) Int. Cl.
  *G02F 1/167* (2006.01)
  *G02F 1/1335* (2006.01)
  *G02F 1/1343* (2006.01)
(58) Field of Classification Search
  USPC ............ 359/296; 345/107; 430/32; 204/600
  See application file for complete search history.

FIG. 4
FIG. 4A
(a)
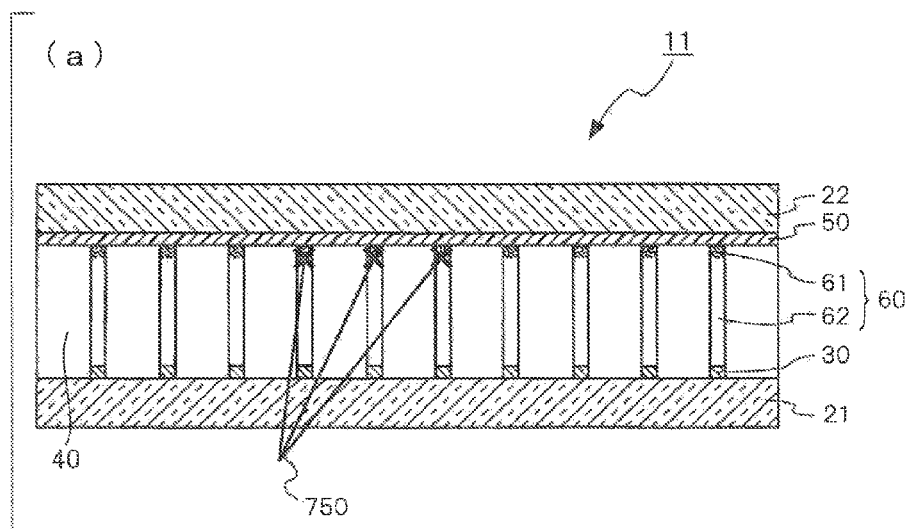
FIG. 4B
(b)
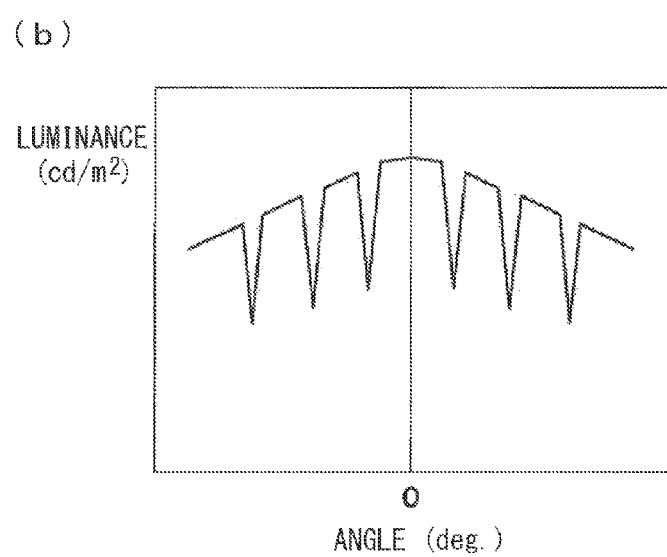

FIG. 5
FIG. 5A
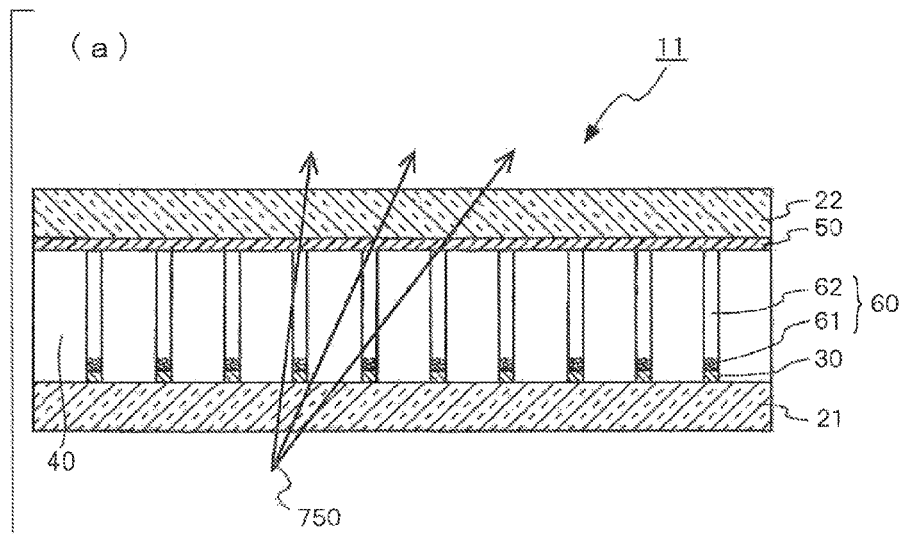
(a)
FIG. 5B
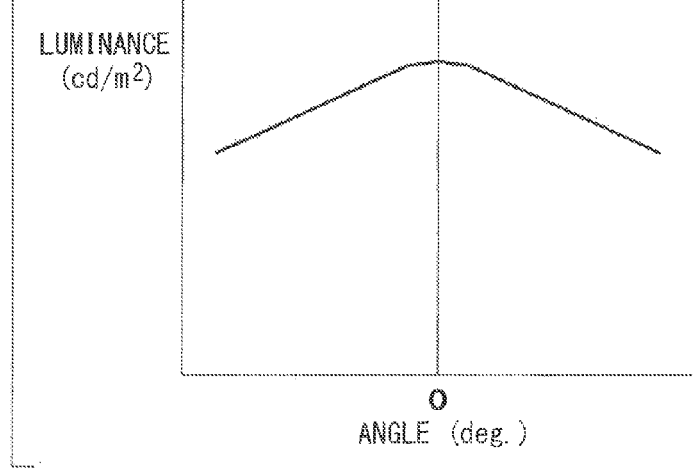
(b)

FIG. 15
FIG. 15A (a)
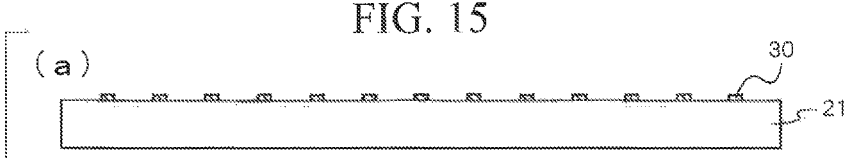
FIG. 15B (b)
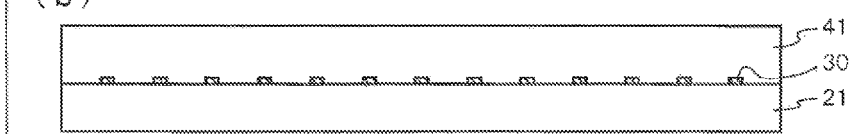
FIG. 15C (c)
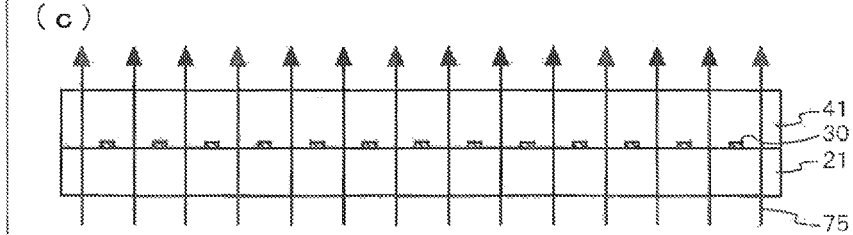
FIG. 15D (d)
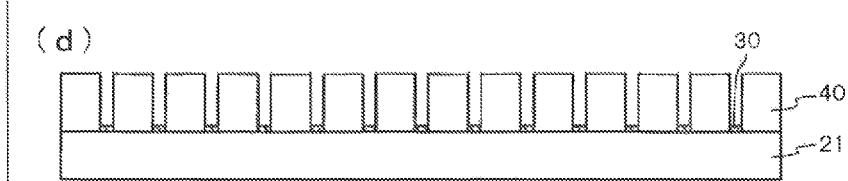
FIG. 15E (e)
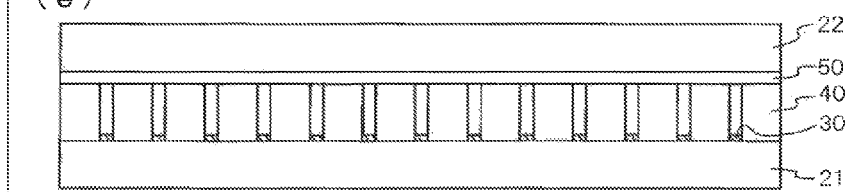
FIG. 15F (f)
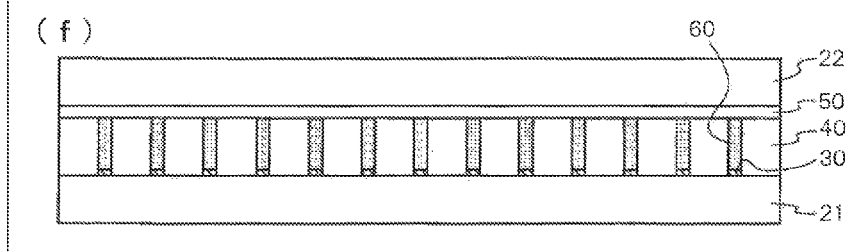

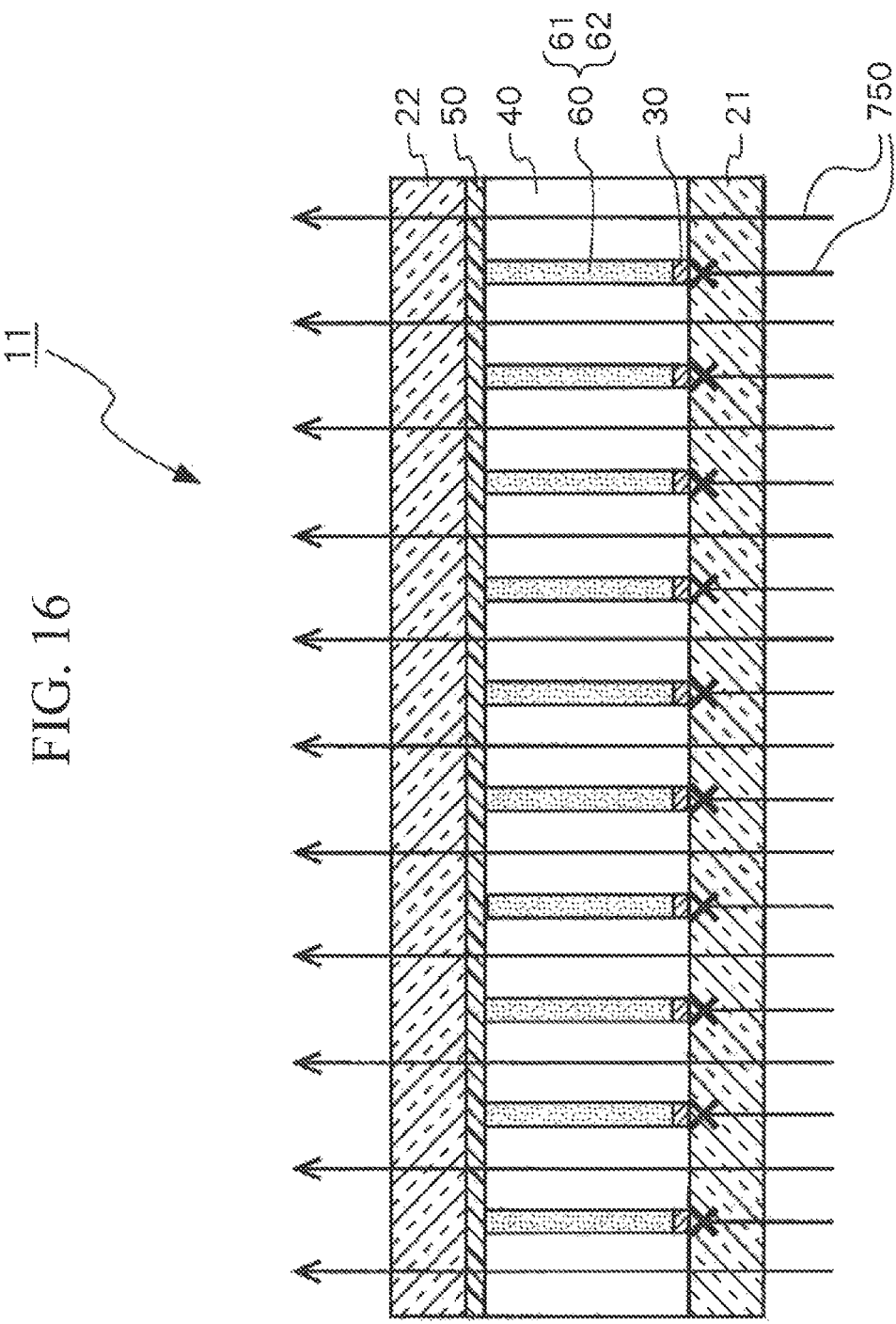

FIG. 33
(a) FIG. 33A
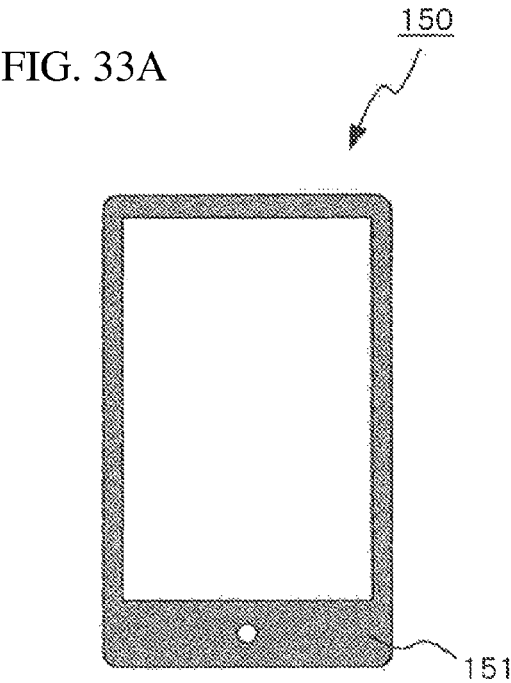
(b) FIG. 33B
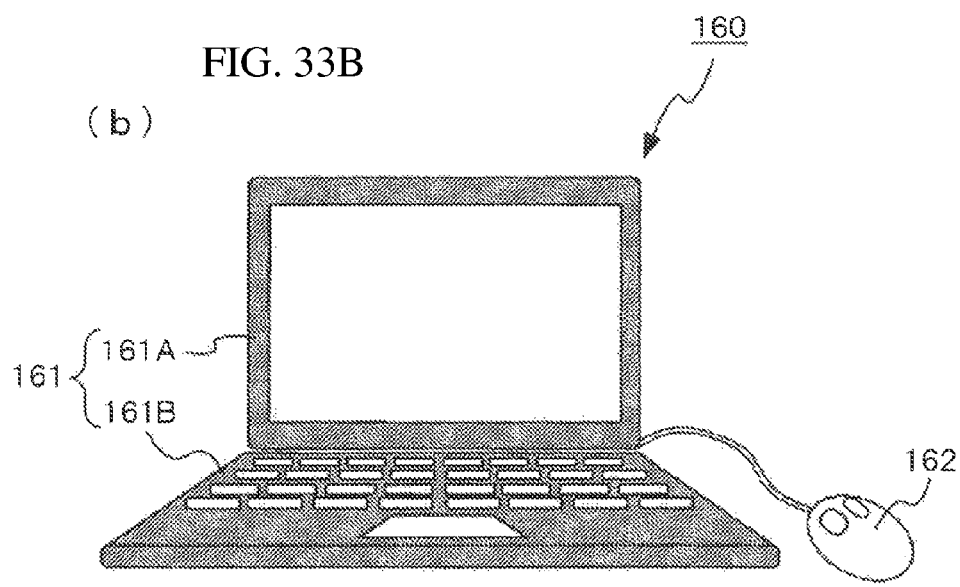

FIG. 35
(a) FIG. 35A
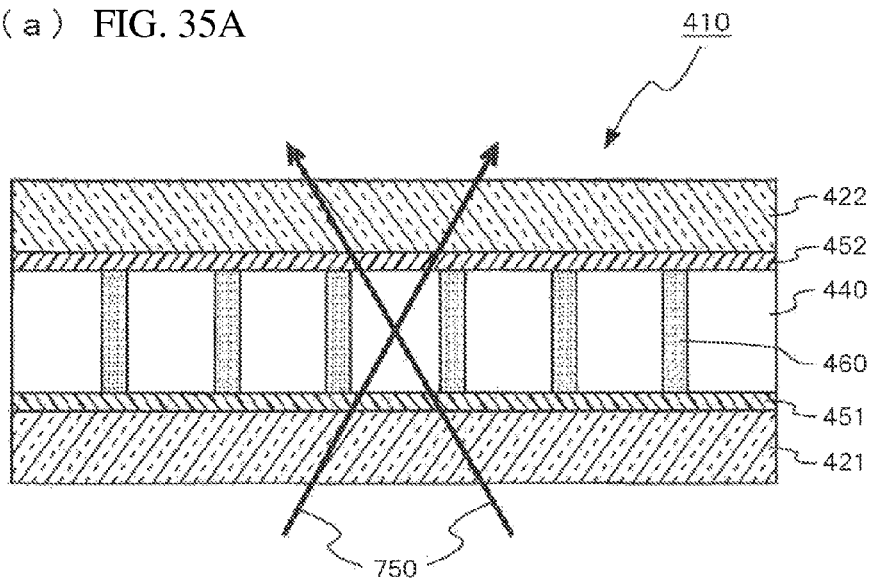
(b) FIG. 35B
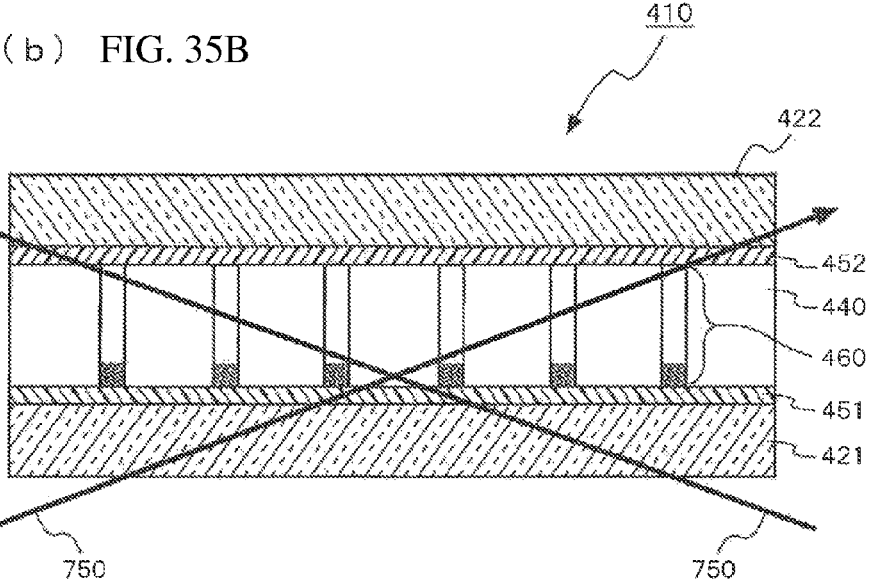

FIG. 39
(a) FIG. 39A
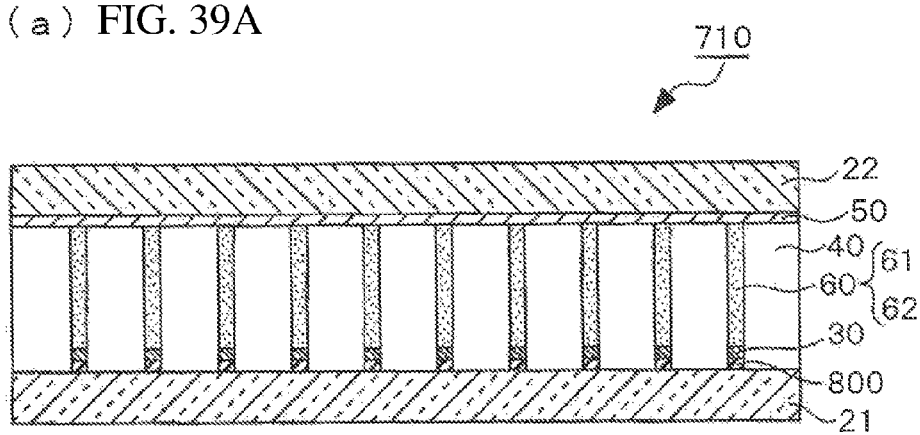
(b) FIG. 39B
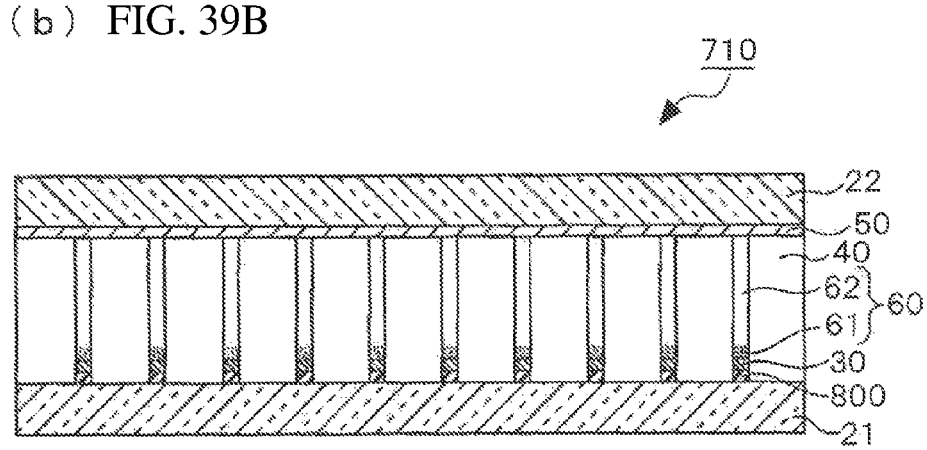

FIG. 40
(a) FIG. 40A
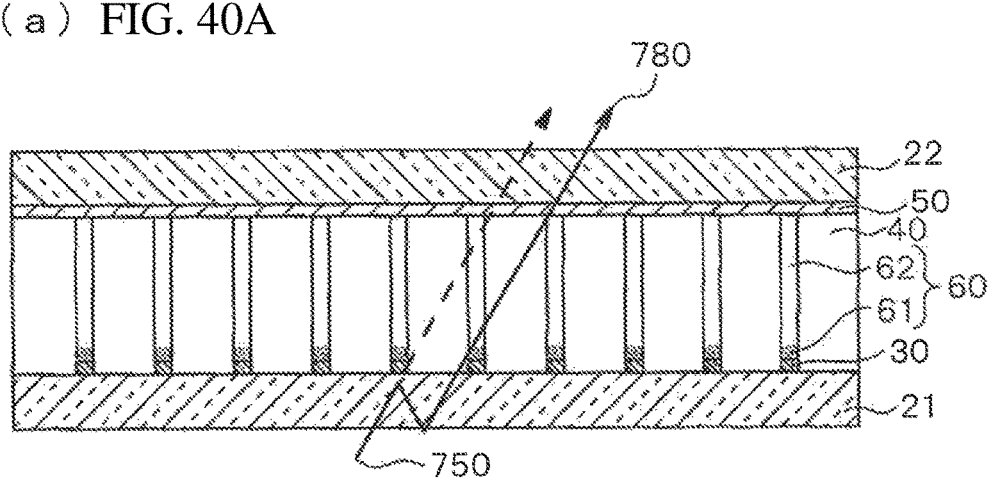
(b) FIG. 40B
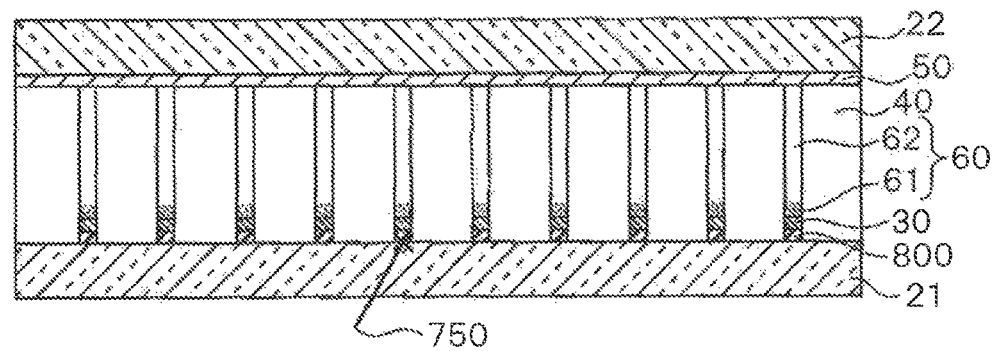

FIG. 41
(a) FIG. 41A
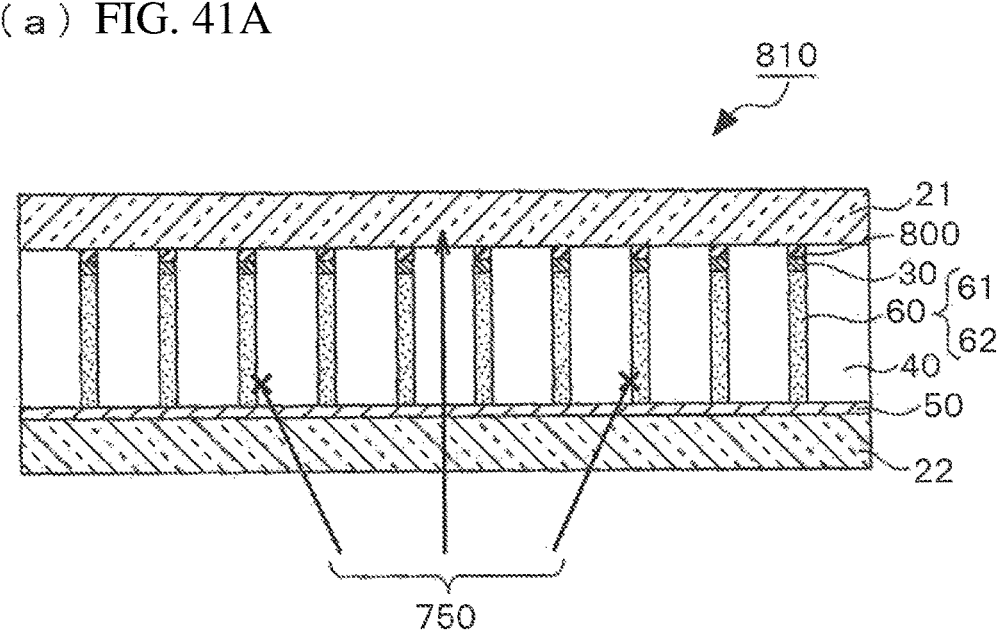
(b) FIG. 41B
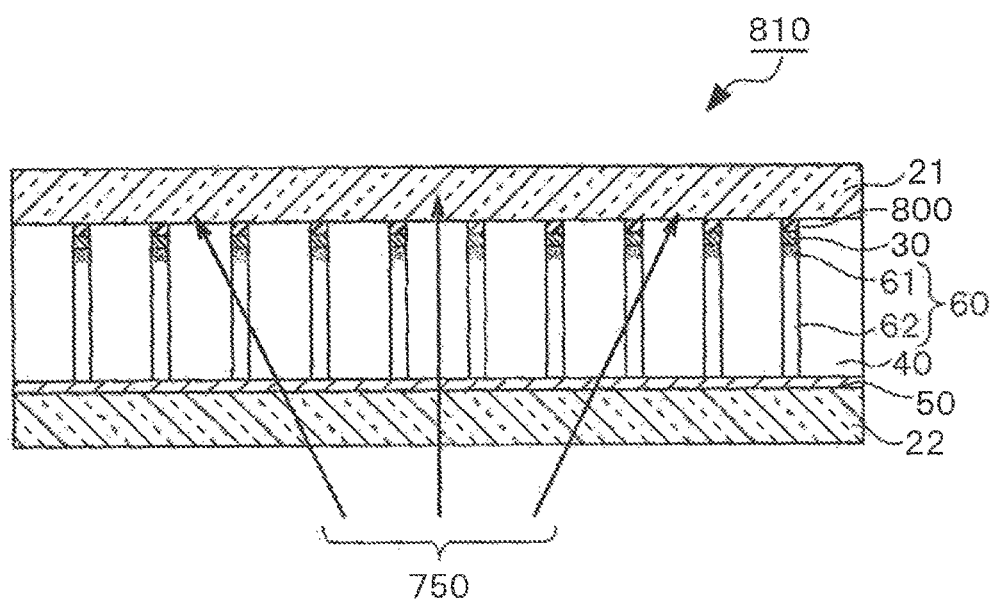

OPTICAL DEVICE, MANUFACTURING METHOD OF OPTICAL DEVICE, AND DISPLAY DEVICE, ELECTRONIC DEVICE AND ILLUMINATING DEVICE INCLUDING OPTICAL DEVICE

CROSS REFERENCE TO RELATED APPLICATIONS

This application is a National Stage of International Application No. PCT/JP2014/082041 filed Dec. 3, 2014, claiming priority based on Japanese Patent Application No. 2014-027430, filed Feb. 17, 2014, the contents of all of which are incorporated herein by reference in their entirety.

TECHNICAL FIELD

The present invention relates to an optical device for variably controlling the emission direction range of transmitted light, a manufacturing method of the optical device, and a display device, an electronic device and an illuminating device including the optical device.

BACKGROUND ART

Liquid crystal display devices are used as display devices in various information-processing devices, including mobile phones, PDAs (Personal Digital Assistants), ATMs (Automatic Teller Machines) and personal computers. In recent years, liquid crystal display devices wide in visible range have been put into practical use.

As such a liquid crystal display device, there has been commonly known a device equipped inside with an optical device for adjusting the outgoing direction of light input from the back side of the device, and including a backlight for uniformly emitting light toward this optical device and a liquid crystal display for displaying images.

Various light distribution characteristics have been required of the liquid crystal display device as the device is increased in display size and made multipurpose.

From the viewpoint of information leakage in particular, there are requirements of, for example, restricting a visible range so as not to be peered into by others and preventing light from being emitted in unwanted directions. As an optical device configured to meet these requirements, an optical film capable of restricting the visible range (or the range of emission) of a display has been proposed and put into practical use.

In a liquid crystal display device that employs the above-mentioned optical film, however, the optical film has to be detached each time the display is simultaneously viewed from a plurality of directions. This imposes cumbersome procedures on users and incurs time loss. There is therefore a growing demand for realizing the states of the display device being in a wide-visible range and a narrow-visible range at any point of time, without having to take the time to detach the optical film.

Accordingly, an optical device capable of switching the visible range of the display between a wide-field mode and a narrow-field mode has been proposed in response to such requirements.

Examples of such an optical device, as illustrated in the cross-sectional view of FIG. 35, include an optical device 410 configured such that a transparent photopolymer layer is exposed and developed using two oppositely-disposed transparent substrates 421 and 422 and heat-hardened to form light transmissive regions 440 with gaps between them, and each electrophoretic element 460 is disposed in gaps between these light transmissive regions 440. Here, transparent conductive films 451 and 452 are formed between the transparent substrate 421 and the light transmissive regions 440 and between the transparent substrate 422 and the light transmissive regions 440, respectively.

The optical device 410 in which each electrophoretic element 460 is disposed in gaps between high-aspect ratio light transmissive regions 440 planarly and independently laid out on the transparent substrate 421 as described above is configured such that the dispersion state of the electrophoretic elements 460 is controlled by externally applying electric fields through the transparent conductive films 451 and 452, thereby optionally realizing two states, i.e., a narrow-field mode and a wide-field mode, according to the emission state of light (incident light) 750.

That is, the externally-applied electric fields are adjusted to optionally switch between the narrow-field mode illustrated in FIG. 35A and the wide-field mode illustrated in FIG. 35B, thereby realizing the two emission states of light 750.

Such a technology as described in, for example, Patent Document 1 or Patent Document 2 is known as a technology of applying electrophoretic elements.

The optical device 510 disclosed in Patent Document 1, as shown in the cross-sectional view illustrated in FIG. 36, includes a transparent substrate 521, a transparent conductive film 551 formed on a surface of the transparent substrate 521, a plurality of light transmissive regions 540 formed on an upper surface 551a of this transparent conductive film 551 at a distance from one another, and electrophoretic elements 560 disposed among these light transmissive regions 540, and another transparent substrate 522 provided with another transparent conductive film 552 on the light transmissive region 540-side surface of the transparent substrate 522 is disposed on the upper surface 540a side of the light transmissive regions 540.

The electrophoretic display device 610, as shown in the cross-sectional view illustrated in FIG. 37, disclosed in Patent Document 2 includes concave portions 620A formed in a base material 620, an aluminum electrode 650 provided on the bottom surface of each concave portion 620A, an electrophoretic element 660 disposed in each concave portion 620A, a transparent electrode 651 provided on the upper surface of the base material 620, an adhesive agent 690 provided on the upper surface of this transparent electrode 651, and a transparent base material 621 provided on the upper surface of this adhesive agent 690.

Patent Document 1: U.S. Pat. No. 7,751,667
Patent Document 2: Japanese Patent Application Laid-Open Publication No. 2002-122891

SUMMARY OF INVENTION

Problem to be Solved

As illustrated in FIG. 38, since the electrophoretic elements 560 are exposed to the light 750 from backside in the configuration of the optical device 510 disclosed in Patent Document 1, however, there arises the problem in which the operating voltage of the electrophoretic elements 560 (voltage value necessary to operate the electrophoretic elements 560) rises due to optical degradation caused as the result of the light 750 getting inside the electrophoretic elements 560. That is, since the operating voltage of the electrophoretic elements 560 depends on the amount of surface charging of the electrophoretic elements 560, the amount of surface charging decreases due to the above-mentioned optical degradation, and therefore, the operating voltage rises. This results in the disadvantage of causing the operation performance of the optical device 510 to degrade. The optical device 410 described with reference to FIG. 35 has the same disadvantage as this disadvantage.

Since the electrophoretic display device 610 disclosed in Patent Document 2 is configured such that the aluminum electrode 650 is formed by vacuum sputtering on the bottom surface of each concave portion 620A formed in the base material 620, an unintended aluminum layer is formed on the sidewalls of each concave portion 620A. This results in the disadvantage of being unable to stably ensure the normal operation of the electrophoretic display device 610.

Purpose of Invention

An object of the present invention, which has been accomplished in view of the above-described problems, is to provide an optical device that relieves a decrease in the amount of charging of an electrophoretic element caused in particular by the ingress of incident light and ensures operation stability, a manufacturing method of the optical device, and a display device, electronic device and an illuminating device including the optical device.

Solution to Problem

In order to achieve the above-described object, an optical device according to the present invention includes
first and second transparent substrates disposed so that the principal surfaces thereof face each other; conductive light shielding patterns disposed on the principal surface side of the first transparent substrate;
a transparent conductive film disposed on the principal surface of the second transparent substrate;
a plurality of light transmissive regions disposed on the first transparent substrate; and an electrophoretic element disposed in gaps between each adjacent light transmissive regions and composed of light shielding electrophoretic particles retaining specific charges and a transmissive dispersant, and is configured such that the dispersion state of the electrophoretic particles is changed by externally adjusting a potential difference between each conductive light shielding pattern and the transparent conductive film, thereby changing the range of outgoing directions of light transmitting through the respective light transmissive regions.

A display device according to the present invention includes a display provided with a visual surface for displaying images; and the above-described optical device disposed on the visual surface of this display.

Another display device according to the present invention includes a liquid crystal display provided with a visual surface for displaying images; a backlight disposed on the back side of this liquid crystal display to irradiate the liquid crystal display with light; and the above-described optical device disposed between the liquid crystal display and the backlight.

An electronic device according to the present invention includes an electronic device body provided with a display means for displaying images outward, and is equipped with the above-described display device as the display means.

An illuminating device according to the present invention includes the above-described optical device; and a light source provided on the back side of the first transparent substrate that this optical device includes.

An optical device manufacturing method according to the present invention includes:
a light shielding pattern formation step of forming conductive light shielding patterns on the principal surface of a first transparent substrate;
a photosensitive resin lamination step of laminating transparent photosensitive resin on the principal surface side of the first transparent substrate on which these conductive light shielding patterns are formed;
an exposure light radiation step of radiating exposure light composed of parallel light parallel to a laminating direction toward this laminated transparent photosensitive resin;
a transmissive region formation step of forming plurally-divided light transmissive regions by performing a development treatment on the transparent photosensitive resin irradiated with this exposure light;
a transparent substrate placement step of placing a second transparent substrate on a surface of which a transparent conductive film is formed, so that the transparent conductive film faces the light transmissive region side; and
an electrophoretic element filling step of filling electrophoretic elements which are a mixture of light shielding electrophoretic particles retaining specific charges and a transmissive dispersant in gaps present among the light transmissive regions to form a light-absorbing layer, wherein in the exposure light radiation step, the exposure light is radiated so that at least some of the conductive light shielding patterns are positioned in gaps present among the light transmissive regions.

Advantageous Effects of Invention

According to the present invention, it is possible to provide an optical device that relieves a decrease in the amount of charging of electrophoretic elements caused by the ingress of incident light and ensures operation stability, a manufacturing method of the optical device, and a display device, an electronic device and an illuminating device including the optical device, since the electrode on the side on which light is incident is formed in particular of the conductive light shielding patterns made of a light shielding conductive film.

BRIEF DESCRIPTION OF DRAWINGS

FIG. 1A represents a narrow-field mode (narrow-field state), whereas FIG. 1B represents a wide-field mode (wide-field state);

FIG. 3A represents a case in which the surface charges of electrophoretic particles are negative charges (−), whereas FIG. 3B represents a case in which the surface charges of electrophoretic particles are positive charges (+);

FIG. 4 is a group of drawings illustrating a case in which electrophoretic particles are arranged nearby the transparent conductive film in the optical device disclosed in FIG. 1, where FIG. 4A is a cross-sectional view illustrating the relationship between incident light and the electrophoretic particles, whereas FIG. 4B is a characteristic drawing illustrating the condition of luminance in the above-mentioned configuration structure;

FIG. 5 is a group of drawings illustrating a case in which electrophoretic particles are arranged nearby the conductive light shielding patterns in the optical device disclosed in FIG. 1, where FIG. 5A is a cross-sectional view illustrating the relationship between incident light and the electrophoretic particles, whereas FIG. 5B is a characteristic drawing illustrating the condition of luminance in the above-mentioned configuration structure;

FIG. 15 is a group of cross-sectional views illustrating the conditions of steps, among the respective steps in the optical device manufacturing method disclosed in FIG. 12, according to the order of progress of FIG. 15A, FIG. 15B, FIG. 15C, FIG. 15D, FIG. 15E, and FIG. 15F, when a step of forming light transmissive regions using the conductive light shielding patterns as a photomask is adopted in place of the steps of FIG. 12C and FIG. 12D;

FIG. 16 is a cross-sectional view illustrating trajectories of vertical incident light in the optical device of Embodiment 1;

FIG. 1 is fixed in another embodiment of the present invention;

FIG. 1 is mounted on a display screen in another embodiment of the present invention;

FIG. 1 is fixed to a display screen in another embodiment of the present invention;

FIG. 33A is a schematic view illustrating a device, among electronic devices in other embodiments of the present invention, to which inputs are provided using a touch panel, whereas FIG. 33B is a schematic view illustrating a device to which inputs are provided using a touch panel, a keyboard or a mouse;

FIG. 35 is a group of drawings illustrating the operating principles of an optical device capable of switching between two states of light emission, where FIG. 35A is a cross-sectional view illustrating a narrow-field mode, whereas FIG. 35B is a cross-sectional view illustrating a wide-field mode;

FIG. 39 is a group of cross-sectional views illustrating an optical device in a sixth embodiment of the present invention, where FIG. 39A illustrates a narrow-field mode, whereas FIG. 39B illustrates a wide-field mode;

FIG. 40 is a group of drawings illustrating the advantageous effects of the display device in the sixth embodiment of the present invention, where FIG. 40A is a drawing illustrating trajectories of incident light when an antireflection pattern is not present between a transparent substrate and conductive light shielding patterns, whereas FIG. 40B is a drawing illustrating a trajectory of incident light when an antireflection pattern is present between the transparent substrate and the conductive light shielding patterns;

FIG. 41 is a group of cross-sectional views illustrating an optical device in a seventh embodiment of the present invention, where FIG. 41A illustrates a narrow-field mode, whereas FIG. 41B illustrates a wide-field mode.

DESCRIPTION OF EMBODIMENTS

Figure 1:
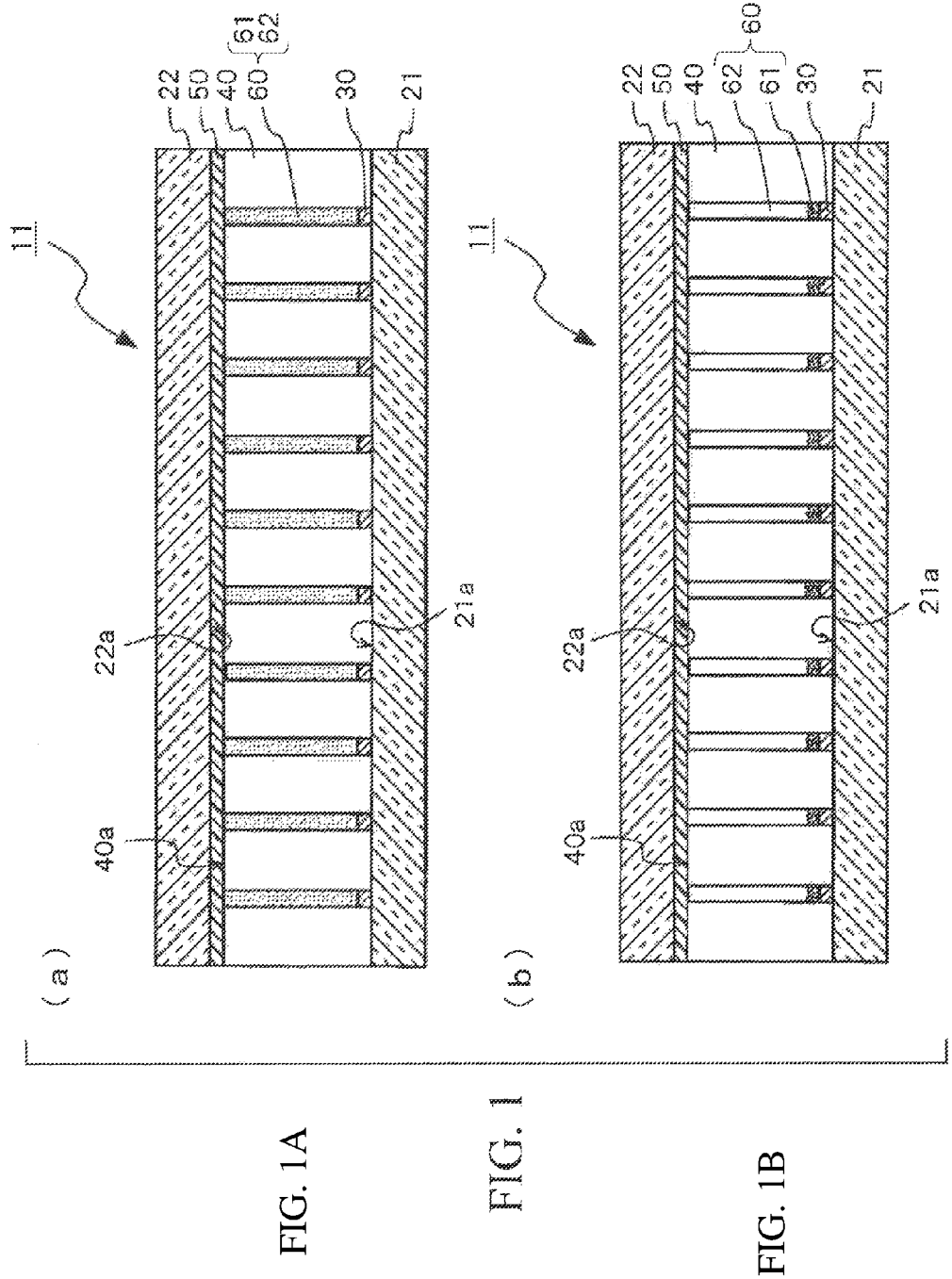
FIG. 1 is a group of cross-sectional views illustrating an optical device in a first embodiment of the present invention, where

Hereinafter, modes for carrying out the present invention (hereinafter referred to as "embodiments") will be described while referring to the accompanying drawings. Note that in the present specification and the drawings, the same reference numerals and characters will be used for substantially the same constituent parts. Shapes depicted in the drawings do not necessarily conform to actual dimensions and ratios.

First Embodiment

A first embodiment of an optical device in the present invention will be described according to FIGS. 1 to 16.
(Basic Configuration)

FIG. 1 is a group of cross-sectional views illustrating an optical device of the first embodiment, where FIG. 1A illustrates a narrow-field mode (narrow-field state), whereas FIG. 1B illustrates a wide-field mode (wide-field state).

As illustrated in FIG. 1, an optical device 11 of the first embodiment is provided with a first transparent substrate 21; conductive light shielding patterns 30 formed on a surface (principal surface) 21a of this first transparent substrate 21; a plurality of light transmissive regions 40 having upper surfaces 40a as the top surfaces thereof, formed in positions complementary with the positions of these conductive light shielding patterns 30, and separated from one another; a transparent conductive film 50 and a second transparent substrate 22 disposed on the upper surfaces 40a of these light transmissive regions 40; and electrophoretic elements 60 disposed in gaps among the conductive light shielding patterns 30, the light transmissive regions 40 and the transparent conductive film 50.

Each electrophoretic element 60 is a mixture of electrophoretic particles 61 and a dispersant 62. Note that for ease of viewing, the cross-sections of each light transmissive region 40 and the dispersant 62 are illustrated without being hatched.

Figure 2:
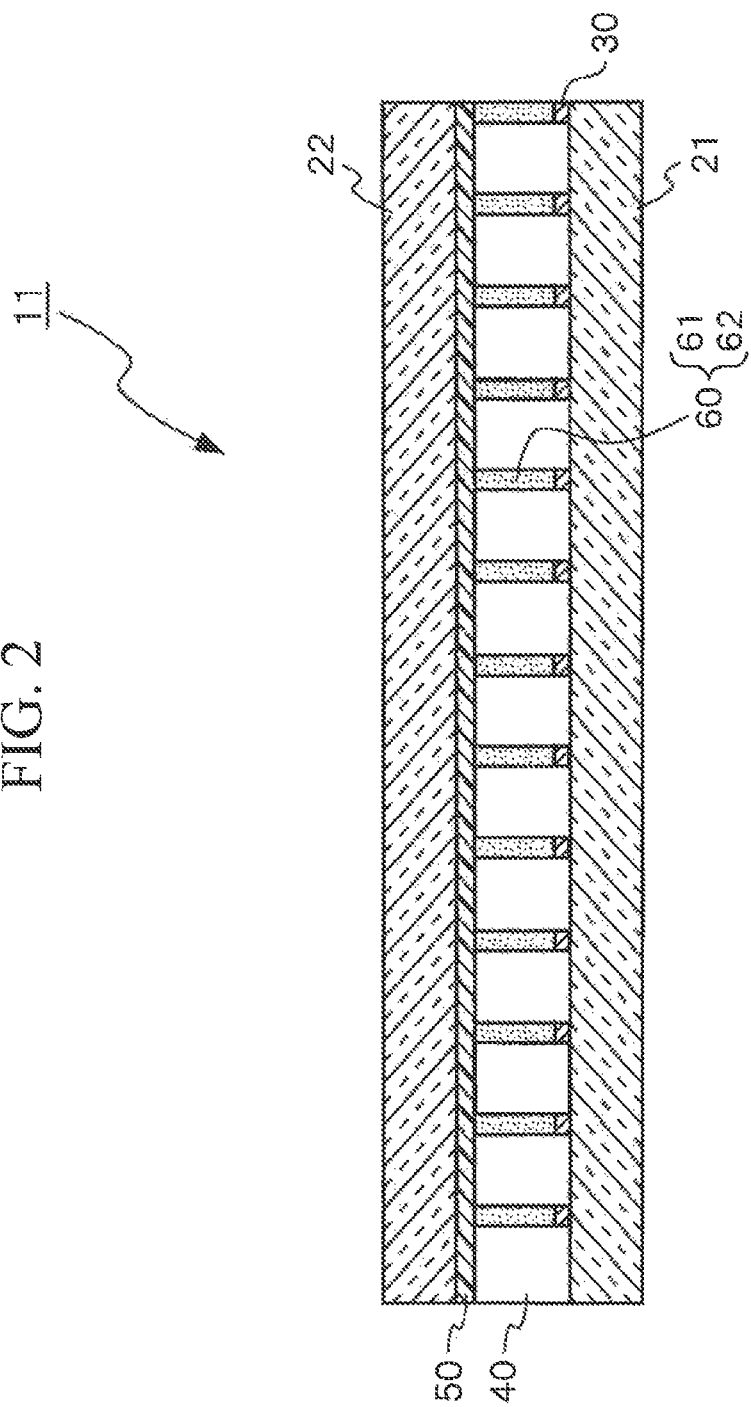
FIG. 2 is a cross-sectional view illustrating the conditions of the electrical potentials of conductive light shielding patterns and a transparent conductive film in the wide-field mode of the optical device disclosed in FIG. 1.

The narrow-field mode illustrated in FIG. 1A is realized as the result of electrophoretic particles 61 in each electrophoretic element 60 disposed in a gap of each light transmissive region 40 being dispersed into the dispersant 62 (see FIG. 2).

Figure 3:
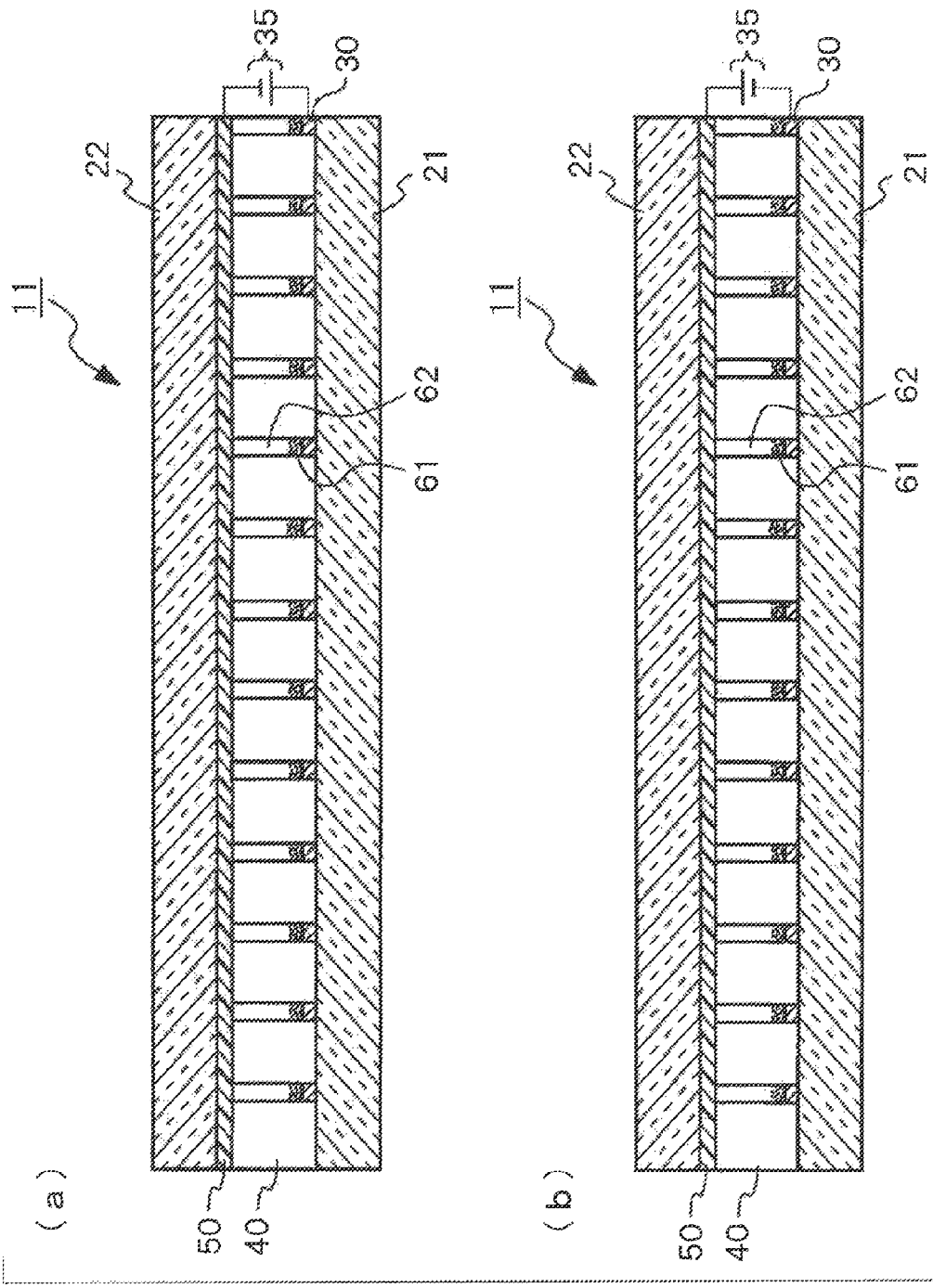
FIG. 3 is a group of cross-sectional views illustrating the conditions of the electrical potentials of the conductive light shielding patterns and the transparent conductive film in the narrow-field mode of the optical device disclosed in FIG. 1, where

In contrast, the wide-field mode illustrated in FIG. 1B is realized by gathering electrophoretic particles 61 nearby each conductive light shielding pattern 30 (see FIG. 3).

Here, electrophoretic particles 61 are gathered nearby each conductive light shielding pattern 30 by setting the electrical potential of each conductive light shielding pattern 30 relative to the electrical potential of the transparent conductive film 50 to a polarity opposite to the polarity of surface charges of electrophoretic particles 61.

That is, as illustrated in FIG. 3A, the conductive light shielding patterns 30 are made positive in polarity if the surface charges of electrophoretic particles 61 are negative charges (−). In contrast, the conductive light shielding patterns 30 are made negative in polarity, as illustrated in FIG. 3B, if the surface charges of electrophoretic particles 61 are positive charges (+).

If the polarity of each conductive light shielding pattern 30 is set so as to be the same as the polarity of surface charges of electrophoretic particles 61, electrophoretic particles 61 gather nearby the transparent conductive film 50, as illustrated in FIG. 4A. Consequently, incident light 750 is blocked by electrophoretic particles 61 (see "x" marks). That is, there arise angles at which the incident light 750 is prevented from passing through by electrophoretic particles 61 gathered nearby the transparent conductive film 50 (i.e., angles at which the electrophoretic particles 61 block the transit of the incident light 750). This gives rise to angles at which luminance degrades, as illustrated in FIG. 4B.

In contrast, if electrophoretic particles 61 are gathered nearby each conductive light shielding pattern 30 as described above, interference with incident light 750 by the electrophoretic particles 61 does not take place, as illustrated in FIG. 5A. Accordingly, there arise no such angles at which luminance degrades, as illustrated in FIG. 5B, thus making it possible to ensure superior luminance.

In summary of the above-described configuration, the optical device 11 including the first and second transparent substrates (21 and 22) disposed so that the principal surfaces thereof face each other; the conductive light shielding patterns 30 disposed on the principal surface 21a side of the first transparent substrate 21; the transparent conductive film 50 disposed on the principal surface 22a of the second transparent substrate 22; the plurality of light transmissive regions 40 disposed on the first transparent substrate 21; and the electrophoretic element 60 disposed in gaps between each adjacent light transmissive regions 40 and composed of the light shielding electrophoretic particles 61 retaining specific charges and the transmissive dispersant 62 is configured such that the dispersion state of the electrophoretic particles 61 is changed by externally adjusting the potential difference between each conductive light shielding pattern 30 and the transparent conductive film 50, thereby changing the range of outgoing directions of light transmitting through the respective light transmissive regions 40 and the dispersant 62.

Each light transmissive region 40 is disposed in a position complementary with the position of the conductive light shielding pattern 30.

The optical device 11 is configured such that the electrical potential of the conductive light shielding patterns 30 relative to the electrical potential of the transparent conductive film 50 is adjusted so as to be opposite in polarity to the surface charges of the electrophoretic particles 61, thereby gathering the electrophoretic particles 61 nearby the conductive light shielding patterns 30.

Here, the optical device 11 may be configured to include an electric field-applying means 35 for applying electric fields, so that the polarity of the conductive light shielding patterns 30 with respect to the transparent conductive film 50 is opposite to the polarity of charges of the electrophoretic particles 61.

Hereinafter, a description will be made of a configuration in a case where the surface charges of electrophoretic particles 61 are negative charges (−). The configuration is likewise applicable, however, in a case where the surface charges of electrophoretic particles 61 are positive charges (+), by reversing the polarity of the conductive light shielding patterns 30.

(Specific Configuration)

Next, the configuration of the optical device 11 will be described in more detail according to FIG. 1.

The optical device 11 includes the first transparent substrate 21 as described above.

In the first embodiment, a glass substrate, or a substrate made from PET (Polyethylene Terephthalate), PC (Polycarbonate) or PEN (Polyethylene Naphthalate) is adopted as this first transparent substrate 21.

The conductive light shielding patterns 30 are formed on the principal surface of the first transparent substrate 21.

As the constituent material of these conductive light shielding patterns 30, it is possible to suitably adopt a light shielding electrical conducting material, such as aluminum, chromium, copper, chromium oxide, or carbon nanotube. Accordingly, aluminum is adopted in the first embodiment.

The film thickness of the conductive light shielding patterns 30 is preferably within the range of 10 [nm] to 1000 [nm]. Accordingly, this thickness is set to 300 [nm] in the first embodiment.

Each light transmissive region 40 is formed in a position complementary with the position of the conductive light shielding pattern 30 on the first transparent substrate 21.

The phrase "complementary position" as used herein refers to a positional relationship in which the conductive light shielding patterns 30 and the light transmissive regions 40 are alternately arranged on the principal surface of the first transparent substrate 21 as illustrated in, for example, FIG. 1. Accordingly, the conductive light shielding patterns 30 and the light transmissive regions 40 are preferably arranged without intersecting (overlapping) with each other.

The height of the light transmissive regions 40 is preferably within the range of 3 [μm] to 300 [μm]. Accordingly, this height is set to 60 [μm] in the first embodiment.

The width of the light transmissive regions 40 (light transmissive pattern width) is preferably within the range of 1 [μm] to 150 [μm]. Accordingly, this width is set to 20 [μm] in the first embodiment.

A width across adjacent light transmissive regions 40 (light shielding pattern width) is preferably within the range of 0.25 [μm] to 40 [μm]. Accordingly, this width is set to 5 [μm] in the first embodiment.

Each electrophoretic element 60 which is a mixture of the electrophoretic particles 61 and the dispersant 62 is disposed in gaps between each adjacent light transmissive regions 40, as described above.

Next, three examples illustrated in FIGS. 6 to 8 and in FIGS. 9 to 11 corresponding to these figures will be described as layout examples of the light transmissive regions 40 and the electrophoretic elements 60.

Figure 6:
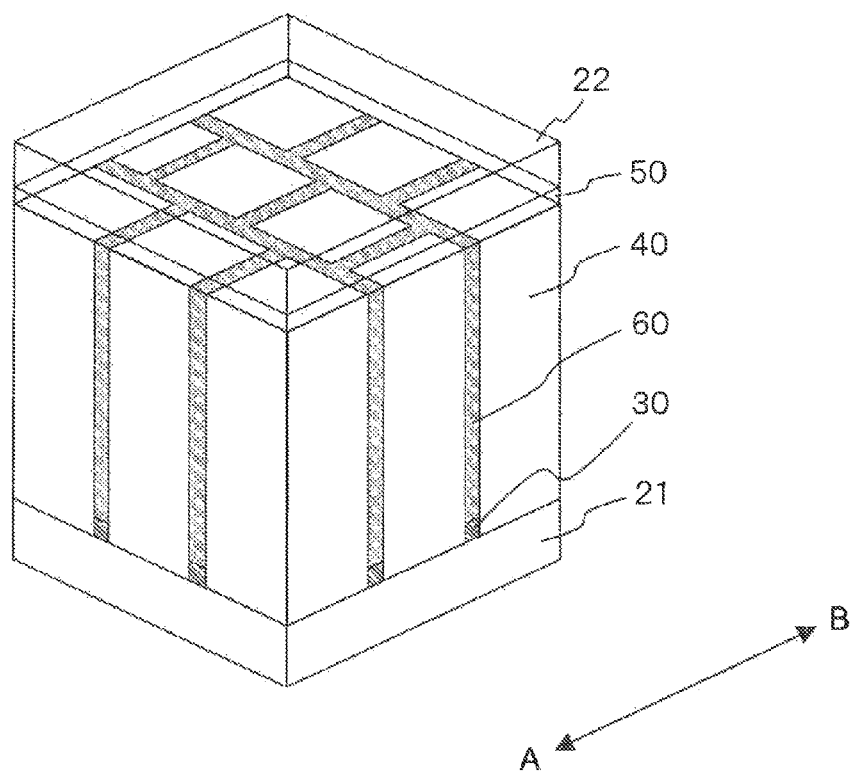
FIG. 6 is a perspective view illustrating an overview of a case in which a square pattern structure is adopted as the optical device of the first embodiment.
Figure 9:
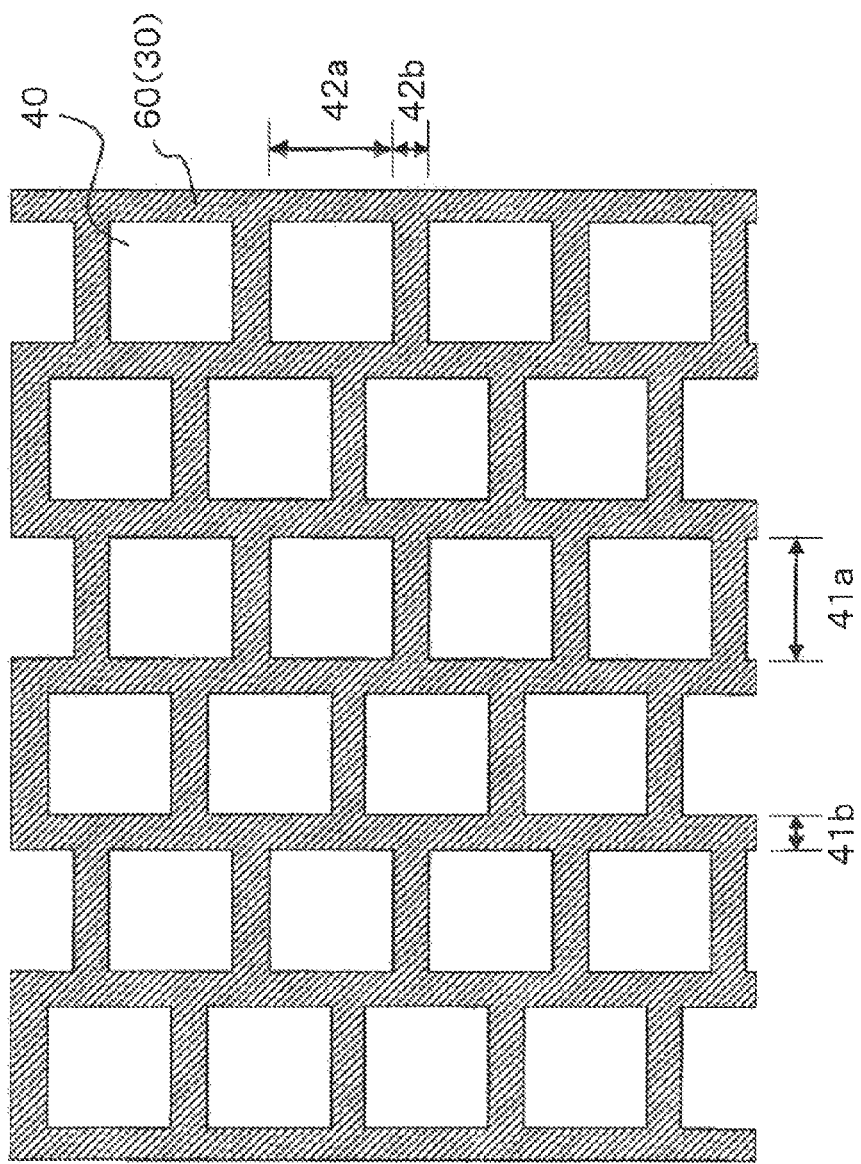
FIG. 9 is a schematic view illustrating planar shapes of the light transmissive regions and the electrophoretic elements in the optical device having the square pattern structure disclosed in FIG. 6.

In the square pattern structure (first example) illustrated in the perspective view of FIG. 6, the planar shape of the light transmissive regions 40 and the electrophoretic elements 60 (conductive light shielding patterns 30) is square grid-like, as illustrated in FIG. 9.

That is, the optical device 11 in this case is formed so that a light transmissive pattern width 41a and a light transmissive pattern width 42a corresponding to the width of each light transmissive region 40 are equal to each other, and that a light shielding pattern width 41b and a light shielding pattern width 42b corresponding to the width of each electrophoretic element 60 (width across adjacent light transmissive regions 40) are also equal to each other.

Figure 7:
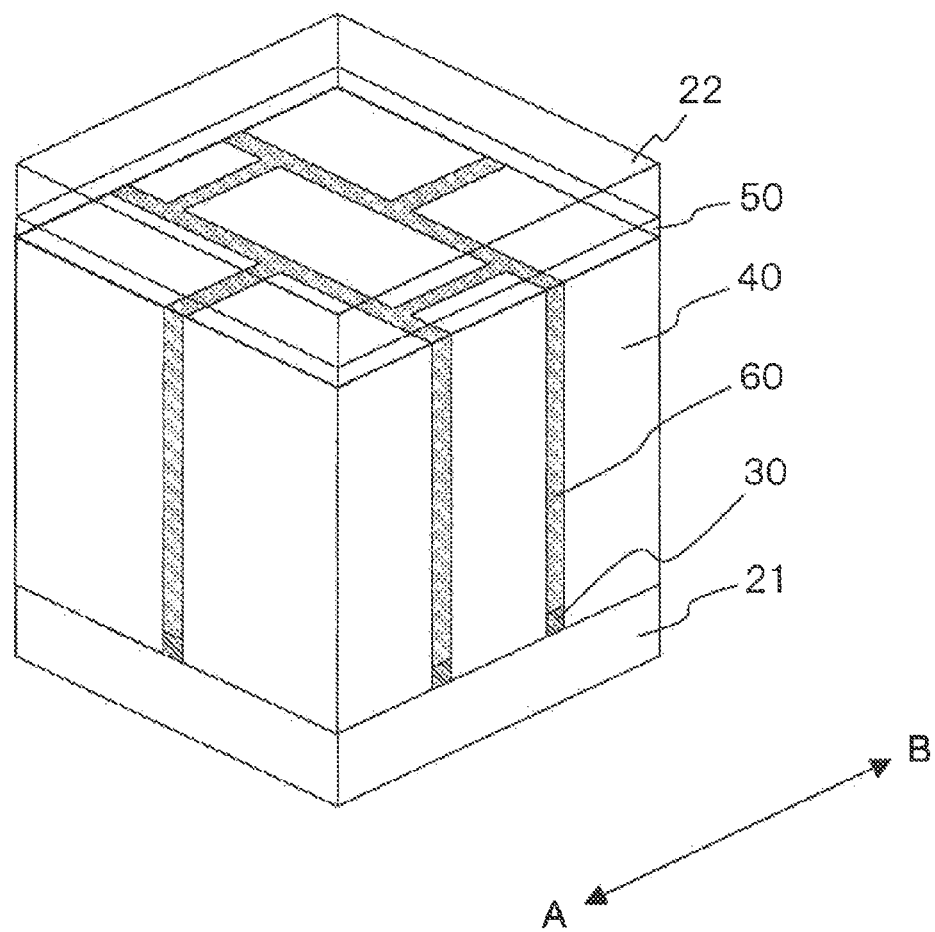
FIG. 7 is a perspective view illustrating an overview of a case where a rectangular pattern structure is adopted as the optical device of the first embodiment.
Figure 10:
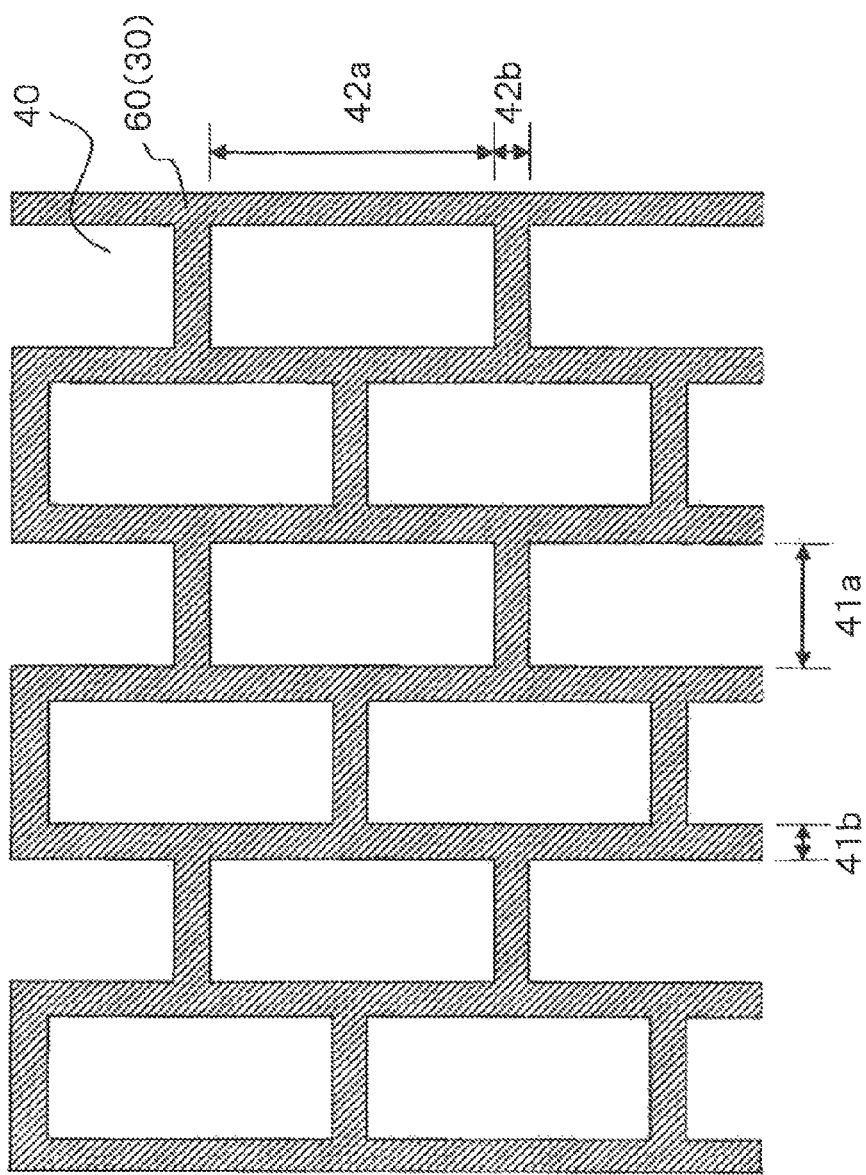
FIG. 10 is a schematic view illustrating planar shapes of the light transmissive regions and the electrophoretic elements in the optical device having the rectangular pattern structure disclosed in FIG. 7.

In the rectangular pattern structure (second example) illustrated in the perspective view of FIG. 7, the planar shape of the light transmissive regions 40 and the electrophoretic elements 60 (conductive light shielding patterns 30) is rectangular grid-like, as illustrated in FIG. 10.

That is, the optical device 11 in this case is formed so that the light transmissive pattern width 42a is longer than the light transmissive pattern width 41a (41a<42a). On the other hand, the optical device 11 is formed so that the light shielding pattern width 41b and the light shielding pattern width 42b are equal to each other.

Figure 8:
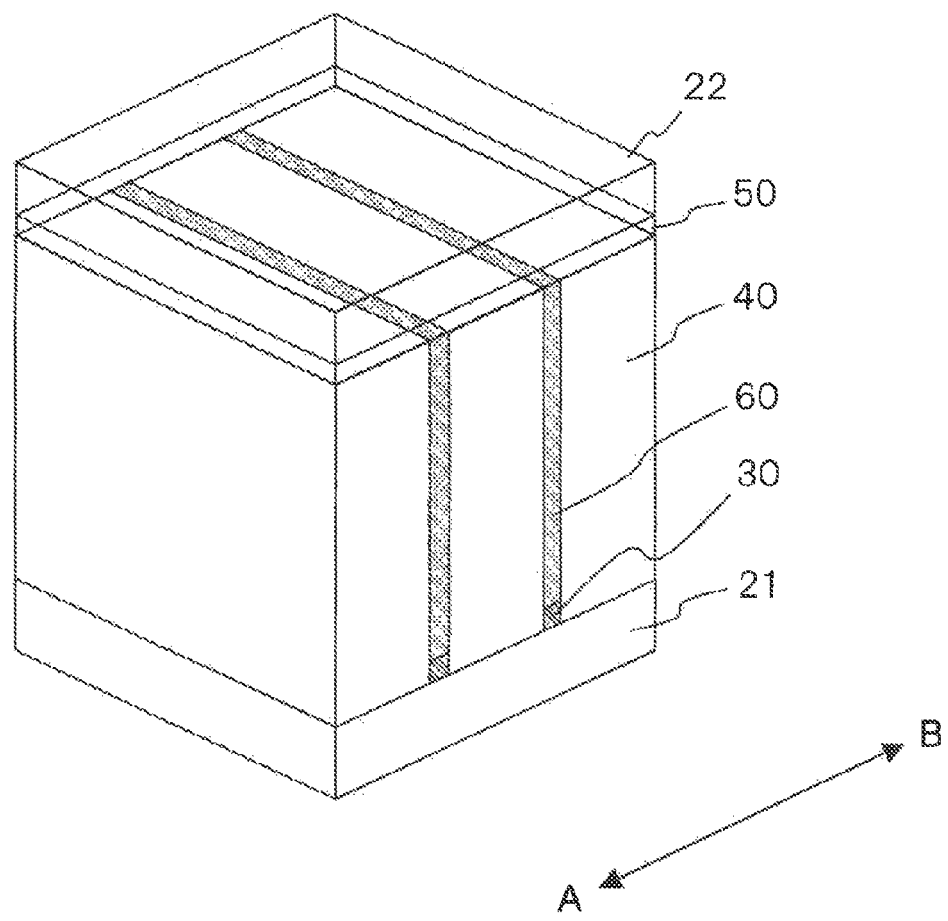
FIG. 8 is a perspective view illustrating an overview of a case where a striped pattern structure is adopted as the optical device of the first embodiment.
Figure 11:
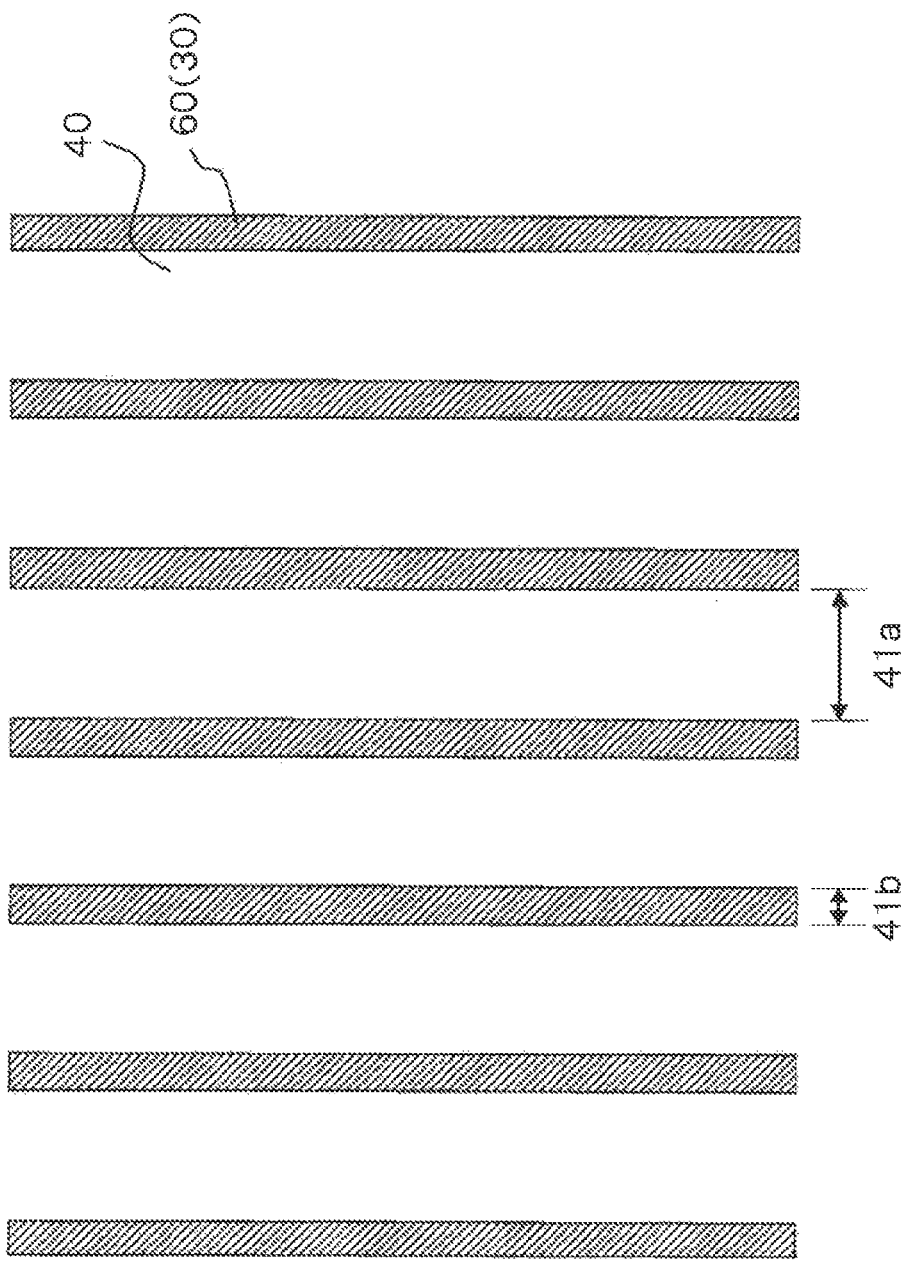
FIG. 11 is a schematic view illustrating planar shapes of the light transmissive regions and the electrophoretic elements in the optical device having the striped pattern structure disclosed in FIG. 8.

In the striped pattern structure (third example) illustrated in the perspective view of FIG. 8, the planar shape of the light transmissive regions 40 and the electrophoretic elements 60 (conductive light shielding patterns 30) is stripe-like, as illustrated in FIG. 11.

That is, the optical device 11 in this case is such that the light transmissive regions 40 and the electrophoretic elements 60 are alternately disposed so that the light transmissive pattern width 41a and the light shielding pattern width 41b are continuous.

In addition, a visible angle in the A-B direction shown in FIGS. 6 to 9 is restricted to approximately ±30°.

(Optical Device Manufacturing Method)

Here, a method for manufacturing the optical device according to the first embodiment will be described with reference to FIG. 12 that illustrates, by way of example, the respective steps of the method. (The method for manufacturing the optical device 11 includes the respective steps to be shown below.)

First, as illustrated in FIG. 12A, the conductive light shielding patterns 30 are formed on a surface (principal surface) of the first transparent substrate 21 (light shielding pattern formation step). Next, as illustrated in FIG. 12B, a transparent photopolymer layer 41 is laminated and formed as a negative-type photoresist film on the principal surface side of the first transparent substrate 21 on which the conductive light shielding patterns 30 are formed (photosensitive resin lamination step).

Note that the transparent photopolymer layer 41 is a member that turns into the light transmissive regions 40 after going through a transmissive region formation step to be described later.

Next, as illustrated in FIG. 12C, exposure light 75 is radiated to the transparent photopolymer layer 41 through a photomask 70 including mask patterns 71 to expose the transparent photopolymer layer 41 (exposure light radiation step).

In this exposure light radiation step, control for adjusting the positions of the photomask 70 and the first transparent substrate 21 is performed so that the positions of the mask patterns 71 overlap with the positions of the conductive light shielding patterns 30 (position control step).

Next, a development treatment is performed on the exposed transparent photopolymer layer 41 to form such a plurality of light transmissive regions 40 separated from one another as illustrated in FIG. 12D (transmissive region formation step).

Subsequently, as illustrated in FIG. 12E, the second transparent substrate 22 provided with the transparent conductive film 50 is placed on the surfaces of the light transmissive regions 40 (transparent substrate placement step).

Then, as illustrated in FIG. 12F, the electrophoretic elements 60 are filled in gaps formed by the conductive light shielding patterns 30, the light transmissive regions 40 and the transparent conductive film 50 (electrophoretic element filling step).

In the description made above based on FIG. 12, a method has been shown in which the electrophoretic element filling step is carried out subsequently to the transparent substrate placement step. The optical device 11 can also be manufactured, however, even if the order of these two steps is reversed.

Figure 12:
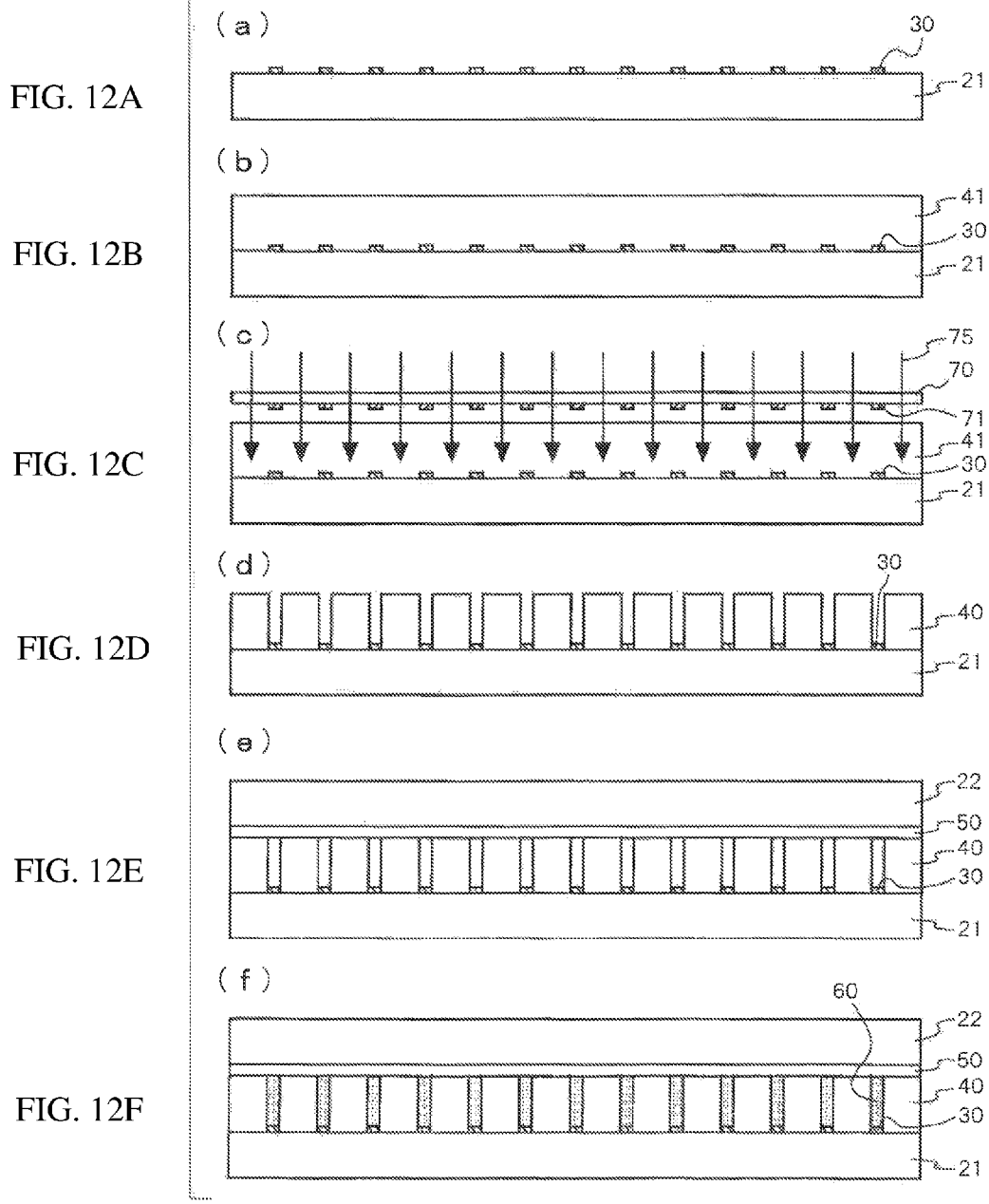
FIG. 12 is a group of cross-sectional views illustrating the conditions of respective steps in a manufacturing method of the optical device disclosed in FIG. 1 in the order of FIG. 12A, FIG. 12B, FIG. 12C, FIG. 12D, FIG. 12E, and FIG. 12F, according to the steps' order of progress.
Figure 13:
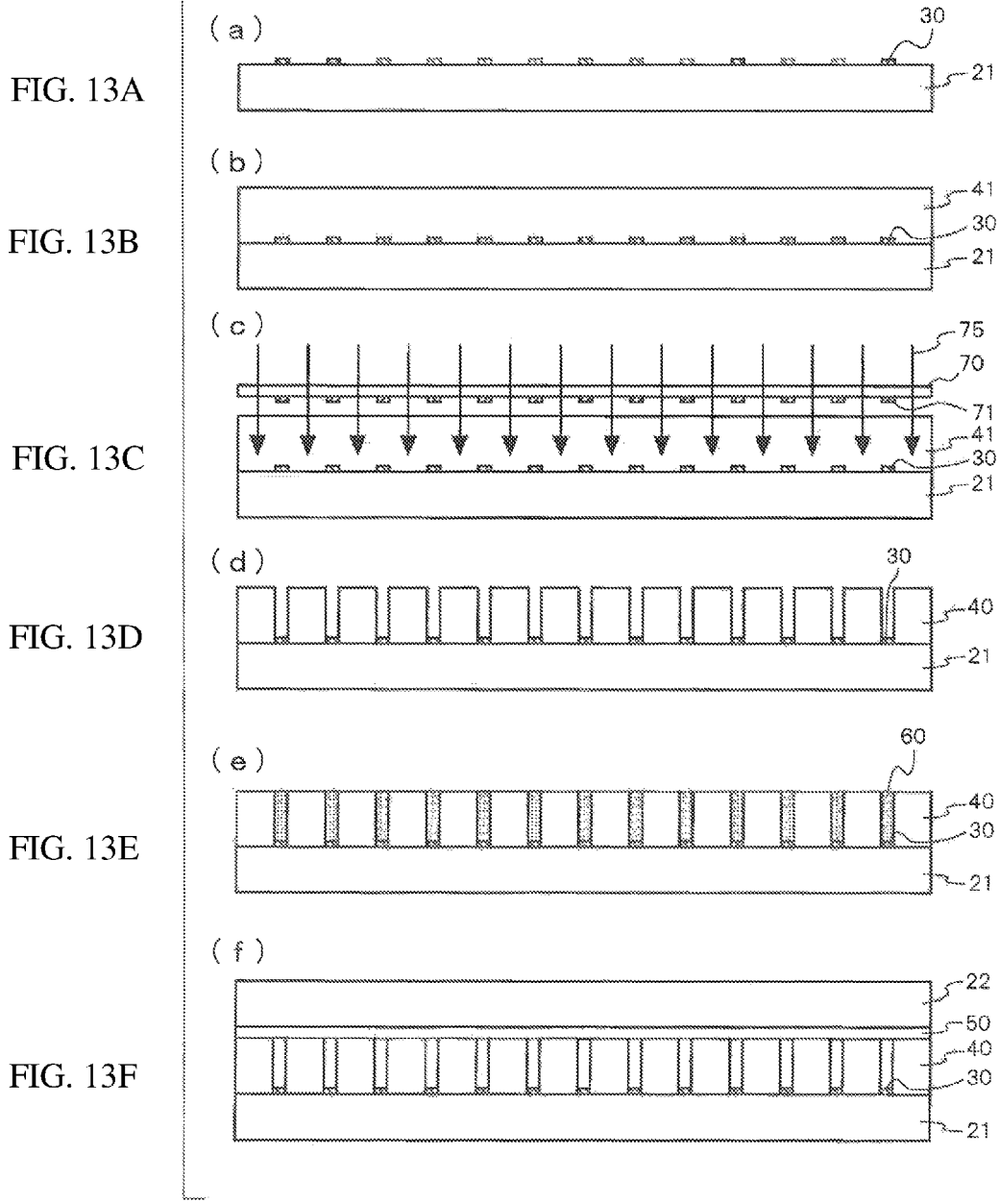
FIG. 13 is a group of cross-sectional views illustrating the conditions of respective steps in the optical device manufacturing method disclosed in FIG. 12, according to the order of progress of FIG. 13A, FIG. 13B, FIG. 13C, FIG. 13D, FIG. 13E, and FIG. 13F, when the steps of FIG. 12E and FIG. 12F are interchanged with each other.

That is, after the steps of FIG. 13A to FIG. 13D are carried out in the same way as in the descriptions based on FIGS. 12A to 12D, as illustrated in FIG. 13, the electrophoretic element filling step of filling the electrophoretic elements 60 among the light transmissive regions 40 may be carried out in the order from FIG. 13E to FIG. 13F, in advance of the transparent substrate placement step. Also, the electrophoretic element filling step may be carried out in advance of the transparent substrate placement step, and thereafter, the transparent substrate placement step of placing the second transparent substrate 22 provided with the transparent conductive film 50 on the surfaces of the light transmissive regions 40 and the electrophoretic elements 60 may be carried out.

Figure 14:
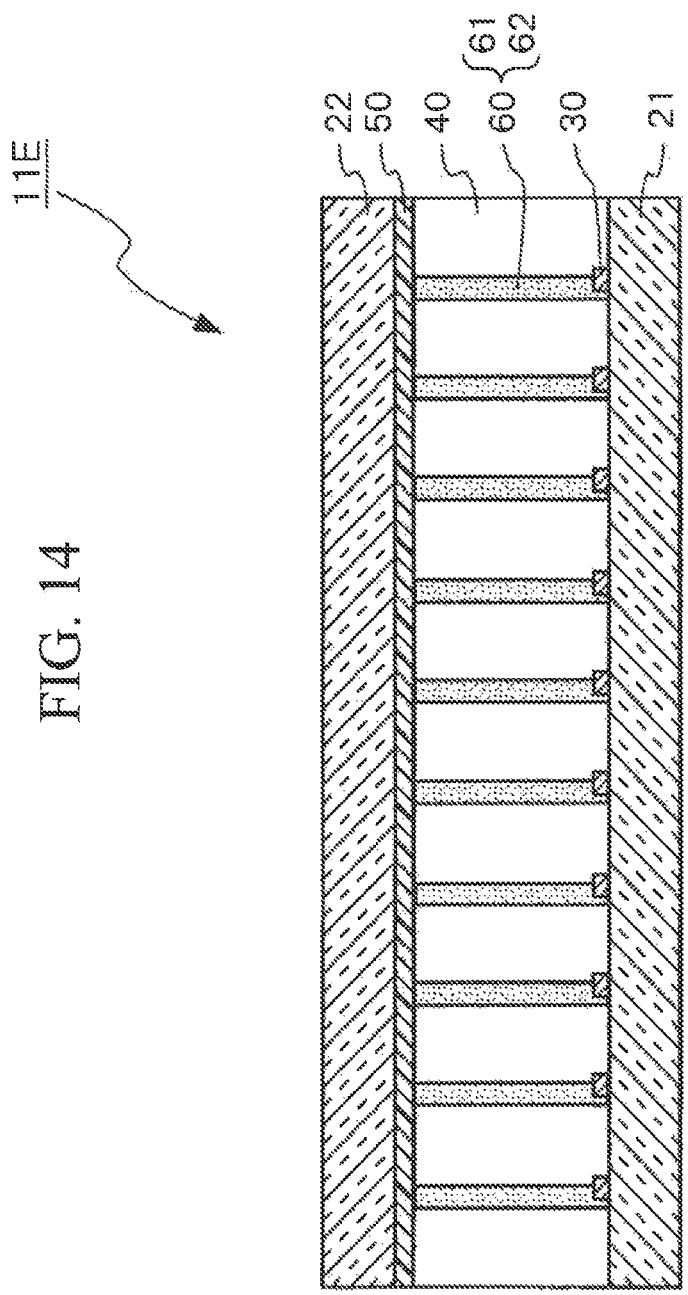
FIG. 14 is a cross-sectional view illustrating an optical device manufactured in the first embodiment with the relative positions of the conductive light shielding patterns and the light transmissive regions displaced.

If the positions of the mask patterns 71 are displaced from the positions of the conductive light shielding patterns 30 when the transparent photopolymer layer 41 is exposed using the photomask 70 as described above, the optical device 11 changes to an optical device 11E having a structure in which the light transmissive regions 40 are disposed in positions partially overlapping with the positions of the conductive light shielding patterns 30, as illustrated in FIG. 14.

Even if the light transmissive regions 40 are disposed so as to overlap with the conductive light shielding patterns 30 in part as described above, however, parts of the conductive light shielding patterns 30 are exposed to the electrophoretic element 60 side, as illustrated in FIG. 14. Accordingly, it is possible to effectively operate the electrophoretic particles 61.

Here, the patterning of the transparent photopolymer layer 41 may be performed by radiating the exposure light 75 from the back side of the first transparent substrate 21 using the conductive light shielding patterns 30 as a photomask, as illustrated in FIGS. 15C and 15D (radiation and formation step).

That is, this radiation and formation step may be adopted in place of the exposure light radiation step and the transmissive region formation step described with reference to FIGS. 12C and 12D. Then, the optical device 11 may be likewise manufactured in the order of FIG. 15A, FIG. 15B, FIG. 15C, FIG. 15D, FIG. 15E, and FIG. 15F, as illustrated in FIG. 15.

Using the conductive light shielding patterns 30 as a photomask in this way makes it possible to obtain the effect of allowing the relative positions of the light transmissive regions 40 and the conductive light shielding patterns 30 to go into a complementary relationship by themselves. As a result, it is possible to secure the state of the conductive light shielding patterns 30 being exposed.

Here, the exposure light 75 used in the above-described exposure is parallel light parallel to a laminating direction (direction in which the transparent photopolymer layer 41 and the like are laminated), as illustrated in FIGS. 12, 13 and 15. A UV light source is used as a light source of this exposure light 75. In the above-described exposure light radiation step or radiation and formation step in the first embodiment, UV light having a wavelength of 365 [nm] is radiated as the exposure light 75.

The amount of exposure at the time of this radiation is preferably within the range of 100 [mJ/cm2] to 1000 [mJ/cm2]. Accordingly, the amount of exposure is set to 200 [mJ/cm2] in the first embodiment to radiate the exposure light 75.

Next, the manufacturing method of the optical device 11 will be described in more detail with reference to FIG. 12, along with the material of each constituent member.

First, the conductive light shielding patterns 30 are formed on the principal surface of the first transparent substrate 21 composed of glass, PET, PC or PEN (FIG. 12A: light shielding pattern formation step). The transparent photopolymer layer 41 is formed on the conductive light shielding patterns 30 (FIG. 12B: photosensitive resin lamination step).

For the conductive light shielding patterns 30 relevant to these steps, it is possible to use a light shielding electrical conducting material, such as aluminum, chromium, copper, chromium oxide or carbon nanotube, as described above. Accordingly, the conductive light shielding patterns 30 are formed using aluminum in the first embodiment.

As a method for forming the transparent photopolymer layer 41, it is possible to use, for example, one of film-forming methods, such as slit die coating, wire coating, applicator coating, dry film resist transfer, spray coating, and screen printing.

Using such a film-forming method, the transparent photopolymer layer 41 is formed so that the thickness thereof, which is appropriately within the range of 30 [μm] to 300 [μm], is 60 [μm] in the first embodiment.

As transparent photosensitive resin to be used for the transparent photopolymer layer 41, it is possible to adopt, for example, a chemically-amplified resist (trade-named "SU-8") made by Kayaku MicroChem Corp. The characteristic features of this transparent photosensitive resin are as follows:

A first feature is that the resist is a negative-type resist based on epoxy (specifically, a glycidyl ether derivative of bisphenol A novolac) in which a photoinitiator produces acid upon ultraviolet light radiation and which polymerizes a curable monomer with this protonic acid as a catalyst.

A second feature is that the resist has an extremely high-transparency characteristic in a visible light region.

A third feature is that since the curable monomer contained in the transparent photosensitive resin is relatively low in molecular weight before curing, the resin is extremely soluble in such solvents as cyclopentanone, propylene glycol methyl ether acetate (PEGMEA), γ butyllactone (GBL), and isobutyl ketone (MIBK), and is therefore easy to be thick-film formed.

A fourth feature is that the resist is extremely superior in optical transparency also at wavelengths in a near-ultraviolet region and, even if thick film-formed, has the characteristic of letting ultraviolet light pass through.

A fifth feature is that since the resist has the above-described features, it is possible to form high-aspect ratio patterns having an aspect ratio of 3 or higher.

A sixth feature is that since a large number of functional groups are present in the curable monomer, the resist is extremely densely cross-bridged after curing, and is therefore extremely stable, both thermally and chemically. Consequently, it is easy to process the resist after pattern formation.

Although the above-mentioned chemically-amplified resist (trade-named "SU-8") is adopted as the transparent photopolymer layer 41 in the first embodiment, the transparent photopolymer layer 41 is not limited to this resist. That is, any photo-curable materials may be used as long the materials have the same characteristic features as described above.

Next, the transparent photopolymer layer 41 is patterned using the mask patterns 71 of the photomask 70 in the above-described exposure light radiation step (FIG. 12C).

The exposure light 75 used for exposure in this step is parallel light, and is emitted in a direction parallel to the laminating direction in the first embodiment.

UV light having a wavelength of 365 [nm] and the amount of exposure of 200 [mJ/cm2] is radiated as the exposure light 75 in the first embodiment in which a UV light is used as the light source of the exposure light 75, as described above.

Subsequently, a development treatment is performed on the transparent photopolymer layer 41 after exposure.

That is, the plurally-divided light transmissive regions 40 are formed in the transparent photopolymer layer 41 by developing the transparent photopolymer layer 41, and then performing thermal annealing (thermal annealing treatment) under the conditions of 120 [° C.] and 30 [min] (FIG. 12D: transmissive region formation step).

The width of a space between each adjacent light transmissive regions 40 formed here (light shielding pattern width) is 5 [μm], as described above.

The refractive index of the light transmissive regions 40 formed from the above-mentioned "SU-8" is ranging from 1.5 to 1.6.

Subsequently, the second transparent substrate 22 provided with the transparent conductive film 50 is disposed on the light transmissive regions 40 (FIG. 12E: transparent substrate placement step). This second transparent substrate 22 is fixed to the outer circumference of the first transparent substrate 21 with an adhesive agent (not illustrated). Either a thermosetting adhesive agent or a UV-curable adhesive agent may be used as the adhesive agent to be used at the time of this fixing.

Finally, the electrophoretic elements 60, each of which is a mixture of the electrophoretic particles 61 and the dispersant 62, are filled in gaps among the first transparent substrate 21, the second transparent substrate 22 and the light transmissive regions 40 (gaps among the conductive light shielding patterns 30, the transparent conductive film 50 and the light transmissive regions 40) (FIG. 12F: electrophoretic element filling step).

Note that as described above, the step of disposing the second transparent substrate 22 provided with the transparent conductive film 50 discussed in FIG. 12E (transparent substrate placement step) and the step of filling each electrophoretic element 60 in a space (gap) present between each adjacent light transmissive regions 40 illustrated in FIG. 12F (electrophoretic element filling step) may be interchanged with each other to manufacture the optical device 11 (FIGS. 13E and 13F).

The patterning of the transparent photopolymer layer 41 may be performed in the same way as described above by using the conductive light shielding patterns 30 as a photomask and radiating the exposure light 75 from the back side of the first transparent substrate 21 (FIGS. 15C and 15D).

Using the conductive light shielding patterns 30 as a photomask in this way allows the relative positions of the light transmissive region 40 and the conductive light shielding patterns 30 to go into a complementary relationship by themselves. Consequently, it is possible to secure the state of the conductive light shielding patterns 30 being exposed.

UV light having a wavelength of 365 [nm] is radiated in the first embodiment in which parallel light is also adopted as the exposure light 75 used for the above-described exposure and a UV light source is used as the light source.

At that time, the amount of exposure which is preferably within the range of 100 [mJ/cm2] to 1000 [mJ/cm2] is also set to 200 [mJ/cm2].

(Advantageous Effects and the Like of First Embodiment)

The optical device 11 in the first embodiment is configured such that an electrode on the side on which light is incident is formed using the conductive light shielding patterns 30 made from a light shielding conductive film. Accordingly, it is possible to prevent the electrophoretic elements 60 from being exposed to vertical incident light, as illustrated in FIG. 16. It is therefore possible to prevent operating voltages from rising due to the optical degradation of the electrophoretic elements 60.

According to the optical device 11 manufactured with high accuracy by the above-described respective manufacturing steps, ray direction control can be realized while ensuring satisfactory operation stability. It is therefore possible to improve the reliability of the optical device 11 required of optical devices.

Consequently, using the optical device 11 makes it possible to relieve a decrease in the amount of charging of the electrophoretic elements, prevent operating voltages from rising due to incident light, and stably ensure the normal operation of the devices.

In the optical device 11 configured as described above, the electrophoretic particles 61 gather at the nearby the surfaces of the conductive light shielding patterns 30 in the wide-field mode. Thus, it is possible to avoid giving rise to singular angles at which transmissivity degrades steeply. Consequently, it is possible to realize superior optical characteristics.

That is, according to the optical device 11 configured as described above in order to prevent vertical incident light from entering the electrophoretic elements, it is possible to prevent the degradation of the electrophoretic elements due to incident light. Accordingly, it is possible to relieve a decrease in the amount of charging of the electrophoretic elements caused by the ingress of incident light and thereby ensure operation stability.

Second Embodiment

A second embodiment of an optical device in the present invention will be described according to FIGS. 17 to 20. Here, the same reference numerals and characters are used for constituent members the same as those of the above-described first embodiment, and the constituent members will not be described again.

(Overall Configuration)

Figure 17:
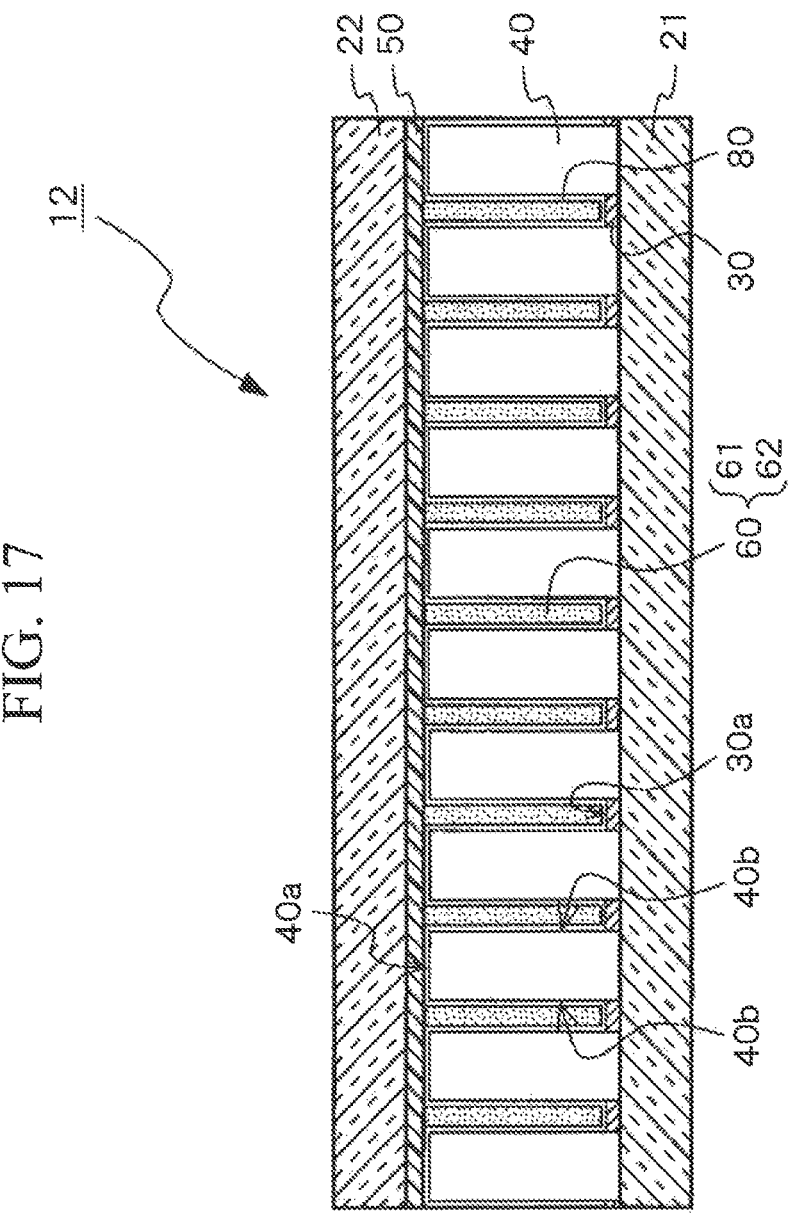
FIG. 17 is a cross-sectional view illustrating the narrow-field mode of an optical device in a second embodiment of the present invention.
Figure 18:
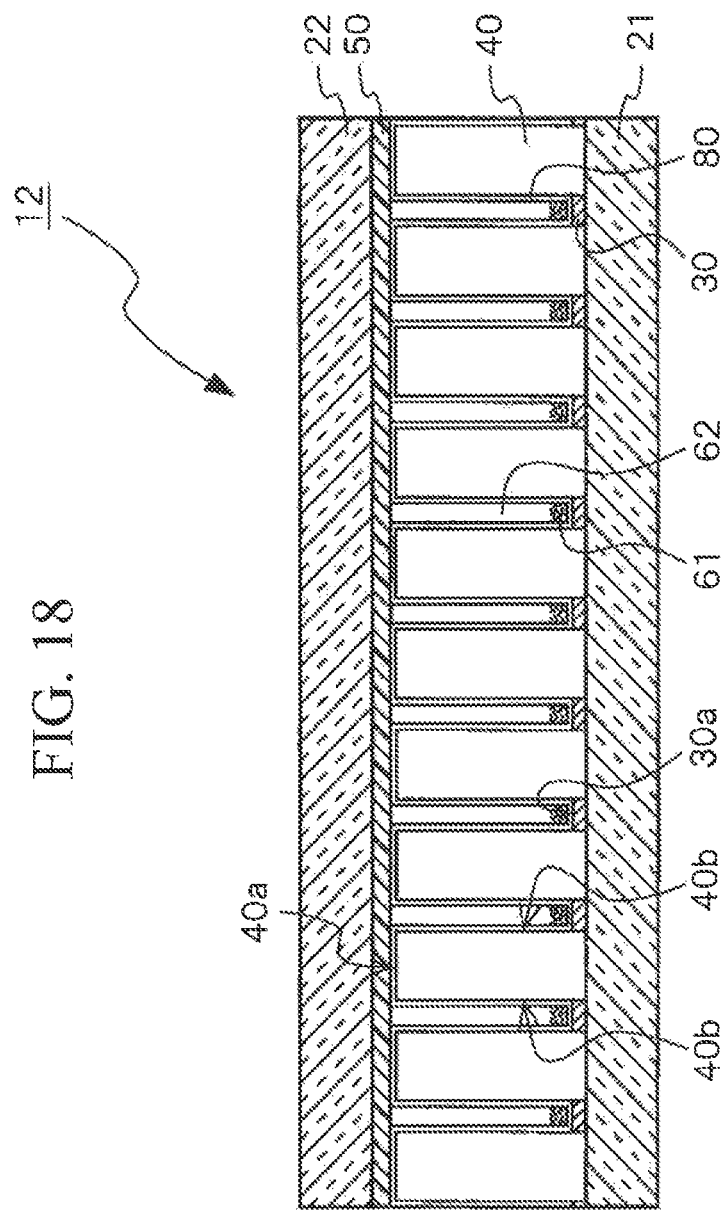
FIG. 18 is a cross-sectional view illustrating the wide-field mode of the optical device in the second embodiment of the present invention.

FIG. 17 is a cross-sectional view illustrating the narrow-field mode of the optical device of the second embodiment, whereas FIG. 18 is a cross-sectional view illustrating the wide-field mode of the optical device of the second embodiment.

As illustrated in FIGS. 17 and 18, an optical device 12 in the second embodiment is characterized in that in a first transparent substrate 21 on which conductive light shielding patterns 30 and light transmissive regions 40 are disposed as in the above-described first embodiment, a protective cover film 80 is disposed on the upper surfaces 40a and side surfaces 40b of the light transmissive regions 40.

The film thickness of this protective cover film 80 is preferably within the range of 10 [nm] to 1000 [nm]. Accordingly, this thickness is set to 200 [nm] in the second embodiment.

As the constituent material of the protective cover film 80, it is possible to adopt a silicon oxide film, a silicon nitride film, a silicon oxynitride film, paraxylylene resin (hereinafter abbreviated as parylene), methacryl resin, or the like. Accordingly, a silicon oxide film, among these materials, is adopted in the second embodiment.

Here, FIGS. 17 and 18 illustrate a condition in which the protective cover film 80 is also formed on the surfaces 30a of the conductive light shielding patterns 30. Covering the surfaces 30a is not an essential factor, however. That is, advantageous effects to be described later can be effectively obtained by configuring the optical device 12, so that the upper surfaces 40a and the side surfaces 40b of the light transmissive regions 40 are covered with the protective cover film 80.

That is, according to the above-described configuration, it is possible to prevent the light transmissive regions 40 and the electrophoretic elements 60 from coming into contact with each other, as the result of the upper surfaces 40a and the side surfaces 40b which are the exposed portions of the light transmissive regions 40 being covered with the protective cover film 80. It is therefore possible to prevent the occurrence of damage or the like to the surfaces of the light transmissive regions 40 due to the electrophoretic elements 60.

Consequently, the optical device 12 has a stable structure in which the operating condition of the electrophoretic elements 60 does not vary. Thus, it is possible to realize ray direction control with satisfactory operation stability.

The sealing property is improved as the result of the protective cover film 80 being added to the configuration of the first embodiment as a peripheral member for holding the electrophoretic elements 60. Thus, it is possible to obtain superior reliability required of optical devices.

(Optical Device Manufacturing Method)

Figure 19:
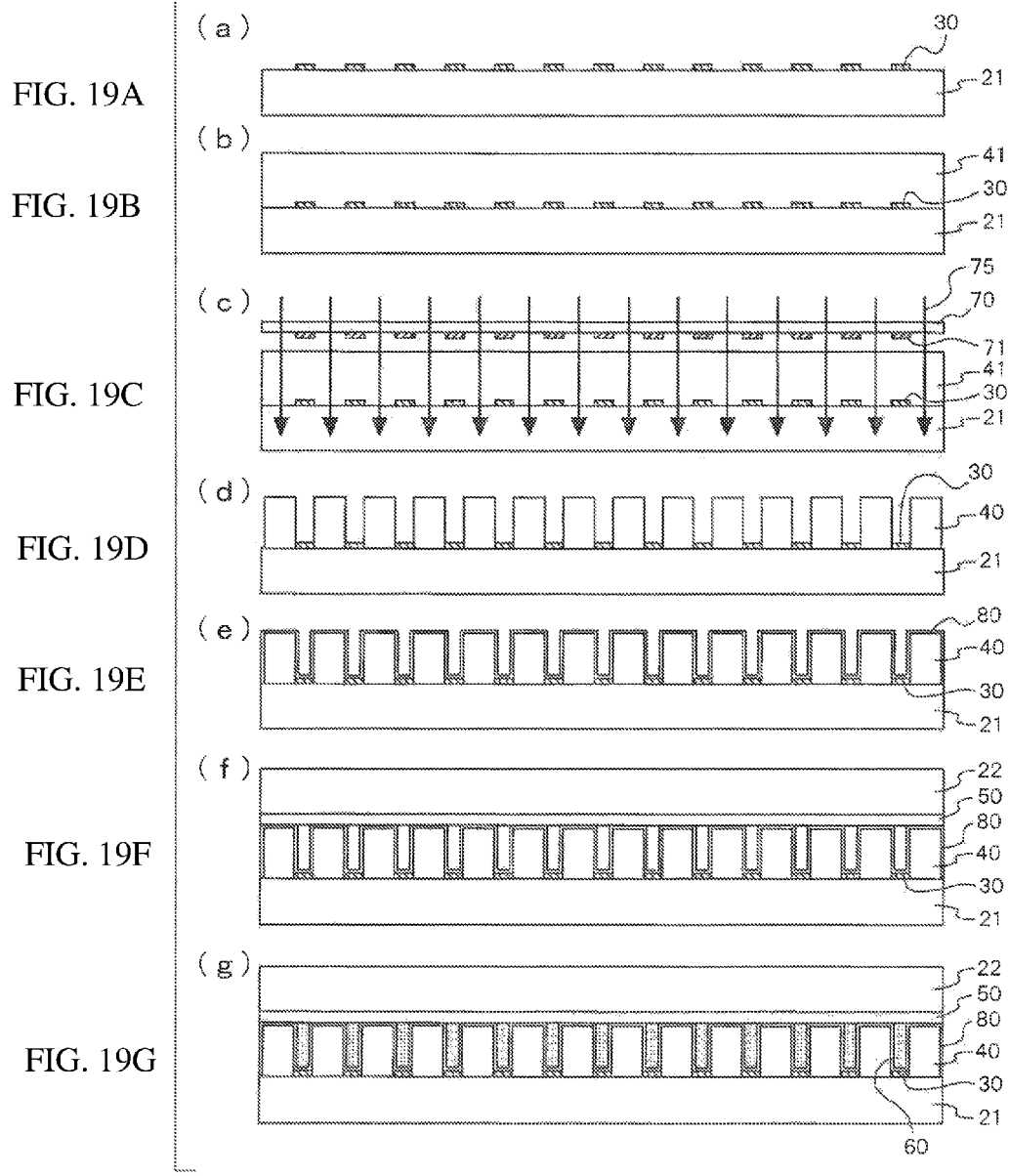
FIG. 19 is a group of cross-sectional views illustrating respective steps in the optical device manufacturing method disclosed in FIGS. 17 and 18, in the order of FIG. 19A, FIG. 19B, FIG. 19C, FIG. 19D, FIG. 19E, and FIG. 19F, according to the steps' order of progress.

Next, a method for manufacturing the optical device 12 according to the second embodiment will be described with reference to FIG. 19 that illustrates, by way of example, the respective steps of the method.

First, the conductive light shielding patterns 30 are formed on a surface of the first transparent substrate 21 composed of glass, PET, PC or PEN (FIG. 19A: light shielding pattern formation step). Then, the transparent photopolymer layer 41 is formed on the conductive light shielding patterns 30 (FIG. 19B: photosensitive resin lamination step).

The constituent material of the conductive light shielding patterns 30 and the formation method, film thickness and material of the transparent photopolymer layer 41 are the same as those of the above-described first embodiment.

Next, exposure light 75 which is parallel light is radiated to the transparent photopolymer layer 41 through a photomask 70 including mask patterns 71 to expose the transparent photopolymer layer 41 (FIG. 19C: exposure light radiation step).

The amount of exposure of the exposure light 75 used for this exposure is preferably within the range of 100 [mJ/cm2] to 1000 [mJ/cm2]. Accordingly, the amount of exposure is set to 200 [mJ/cm2] also in the second embodiment to radiate the exposure light 75.

In advance of this radiation, control may be performed for the position adjustment of the photomask 70 and the first transparent substrate 21, so that the positions of the mask patterns 71 overlap with the positions of the conductive light shielding patterns 30, as in the above-described first embodiment (position control step).

Then, the transparent photopolymer layer 41 after exposure is developed, and then thermal annealing (thermal annealing treatment) is performed under the conditions of 120 [° C.] and 30 [min]. Consequently, the conductive light shielding patterns 30 are exposed, and a plurality of light transmissive regions 40 is formed in positions complementary with the positions of these exposed conductive light shielding patterns 30 (FIG. 19D: transmissive region formation step).

The width of a space between each adjacent light transmissive regions 40 formed here is 5 [μm], and the refractive index of the light transmissive regions 40 formed from the above-mentioned chemically-amplified resist (trade-named "SU-8") is ranging from 1.5 to 1.6.

Subsequently, in the second embodiment, the protective cover film 80 is formed on the light transmissive regions 40 (FIG. 19E: protective cover formation step).

At this time, the protective cover film 80 is also formed on the conductive light shielding patterns 30, as illustrated in FIG. 19E. It is only necessary, however, to cover at least the upper surfaces 40a and side surfaces 40b of the light transmissive regions 40. The conductive light shielding patterns 30 therefore need not necessarily be covered as described above.

In the second embodiment, a silicon oxide film is adopted as the constituent material of the protective cover film 80, as described above, and the protective cover film 80 is formed so that the thickness thereof is 200 [nm].

Thereafter, a second transparent substrate 22 provided with a transparent conductive film 50 is placed on the respective light transmissive regions 40 covered with the protective cover film 80, as in the above-described first embodiment (FIG. 19F: transparent substrate placement step). Subsequently, each electrophoretic element 60 is filled in a gap between the first transparent substrate 21 and the second transparent substrate 22 (gap formed by the protective cover film 80 and the transparent conductive film 50) (FIG. 19G: electrophoretic element filling step).

Here, the patterning of the transparent photopolymer layer 41 may be performed by radiating exposure light 75 from the back side of the first transparent substrate 21 using the conductive light shielding patterns 30 as a photomask, as illustrated in FIGS. 20C and 20D (radiation and formation step).

Figure 20:
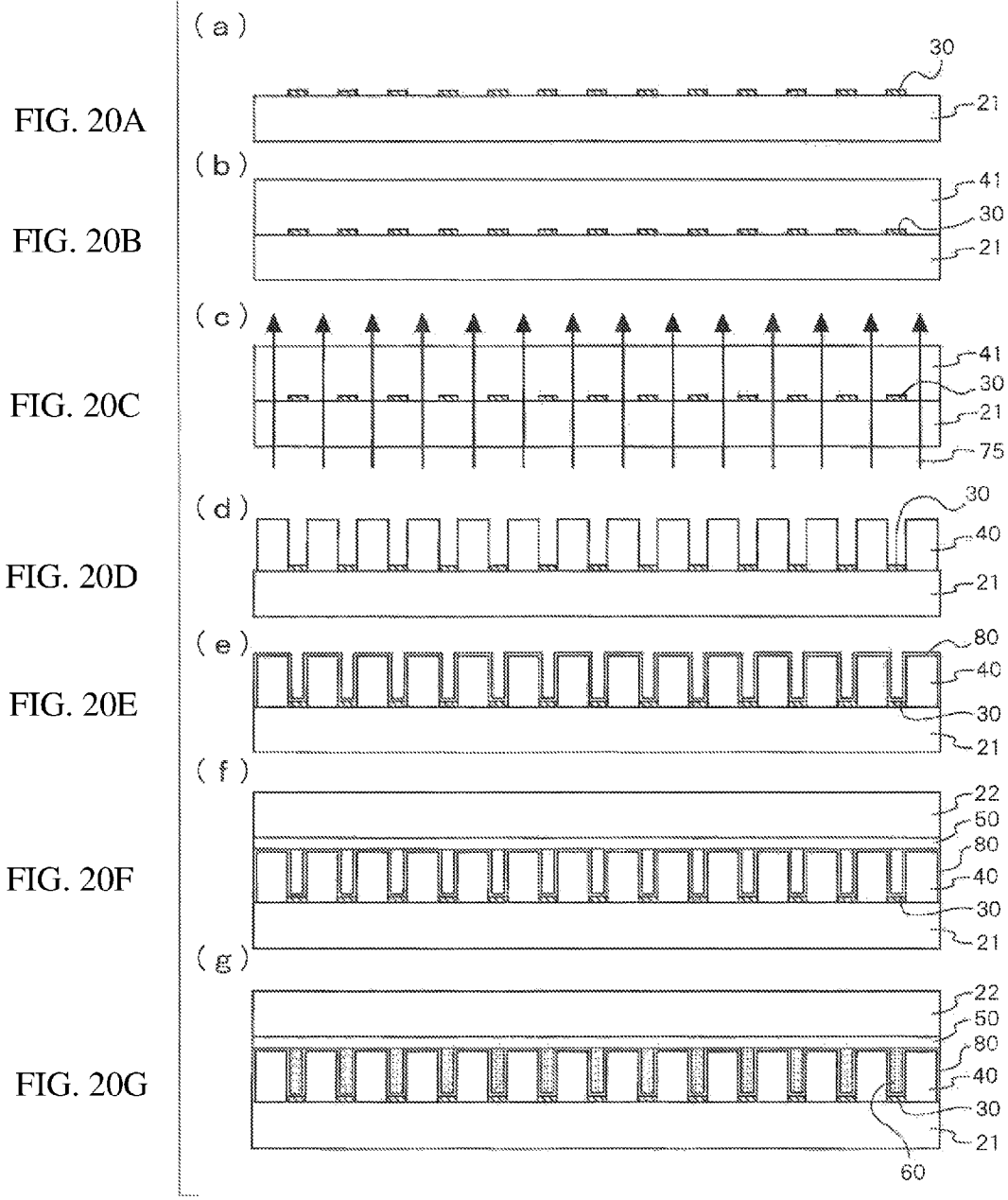
FIG. 20 is a group of cross-sectional views illustrating the conditions of steps, among the respective steps in the optical device manufacturing method disclosed in FIG. 19, according to the order of progress of FIG. 20A, FIG. 20B, FIG. 20C, FIG. 20D, FIG. 20E, and FIG. 20F, when a step of forming the light transmissive regions using the conductive light shielding patterns as a photomask is adopted in place of the steps of FIG. 19C and FIG. 19D.

That is, as illustrated in FIG. 20, the optical device 12 may also be manufactured in the order of FIG. 20A, FIG. 20B, FIG. 20C, FIG. 20D, FIG. 20E, and FIG. 20F, by adopting this radiation and formation step in place of the exposure light radiation step and the transmissive region formation step discussed in FIGS. 19C and 19D.

The light transmissive regions 40 can be formed from the transparent photopolymer layer 41 in a self-aligned manner with respect to the conductive light shielding patterns, by performing such back-surface exposure, thereby making it possible to secure an opening ratio as designed. It is also possible to achieve cost reductions since one mask's worth of costs can be reduced.

Note that the amount of exposure of the exposure light 75 used for exposure here is also preferably within the range of 100 [mJ/cm2] to 1000 [mJ/cm2]. Accordingly, the amount of exposure is also set to 200 [mJ/cm2] here to radiate the light.

(Advantageous Effects and the Like of Second Embodiment)

In the optical device 12 of the second embodiment, a configuration is adopted in which the upper surfaces 40a and the side surfaces 40b which are the exposed portions of the light transmissive regions 40 are covered with the protective cover film 80. Accordingly, the light transmissive regions 40 and the electrophoretic elements 60 are prevented from coming into contact with each other even if an electrophoretic element 60 composed of a material having adverse effects, such as dissolution or swelling, on a material constituting the light transmissive regions 40 is used. Thus, no adverse effects are exerted on the light transmissive regions 40 by the electrophoretic elements 60. As a result, it is possible to realize ray direction control with satisfactory operation stability.

In addition, the sealing property is improved as the result of the protective cover film 80 being added to the surroundings of the electrophoretic elements 60. Consequently, it is possible to add superior reliability to the optical device.

The rest of the configuration and the steps of the manufacturing method, as well as other consequent effects and actions, are the same as those discussed in the above-described first embodiment.

Third Embodiment

A third embodiment of an optical device in the present invention and modified examples of the embodiment will be described according to FIGS. 21 and 22. Here, the same reference numerals and characters are used for constituent members the same as those of the above-described first and second embodiments, and the constituent members will not be described again.

Figure 21:
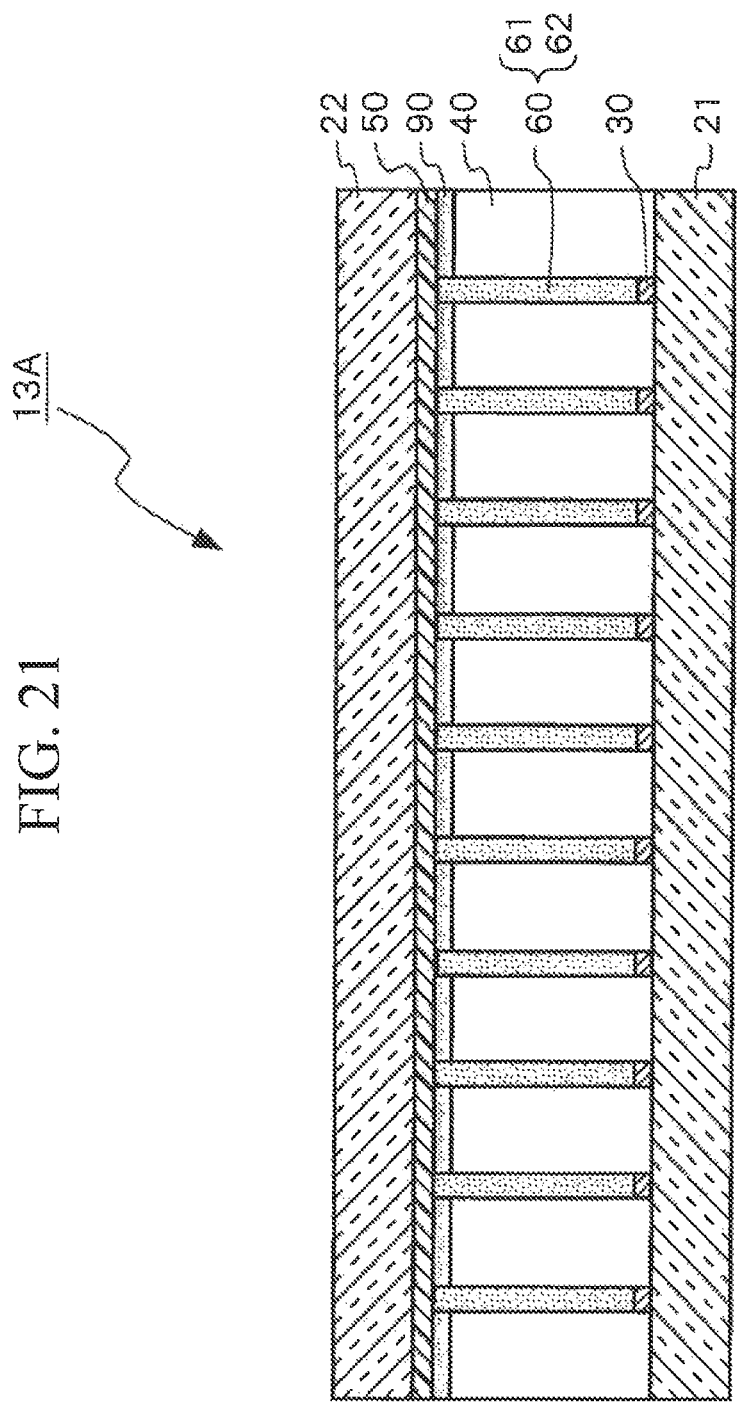
FIG. 21 is a cross-sectional view illustrating an optical device according to a third embodiment of the present invention in which light transmissive regions are exposed.
Figure 22:
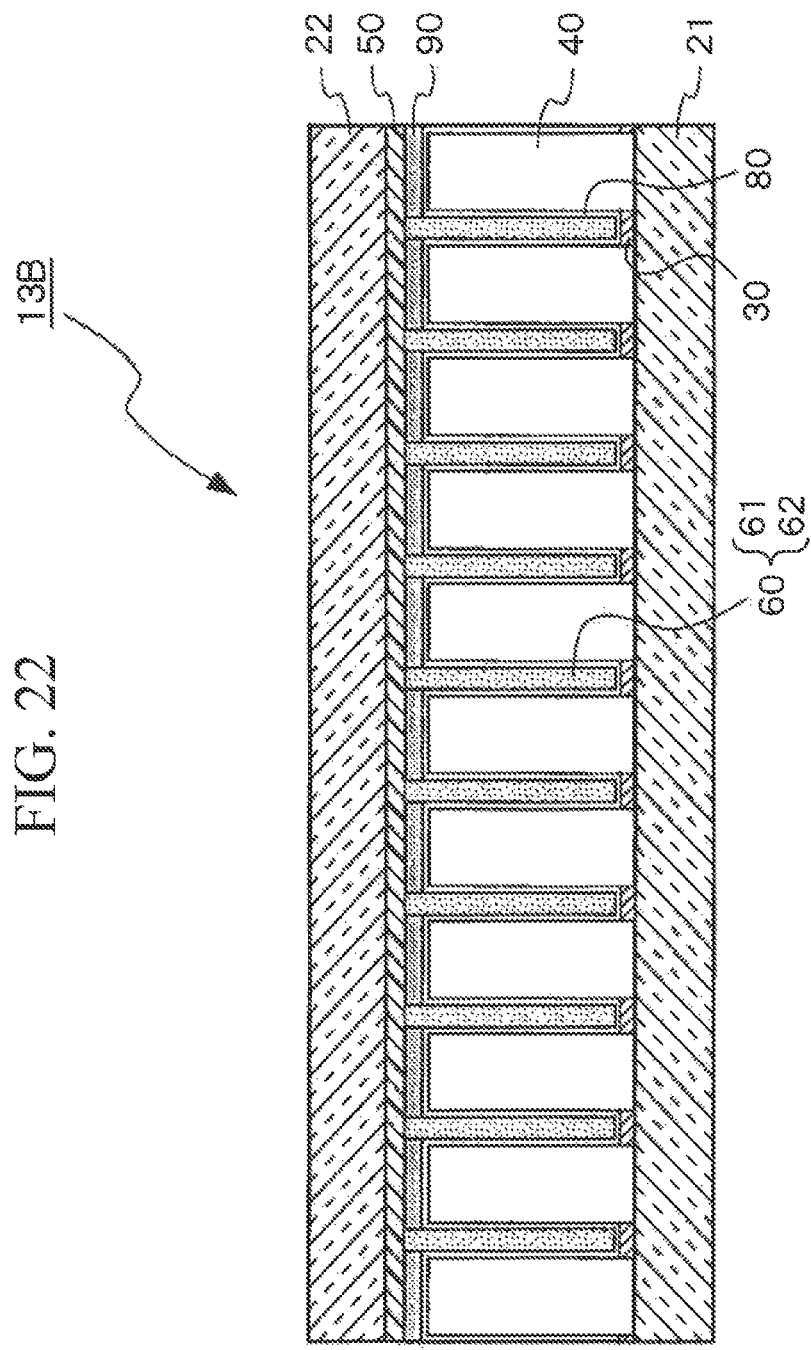
FIG. 22 is a cross-sectional view illustrating the optical device according to the third embodiment of the present invention in which a protective cover film is formed on the surfaces of the light transmissive regions.

FIG. 21 is a cross-sectional view illustrating an optical device of the third embodiment the light transmissive regions of which are exposed, whereas FIG. 22 is a cross-sectional view illustrating the optical device of the third embodiment in which a protective cover film is formed on the surfaces of the light transmissive regions.

As illustrated in FIGS. 21 and 22, an optical device 13A according to the third embodiment is characterized in that an adhesive layer 90 is interposed between the light transmissive regions 40 and the transparent conductive film 50, in addition to the same configuration as the configuration of the optical device 11 according to the above-described first embodiment.

That is, in this optical device 13A, the conductive light shielding patterns 30 and the light transmissive regions 40 are formed in order on the first transparent substrate 21, as in the above-described first embodiment. In addition, the transparent conductive film 50 and the second transparent substrate 22 are attached through the adhesive layer 90 disposed on these light transmissive regions 40.

The film thickness of the adhesive layer 90 is preferably within the range of 1 [um] to 100 [um]. Accordingly, this thickness is set to 10 [um] in the third embodiment.

UV-curable or thermosetting transparent resin can be adopted as the constituent material of the adhesive layer 90. Accordingly, the same resin as the constituent material of the light transmissive regions 40 is adopted in the third embodiment.

By providing the adhesive layer 90 between the light transmissive regions 40 and the transparent conductive film 50 as described above, it is possible to prevent the ingress of electrophoretic particles 61 into between the light transmissive regions 40 and the transparent conductive film 50.

Assume here that there are any electrophoretic particles 61 (invading electrophoretic particles) having tapped into between the light transmissive regions 40 and the transparent conductive film 50. Then, the invading electrophoretic particles have to travel a distance corresponding to the height of the side surfaces of the light transmissive regions 40 from there, when the electrophoretic particles 61 in the electrophoretic elements 60 are gathered at the nearby the conductive light shielding patterns 30 by forming electric fields across the transparent conductive film 50 and the conductive light shielding patterns 30, thus taking an extra traveling time and impairing fast operation.

In the third embodiment, however, the adhesive layer 90 is provided in order to prevent the electrophoretic particles 61 from tapping into between the light transmissive regions 40 and the transparent conductive film 50, as described above. Consequently, it is possible to eliminate an amount of time taken for the invading electrophoretic particles to travel to the nearby the conductive light shielding patterns 30 when the electrophoretic particles 61 migrate due to the formation of electric fields. Thus, it is possible to ensure operational promptness.

It is also possible to prevent the degradation of optical transmittance caused because not all of the invading electrophoretic particles can travel and some of the particles remain immobile when electric fields are formed.

Modified Examples

As illustrated in FIG. 21, an optical device 13B according to a modified example of the third embodiment is characterized in that the same adhesive layer 90 as described above is provided, in addition to the same configuration as the configuration of the optical device 12 according to the above-described second embodiment.

That is, in this optical device 13B, an adhesive layer 90 is disposed on the light transmissive regions 40 on which a protective cover film 80 is formed as in the above-described second embodiment. In addition, the transparent conductive film 50 and the second transparent substrate 22 are attached through this adhesive layer 90.

The film thickness and constituent material of the adhesive layer 90 are the same as described above.

(Advantageous Effects and the Like of Third Embodiment)

Both the optical device 13A having a structure in which the protective cover film 80 is not present and the optical device 13B having a structure in which the protective cover film 80 is formed, which are described in the third embodiment, include the adhesive layer 90 for preventing the electrophoretic particles 61 from tapping into between the light transmissive regions 40 and the transparent conductive film 50.

Accordingly, it is possible to prevent the problem of some of the electrophoretic particles 61 being disposed as the above-mentioned invading electrophoretic particles in a process for manufacturing the optical devices. Accordingly, it is possible to avoid giving rise to any extra traveling time when the electrophoretic particles 61 are gathered at the nearby the conductive light shielding patterns 30 by forming electric fields across the transparent conductive film 50 and the conductive light shielding patterns 30.

It is also possible to effectively prevent the degradation of optical transmittance caused because some of the invading electrophoretic particles, which have to otherwise travel to the nearby the conductive light shielding patterns 30 from between the light transmissive regions 40 and the transparent conductive film 50 when electric fields are formed, remain immobile.

The rest of the configuration and the steps of the manufacturing method, as well as other consequent effects and actions, are the same as those discussed in the above-described first and second embodiments.

Fourth Embodiment

A fourth embodiment of an optical device in the present invention will be described according to FIGS. 23 to 25.

Here, the same reference numerals and characters are used for constituent members the same as those of the above-described first to third embodiments, and the constituent members will not be described again.

Figure 23:
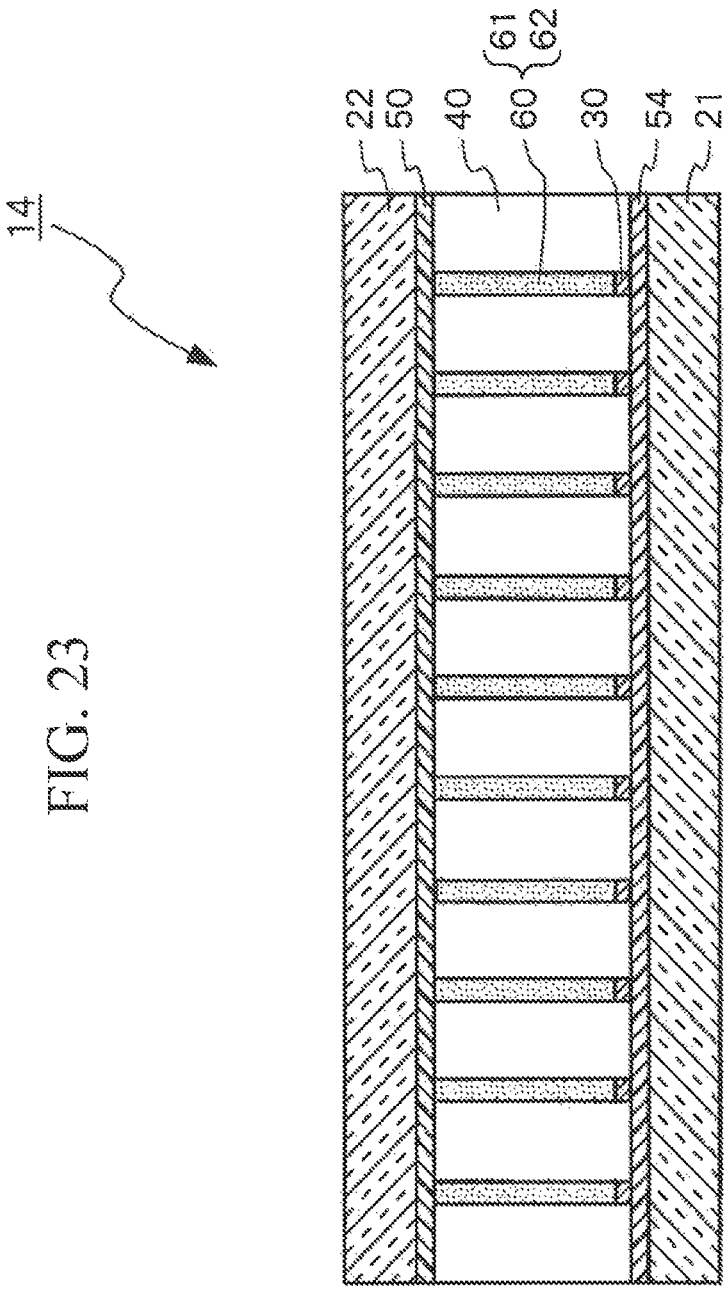
FIG. 23 is a cross-sectional view illustrating the narrow-field mode of an optical device in a fourth embodiment of the present invention.
Figure 24:
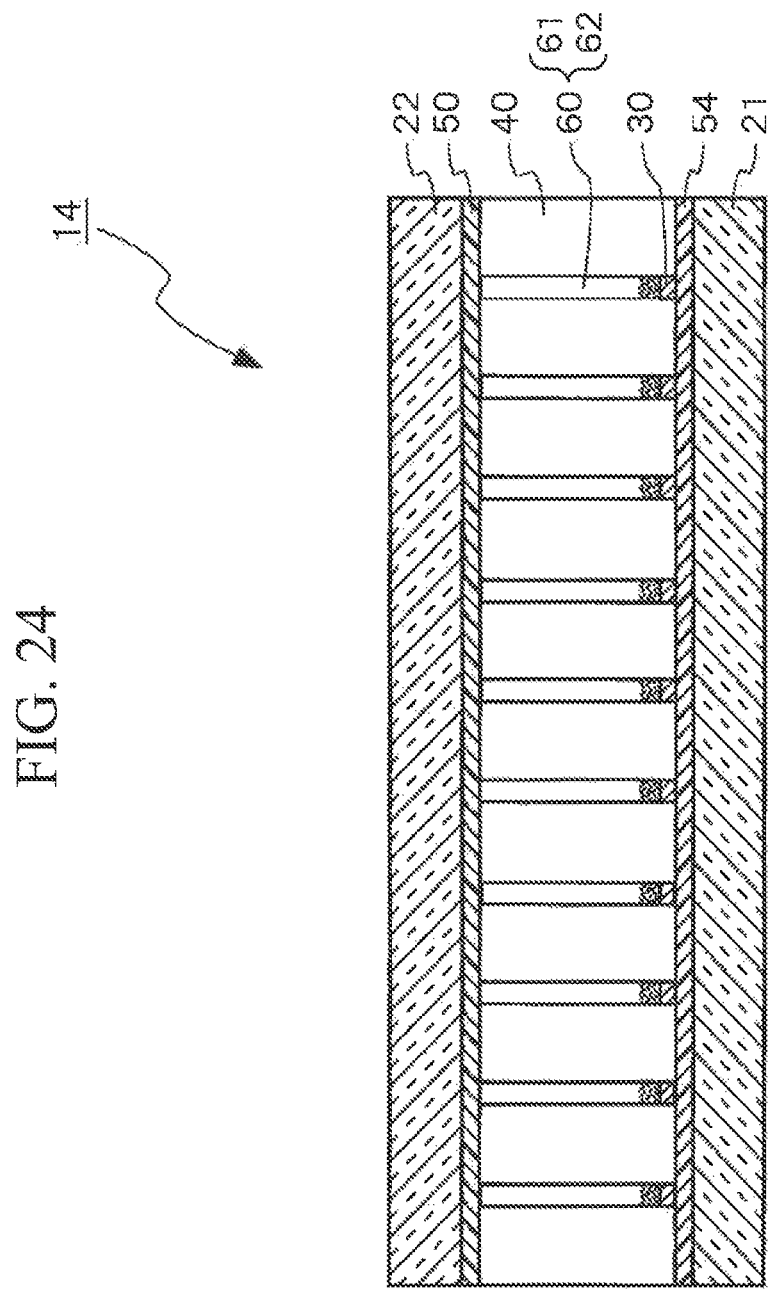
FIG. 24 is a cross-sectional view illustrating the wide-field mode of the optical device in the fourth embodiment of the present invention.

FIG. 23 is a cross-sectional view illustrating the narrow-field mode of the optical device of the fourth embodiment, whereas FIG. 24 is a cross-sectional view illustrating the wide-field mode of the optical device of the fourth embodiment.

As illustrated in FIGS. 23 and 24, an optical device 14 in the fourth embodiment is characterized by including another transparent conductive film (second transparent conductive film) 54 provided on the first transparent substrate 21, in addition to the same configuration as the configuration of the optical device 11 of the above-described first embodiment.

That is, another transparent conductive film 54 is disposed on the first transparent substrate 21, and conductive light shielding patterns 30 and light transmissive regions 40 are formed in order and disposed on this another transparent conductive film 54.

The thickness of another transparent conductive film 54 is suitably within the range of 10 [nm] to 1000 [nm]. Accordingly, this thickness is set to 100 [nm] in the fourth embodiment.

As the constituent material of another transparent conductive film 54, it is possible to adopt ITO, ZnO, IGZO or the like. Accordingly, ITO, among these materials, is adopted in the fourth embodiment.

Figure 25:
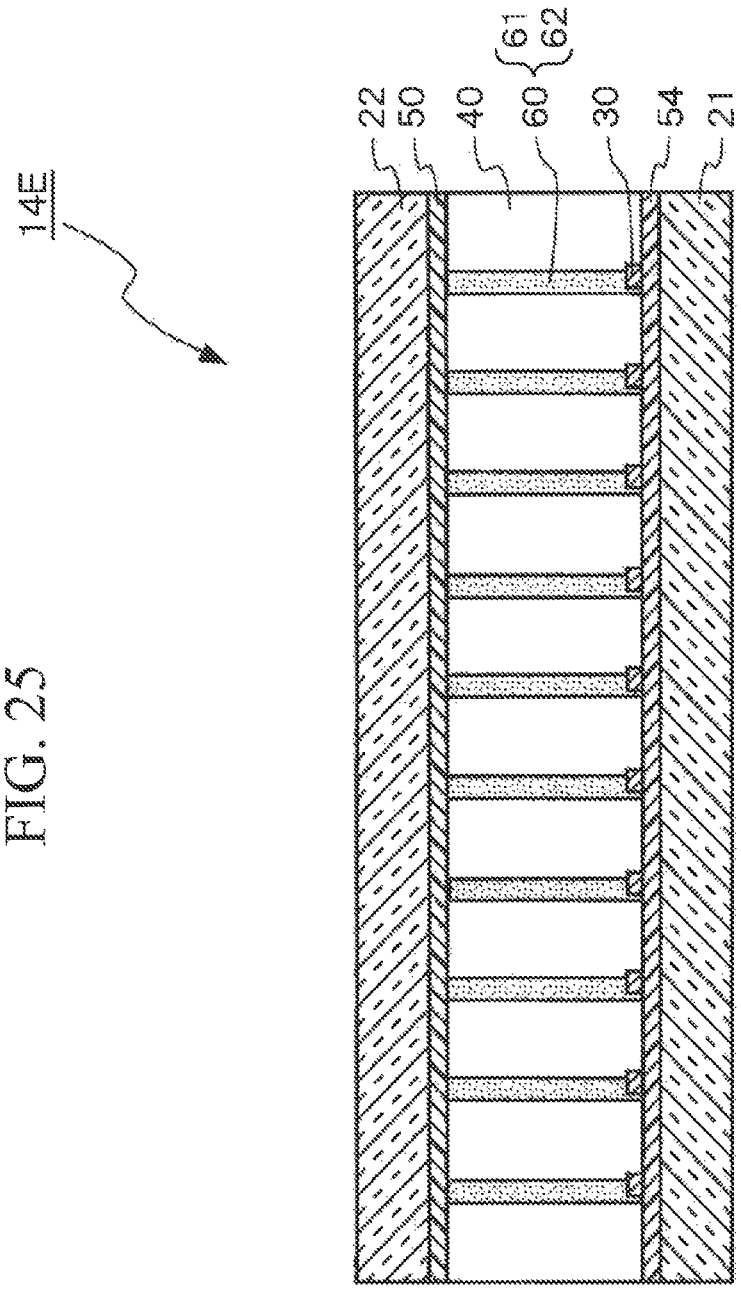
FIG. 25 is a cross-sectional view illustrating the optical device manufactured in the fourth embodiment with the relative positions of the conductive light shielding patterns and the light transmissive regions displaced.

By configuring the optical device 14 such that another transparent conductive film 54 is interposed between the first transparent substrate 21 and the conductive light shielding patterns 30 as described above, it is possible to effectively operate the electrophoretic elements 60 using another transparent conductive film 54, even if the conductive light shielding patterns 30 and the light transmissive regions 40 are displaced from ideal positions, as represented by an optical device 14E illustrated in FIG. 25, in a process for manufacturing the optical device 14E.

It is possible to secure conduction by another transparent conductive film 54 even if disconnection or the like occurs in the conductive light shielding patterns 30. This makes it possible to prevent operational failure and the like from arising due to the disconnection of the conductive light shielding patterns 30. As a result, it is possible to manufacture an optical device capable of realizing ray direction control with satisfactory operation stability.

(Advantageous Effects and the Like of Fourth Embodiment)

In the optical device 14 according to the fourth embodiment, a configuration and a manufacturing process are adopted in which another transparent conductive film 54, to which electric fields can be applied externally, is provided on the first transparent substrate 21, and the conductive light shielding patterns 30 are formed on this film. Accordingly, even if disconnection, positional displacement (positional errors relative to the electrophoretic elements 60 due to manufacturing conditions), or the like occurs in the conductive light shielding patterns 30, it is possible to effectively realize mode switching control and the like using another transparent conductive film 54.

The rest of the configuration and the steps of the manufacturing method, as well as other consequent effects and actions, are the same as those discussed in the above-described first to third embodiments.

Fifth Embodiment

A fifth embodiment of an optical device in the present invention will be described according to FIGS. 26 to 28.

Here, the same reference numerals and characters are used for constituent members the same as those of the above-described first to fourth embodiments, and the constituent members will not be described again.

Figure 26:
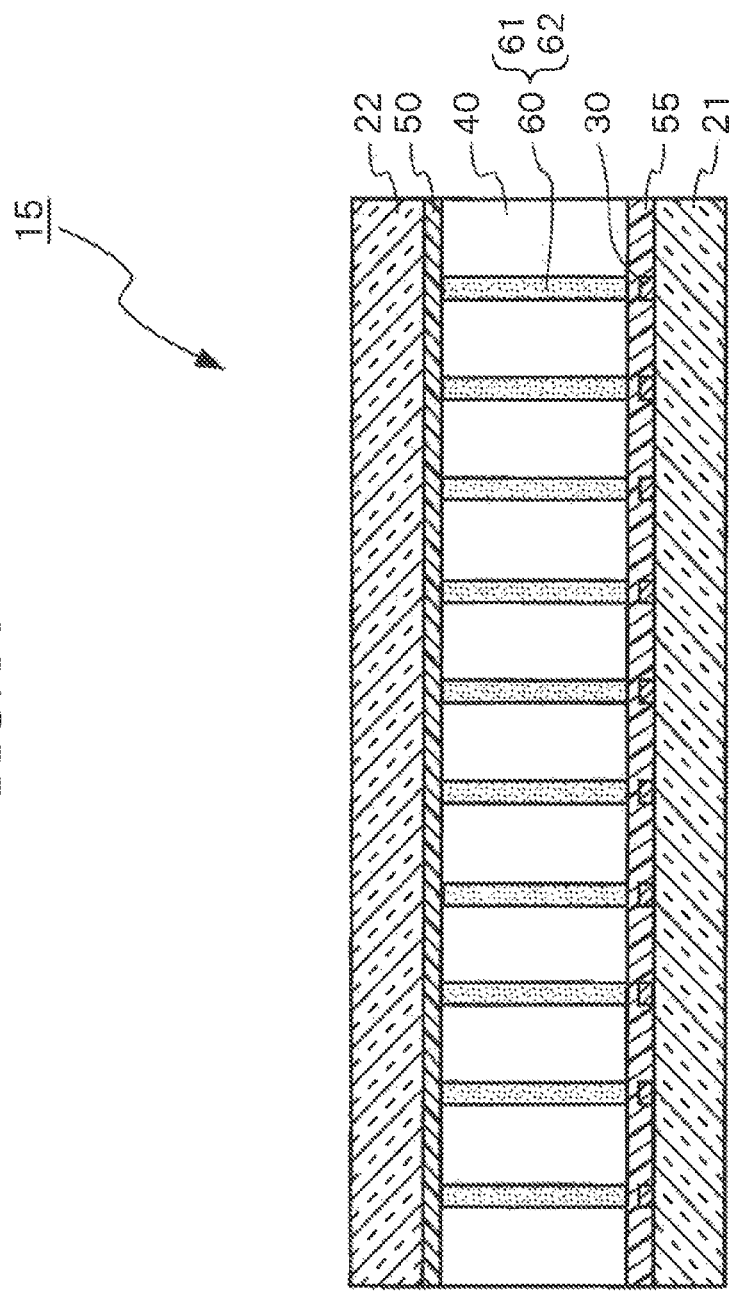
FIG. 26 is a cross-sectional view illustrating the narrow-field mode of an optical device in a fifth embodiment of the present invention.
Figure 27:
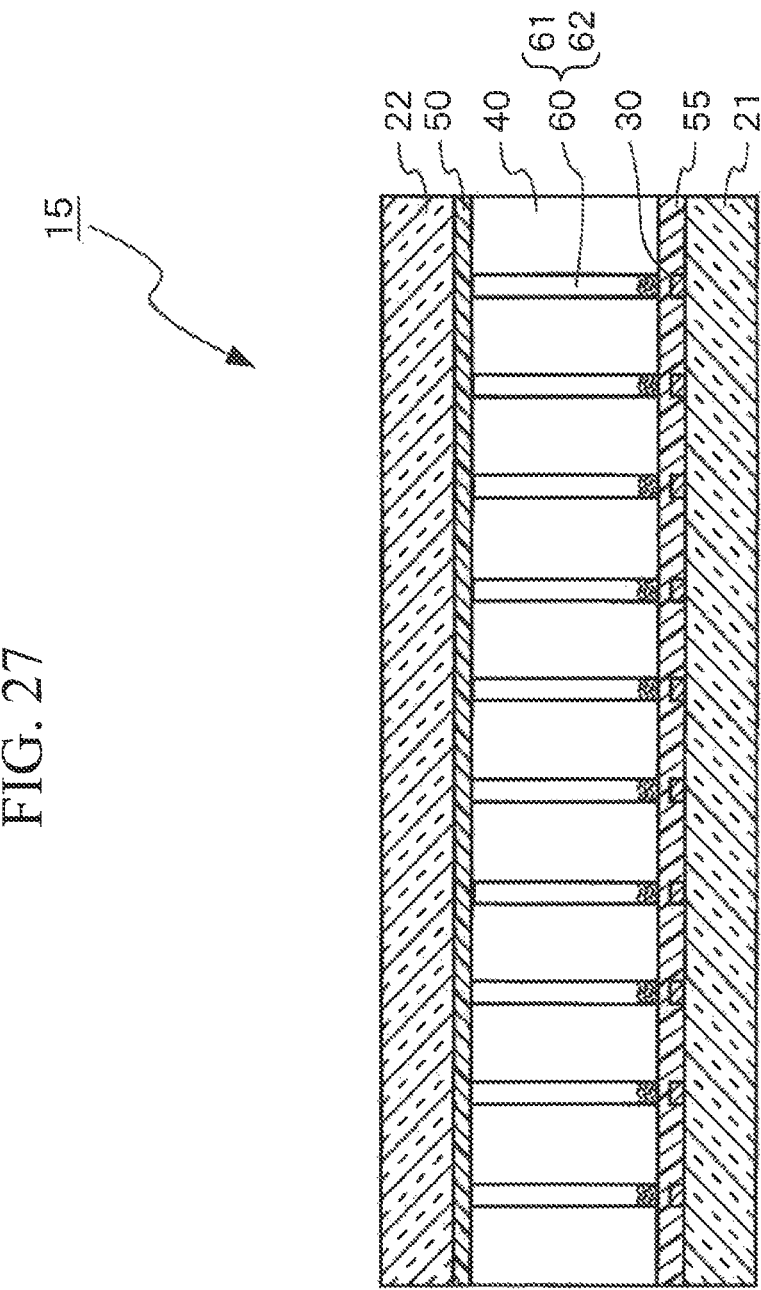
FIG. 27 is a cross-sectional view illustrating the wide-field mode of the optical device in the fifth embodiment of the present invention.

FIG. 26 is a cross-sectional view illustrating the narrow-field mode of the optical device of the fifth embodiment, whereas FIG. 27 is a cross-sectional view illustrating the wide-field mode of the optical device of the fifth embodiment.

As illustrated in FIGS. 26 and 27, an optical device 15 in the fifth embodiment is characterized by including another transparent conductive film (third transparent conductive film) 55 provided on conductive light shielding patterns 30 formed on a first transparent substrate 21, in addition to the same configuration as the configuration of the optical device 11 according to the above-described first embodiment.

That is, another transparent conductive film 55 is disposed on the conductive light shielding patterns 30 disposed on the first transparent substrate 21, and light transmissive regions 40 are formed and disposed on this another transparent conductive film 55.

The thickness of another transparent conductive film 55 is preferably within the range of 10 [nm] to 1000 [nm]. Accordingly, this thickness is set to 100 [nm] in the fifth embodiment.

As the constituent material of another transparent conductive film 55, it is possible to adopt ITO, ZnO, IGZO or the like. Accordingly, ITO, among these materials, is also adopted in the fifth embodiment.

(Advantageous Effects and the Like of Fifth Embodiment)

Figure 28:
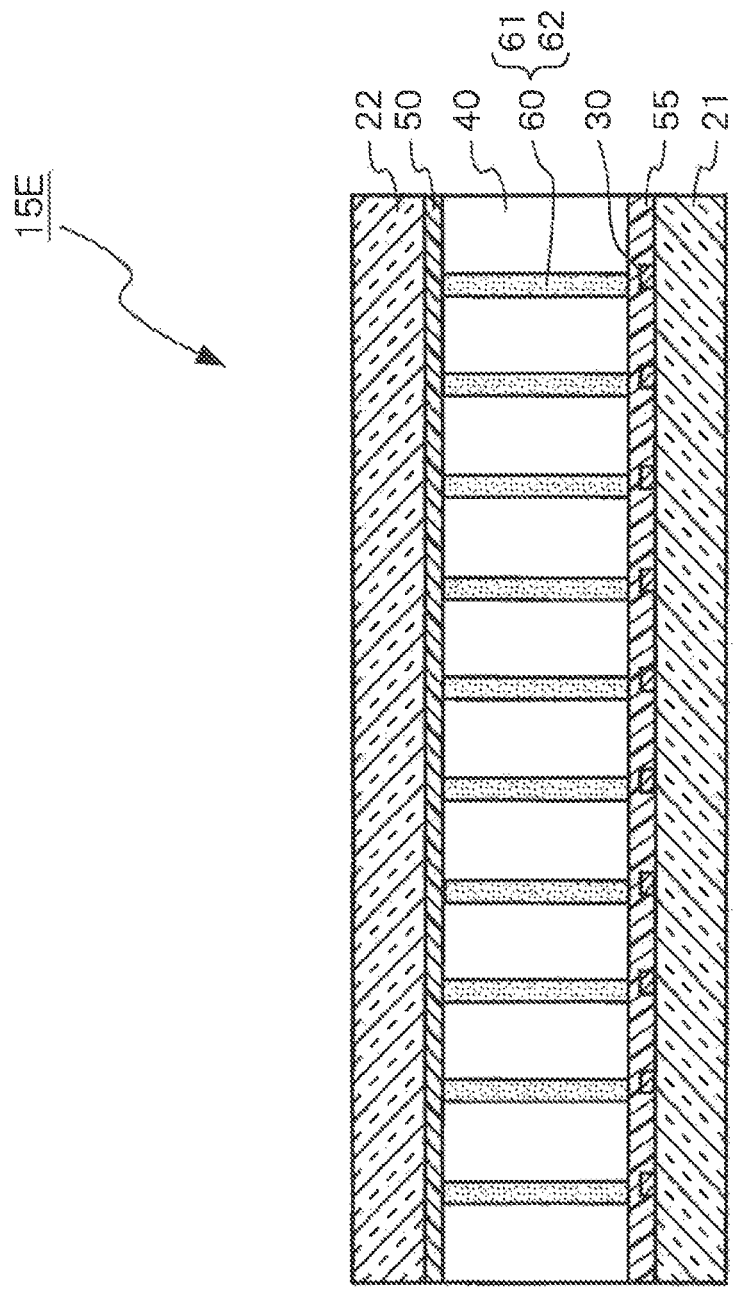
FIG. 28 is a cross-sectional view illustrating the optical device manufactured in the fifth embodiment with the relative positions of the conductive light shielding patterns and the light transmissive regions displaced.

By disposing another transparent conductive film 55 on the first transparent substrate 21 on which the conductive light shielding patterns 30 are formed, as described above, it is possible to effectively operate the electrophoretic elements 60 using another transparent conductive film 55, even if the relative positions of the conductive light shielding patterns 30 and the light transmissive regions 40 are displaced, as represented by an optical device 15E illustrated in FIG. 28.

It is possible to secure conduction by another transparent conductive film 55 as in the above-described fourth embodiment even if disconnection or the like occurs in the conductive light shielding patterns 30. This makes it possible to prevent operational failure and the like from arising due to the disconnection of the conductive light shielding patterns 30.

Since the optical device 15, for example, is manufactured by being made to go through the step of forming another transparent conductive film 55 after the conductive light shielding patterns 30 are formed, any damage or the like due to the formation of the conductive light shielding patterns 30 is not caused to another transparent conductive film 55 (there is no concern about causing damage or the like to another transparent conductive film 55 when forming the conductive light shielding patterns 30). Accordingly, it is possible to reliably ensure conduction based on another transparent conductive film 55. As a result, it is possible to realize ray direction control with more satisfactory operation stability.

The rest of the configuration and the steps of the manufacturing method, as well as other consequent effects and actions, are the same as those discussed in the above-described first to fourth embodiments.

Sixth Embodiment

A sixth embodiment of an optical device in the present invention will be described according to FIGS. 39 and 40.

Here, the same reference numerals and characters are used for constituent members the same as those of the above-described first to fifth embodiments, and the constituent members will not be described again.

FIG. 39 is a group of cross-sectional views illustrating the optical device of the sixth embodiment, where FIG. 39A illustrates a narrow-field mode, whereas FIG. 39B illustrates a wide-field mode. As illustrated in FIGS. 39A and 39B, an optical device 710 in the sixth embodiment is characterized by including an antireflection pattern 800 provided between each conductive light shielding pattern 30 formed on a first transparent substrate 21 and the first transparent substrate 21, in addition to the same configuration as the configuration of the optical device 11 according to the above-described first embodiment.

That is, the antireflection patterns 800 and the conductive light shielding patterns 30 are disposed in order on the first transparent substrate 21, and light transmissive regions 40 are formed and disposed on the portions of the first transparent substrate 21 where these antireflection patterns 800 and conductive light shielding patterns 30 are not formed.

As the constituent material of the antireflection patterns 800, it is possible to adopt ITO, Cr2O3, titanium nitride, aluminum nitride, carbon nanowire, or the like. Accordingly, ITO is also adopted in the sixth embodiment.

The thickness of the antireflection patterns 800 is preferably within the range of 10 [nm] to 1000 [nm]. Accordingly, this thickness is set to 100 [nm] in the sixth embodiment.
(Advantageous Effects and the Like of Sixth Embodiment)

If the conductive light shielding patterns 30 are directly disposed on a surface of the first transparent substrate 21 as illustrated in FIG. 40A, incident light 750 reflects in an interfacial boundary between the first transparent substrate 21 and the conductive light shielding patterns 30, and therefore, reflected light 780 is emitted, thus degrading image quality. In contrast, the reflected light 780 can be prevented from being produced by disposing each antireflection pattern 800 between the first transparent substrate 21 and each conductive light shielding pattern 30 as illustrated in FIG. 40B. Thus, it is possible to prevent the degradation of image quality.

Seventh Embodiment

A seventh embodiment of an optical device in the present invention will be described according to FIGS. 41 and 42.

Here, the same reference numerals and characters are used for constituent members the same as those of the above-described first to sixth embodiments, and the constituent members will not be described again.

FIG. 41 is a group of cross-sectional views illustrating the optical device of the seventh embodiment, where FIG. 41A illustrates a narrow-field mode, whereas FIG. 41B illustrates a wide-field mode. As illustrated in FIGS. 41A and 41B, an optical device 810 in the seventh embodiment is disposed with the front and back sides thereof reversed so that light is input from the transparent conductive film 50 side, in addition to the same configuration as the configuration of the optical device 710 according to the above-described sixth embodiment.
(Advantageous Effects and the Like of Seventh Embodiment)

Figure 42:
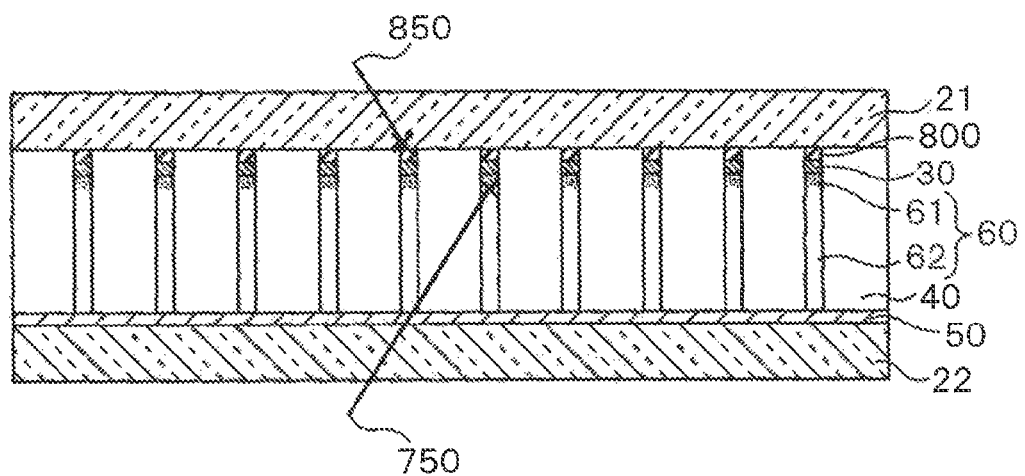
FIG. 42 is a drawing illustrating trajectories of incident light and external light in the optical device of the seventh embodiment of the present invention.

By disposing the transparent conductive film 50 on the light input side and the conductive light shielding patterns 30 and the antireflection patterns 800 on the light output side as described above, electrophoretic particles 61 are allowed to constantly locate on the surfaces of the conductive light shielding patterns 30 as illustrated in FIG. 42. Accordingly, it is possible to prevent any double images due to the reflection of the incident light 750 from being produced, with the result that external light 850 is also prevented by the antireflection patterns 800 from reflecting on the surfaces of the conductive light shielding patterns 30. Thus, it is possible to prevent contrast degradation due to external light reflection.

The rest of the configuration and the steps of the manufacturing method, as well as other consequent effects and actions, are the same as those discussed in the above-described first to sixth embodiments.

Other Embodiments

The optical devices described in the respective embodiments are applicable to not only liquid crystal display devices but also other display devices equipped with a display panel, such as organic EL displays, inorganic EL displays, LED displays, and plasma displays.

As modes for using an optical device according to the present invention, various types of usage can be assumed, including using the optical device by directly attaching the device to a surface of a display panel or using the optical device by building the device in a display device.

Hence, configurations in these various modes of use will be specifically described according to FIGS. 29 to 34.

In these figures, examples are shown in which optical devices the same as or similar to the optical device 11 of the above-described first embodiment are applied to various display devices and the like. Alternatively, the respective optical devices (12 to 15, 710 and 810, for example) described in the second to seventh embodiments may be applied.

Accordingly, unless otherwise specified, the above-mentioned optical devices 11 to 15, 710, 810 and the like will be hereinafter generically referred to as an optical device 10 to discuss each configuration.

(Display Devices)

First, display devices equipped inside with the optical device 10 in another embodiment of the present invention will be described according to FIGS. 29 to 32.

Figure 29:
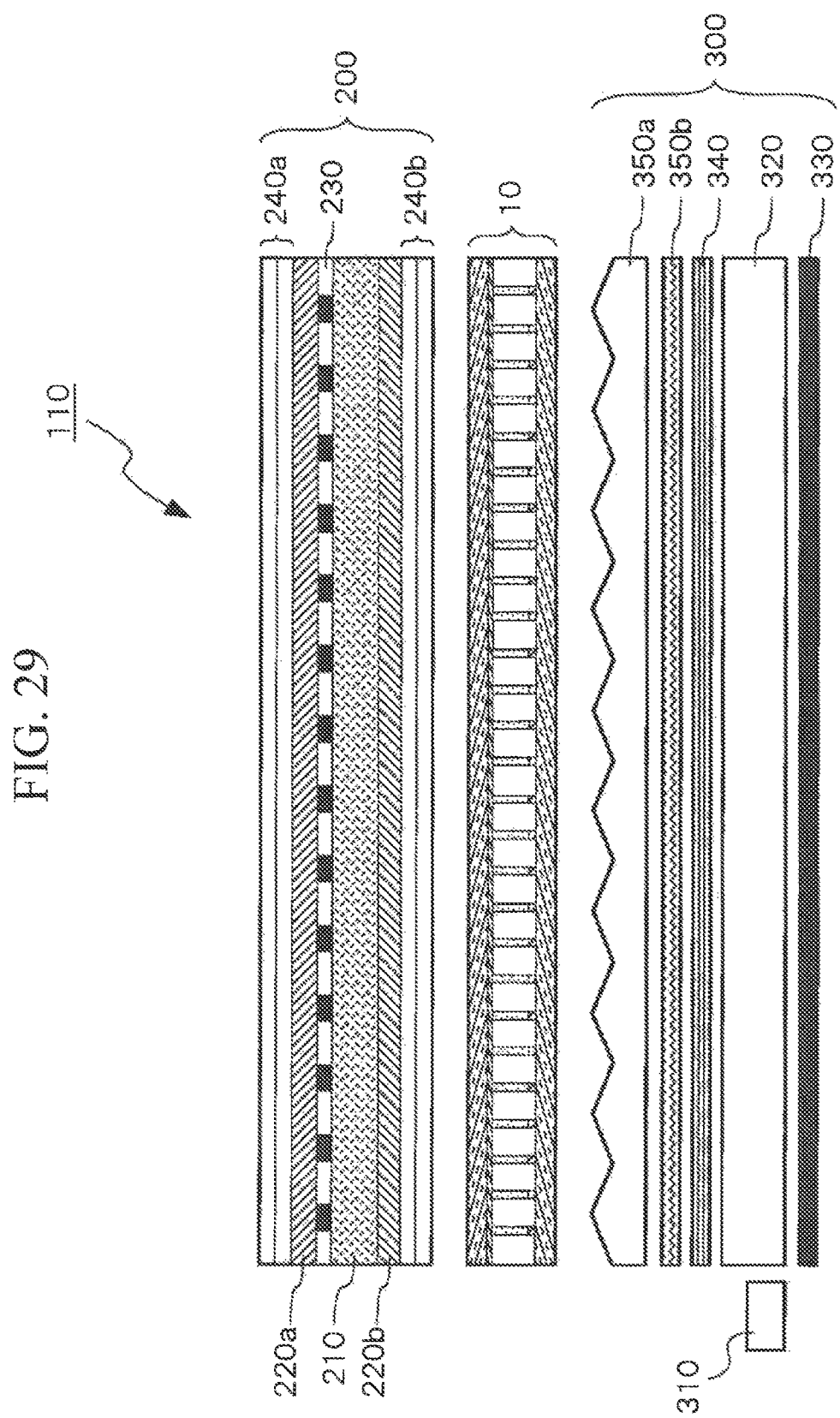
FIG. 29 is a cross-sectional view illustrating the configuration of a display device equipped inside with the optical device disclosed in, for example, FIG. 1 in another embodiment of the present invention.

A display device 110 illustrated in FIG. 29 includes an optical control device 200, a planar light source (backlight) 300 for illuminating this optical control device 200, and an optical device 10 provided between the optical control device 200 and the planar light source 300.

The optical device 10 has a configuration capable of realizing a narrow-field mode and a wide-field mode, as discussed in the above-described respective embodiments.

The planar light source 300 includes a light source 310 as typified by a cold-cathode tube, a light guide plate 320 for uniformly emitting incident light from this light source 310 out of a surface of the plate, a reflection sheet 330 for reflecting light emitted from the back side of this light guide plate 320 toward a surface direction, a diffuser panel 340 for diffusing light input from the light guide plate 320, and first and second prism sheets 350a and 350b for enhancing the luminance of light input from the light guide plate 320 through this diffuser panel 340, as illustrated in FIG. 29, and is configured such that light passing through these first and second prism sheets 350a and 350b enters the optical control device 200 through the optical device 10.

By way of more specific description, the light guide plate 320 is composed of acrylic resin or the like and configured so that light input from the light source 310 propagates through the interior of the plate to one end face thereof and is uniformly emitted from the surface (predetermined side surface) side.

The reflection sheet 330 for reflecting light emitted from the back side of the light guide plate 320 toward the surface direction is provided on the back side. In addition, reflection means (not illustrated) for reflecting light emitted from the other end face and the side surfaces of the light guide plate 320 toward the surface direction are likewise provided on these respective surfaces.

The light guide plate 320 is configured so that light emitted from a surface of the light guide plate 320 enters the optical control device 200 through the diffuser panel 340 and the first and second prism sheets 350a and 350b.

The diffuser panel 340 is used to diffuse light input from the light guide plate 320.

Since the luminance of emitted light differs between the left- and right-side ends of the light guide plate 320 for reasons of the structure thereof, the display device is configured to diffuse light from this light guide plate 320 with the diffuser panel 340.

The first and second prism sheets 350a and 350b have the function of improving the luminance of light input from the light guide plate 320 through the diffuser panel 340.

The first prism sheet 350a is composed of a plurality of prisms disposed unidirectionally at a constant pitch. The second prism sheet 350b is configured in the same way as described above. These prism sheets are configured, however, so that the directions of regular arrangement of prisms in the respective prism sheets intersect with each other.

That is, the first and second prism sheets 350a and 350b are configured so that the direction of regular arrangement of prisms in the second prism sheet 350b intersects with the direction of regular arrangement of prisms in the first prism sheet 350a.

Since these first and second prism sheets 350a and 350b function effectively, it is possible to enhance the directionality of light diffused by the diffuser panel 340.

The optical control device 200 has a structure in which a liquid crystal layer 210 is sandwiched by the first substrate 220a and the second substrate 220b.

A color filter 230 is formed on one surface (surface on the liquid crystal layer 210 side) of the first substrate 220a, and a first polarization and retardation plate 240a is provided on the other surface.

A second polarization and retardation plate 240b is provided on a surface of the second substrate 220b on the opposite side of the liquid crystal layer 210-side surface.

In the color filter 230, R (red), G (green) and B (blue) color filters are disposed into a matrix-like shape in regions divided off by a black matrix composed of a light-absorbing layer. The respective color filters correspond to pixels, and the pitch of the pixels is constant.

The liquid crystal layer 210 can switch between a transparent state and a light shielding state in units of pixels, according to control signals from a control unit (not illustrated). The liquid crystal layer 210 can therefore spatially modulate input light by means of this status switching.

Figure 30:
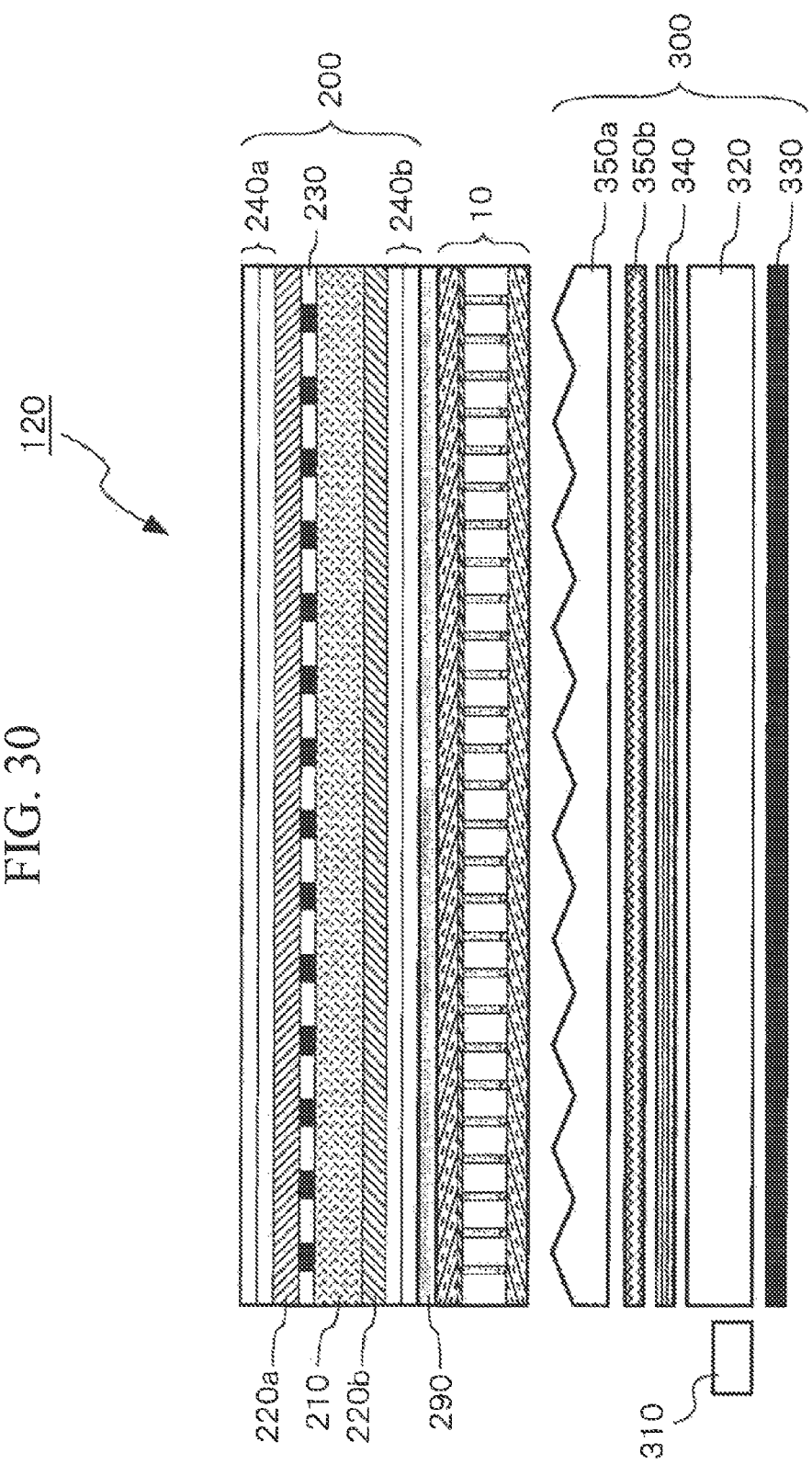
FIG. 30 is a cross-sectional view illustrating the configuration of a display device inside which the optical device disclosed in, for example.

Alternatively, as a display device 120 illustrated in FIG. 30, the display device 110 may be configured such that the optical device 10 is attached to the second polarization and retardation plate 240b of the optical control device 200 using a transparent adhesive layer 290. That is, this display device 120 includes the transparent adhesive layer 290 interposed between the optical control device 200 and the optical device 10, in addition to the constituent elements included by the above-described display device 110.

By configuring the display device 110 such that the second transparent substrate 22 side surface of the optical device 10 is attached to the optical control device 200 as described above, scattering light can be prevented from being produced between the two devices. Thus, transmissivity is improved to enable the further enhance of the luminance of the display device.

According to the display devices 110 and 120 configured as described above, it is possible to previously perform control for focusing or not focusing illuminating light of the optical control device 200 received from the planar light source 300 in the front direction of a screen using the optical device 10. Consequently, it is possible to select between the states of narrow and wide viewing angles as appropriate, according to an observer's preferences.

Next, a description will be made of a mode for using the optical device 10 according to the present invention by disposing the optical device on a surface of the optical control device 200 (display panel).

Figure 31:
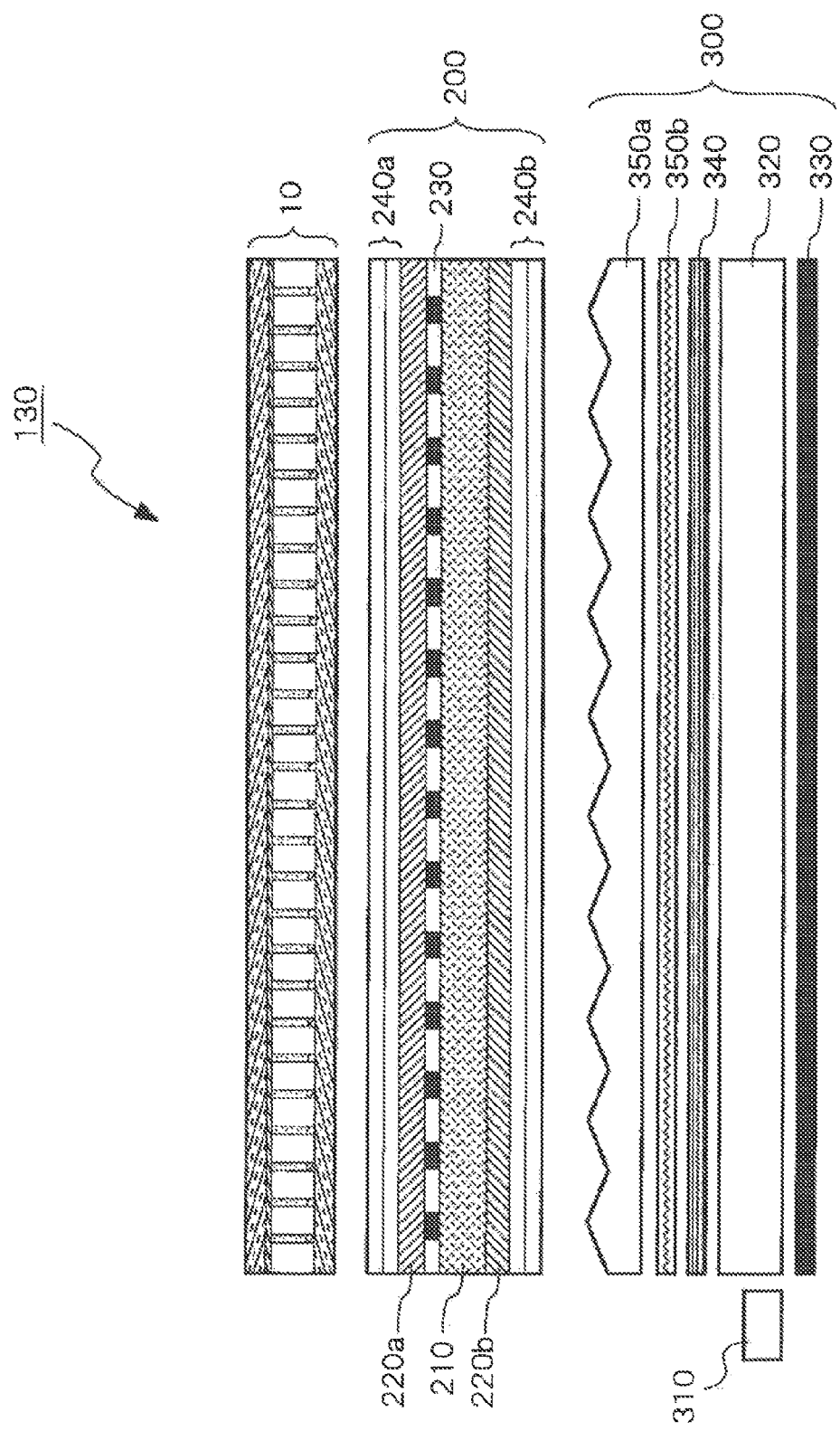
FIG. 31 is a cross-sectional view illustrating the configuration of a display device in which the optical device disclosed in, for example.

As illustrated in FIG. 31, a display device 130 is configured by modifying the layout of the respective constituent members of the above-described display device 110.

That is, the above-described display device 110 is configured such that the planar light source 300, the optical device 10 and the optical control device 200 are disposed in this order. On the other hand, the display device 130 has a configuration in which the optical control device 200 and the optical device 10, among these constituent members, are interchanged with each other. Accordingly, the optical control device 200 is directly illuminated by light passing through the first and second prism sheets 350a and 350b.

In this display device 130, light passing through the first and second prism sheets 350a and 350b enters the second polarization and retardation plate 240b. Light passing through this polarization and retardation plate 240b enters the liquid crystal layer 210 through the second substrate 220b, and is spatially modulated therein in units of pixels.

Light (modulated light) passing through the liquid crystal layer 210 passes through the color filter 230 and the first substrate 220a in order and enters the first polarization and retardation plate 240a.

Light passing through the first polarization and retardation plate 240a is emitted through the optical device 10.

Figure 32:
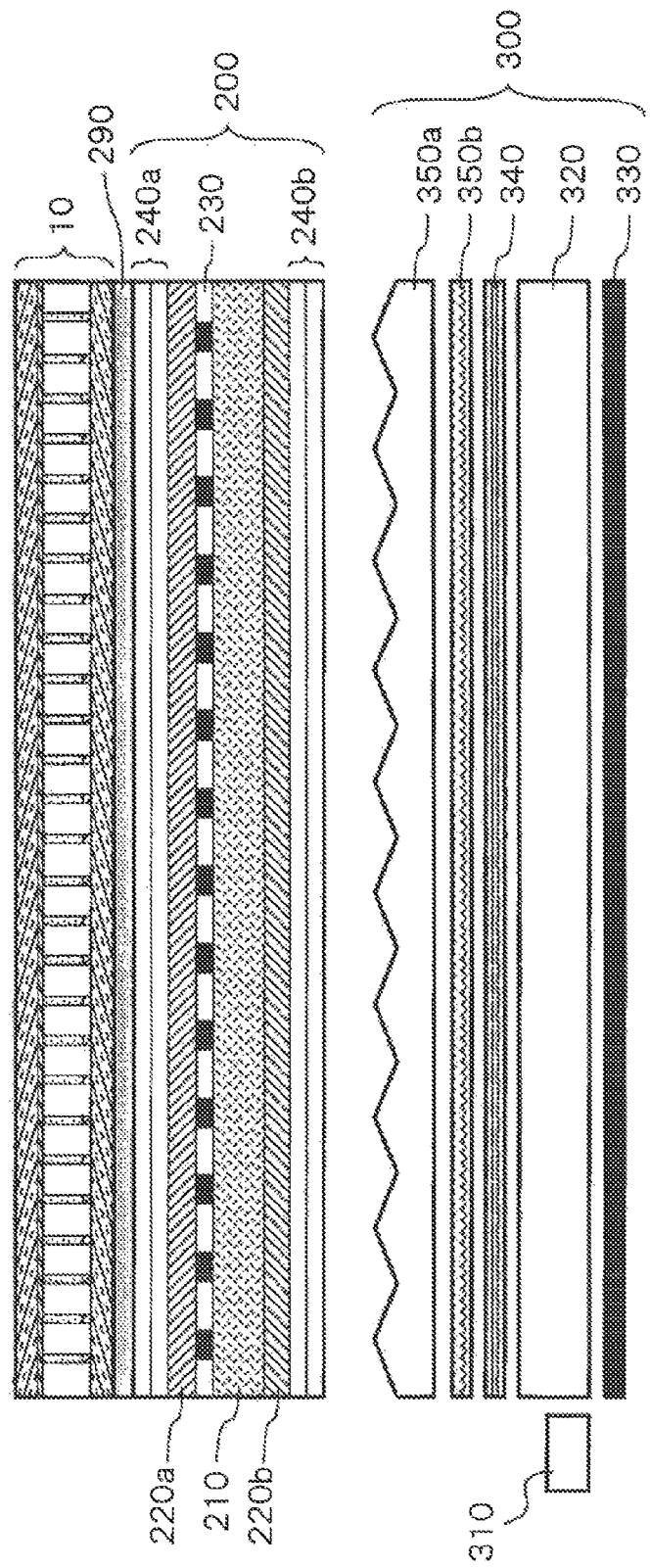
FIG. 32 is a cross-sectional view illustrating the configuration of a display device in which the optical device disclosed in, for example.

Alternatively, as in a display device 140 illustrated in FIG. 32, the optical device 10 may be attached to the first polarization and retardation plate 240a of the optical control device 200 through the transparent adhesive layer 290. By configuring the display device 130 in this way, it is possible to reduce surface reflection loss in an interfacial boundary between the optical device 10 and the first polarization and retardation plate 240a. Thus, it is possible to further enhance the luminance of the display device.

In summary of points of the display device according to the present embodiment, the display device includes a display (optical control device 200) provided with a visual surface for displaying images, and the optical device 10 disposed on the visual surface of this display. As the above-mentioned display, it is possible to adopt a liquid crystal display, a plasma display, an inorganic EL display, a field-emission display, a cathode-ray tube, a fluorescent display tube, or the like.

The display device may be configured such that the above-mentioned display and the optical device 10 are fixed by the transparent adhesive layer 290.

If a liquid crystal display is adopted as the above-mentioned display, the display device according to the present embodiment may be configured such that the display device is provided with a backlight disposed on the back side of this liquid crystal display to radiate light to the liquid crystal display, and the optical device 10 is disposed between this backlight and the liquid crystal display.

In this case, the display device may be configured such that the liquid crystal display and the optical device 10 are fixed by the transparent adhesive layer 290.

According to the display devices 130 and 140 configured as described above, it is possible to focus or not focus light emitted from the optical control device 200 in the front direction of a screen using the optical device 10 disposed on the foremost surface of the display device.

That is, the display devices are configured so that light passing through the optical device 10 directly reaches an observer, and therefore, light emitted from the optical device 10 does not scatter, deflect or reflect. Accordingly, the display device 130 and 140 can provide even more high-resolution clear images, compared with a display device equipped inside with an optical device.

Here, in FIGS. 29 to 32, an example is cited in which the first and second polarization and retardation plates 240a and 240b having a structure in which a polarization plate and a retardation plate are stacked are used as the constituent members of the optical control device 200. The constituent members included by the display device in the present embodiment are not limited to such a structure, however.

That is, a member composed only of a polarization plate (not including a retardation plate), for example, may be adopted in place of one or both of the first and second polarization and retardation plates 240a and 240b.

A hard coat layer for protection from scratches, an anti-reflection layer for preventing external light reflection, and the like may be formed on a surface of the optical device 10.

(Electronic Device)

The optical device 10 according to the present invention can also be widely applied to various hand-held information-processing devices, including mobile phones, notebook-size personal computers, feature phones, smartphones, tablets, and PDAs.

Hence, the configuration of an electronic device according to the present embodiment provided with an optical device 10, and a light source provided on the back side of a first transparent substrate 21 (surface on the opposite side of the principal surface 21a; see FIG. 1) included by this optical device 10 will be described according to FIG. 33 illustrating examples of application to such electronic devices.

An electronic device 150 illustrated by way of example in FIG. 33A is configured to include one of the above-described display devices 110, 120, 130 and 140 in a device body (electronic device body) 151 provided with a display means for displaying images outward (corresponding to the above-mentioned smartphone).

An electronic device 160 illustrated by way of example in FIG. 33B is provided with a main unit 161 including a display section 161A and an operation control section 161B, and a mouse 162 for user operation, and one of the above-described display devices 110, 120, 130 and 140 is built in the main unit 161 (display section 161A) (corresponding to the above-mentioned notebook-size personal computer).

Such an information-processing terminal cited as an electronic device is configured to perform control, so that a control unit provided in the terminal accepts inputs from an input unit, such as a mouse, a keyboard or a touch panel, and necessary information is displayed on a display device mounted as a display means.

Here, one of the above-described display devices 110, 120, 130 and 140 may be applied to various plasma-type display devices.

(Illuminating Optical Device)

Next, the configuration of an illuminating optical device (illuminating device) of the present embodiment equipped with an optical device according to the present invention will be described according to FIG. 34.

It should be noted that one of the microlouvers in the above-described first to third embodiments is adopted as the optical device 10 in an illuminating optical device 170 to be shown here.

Figure 34:
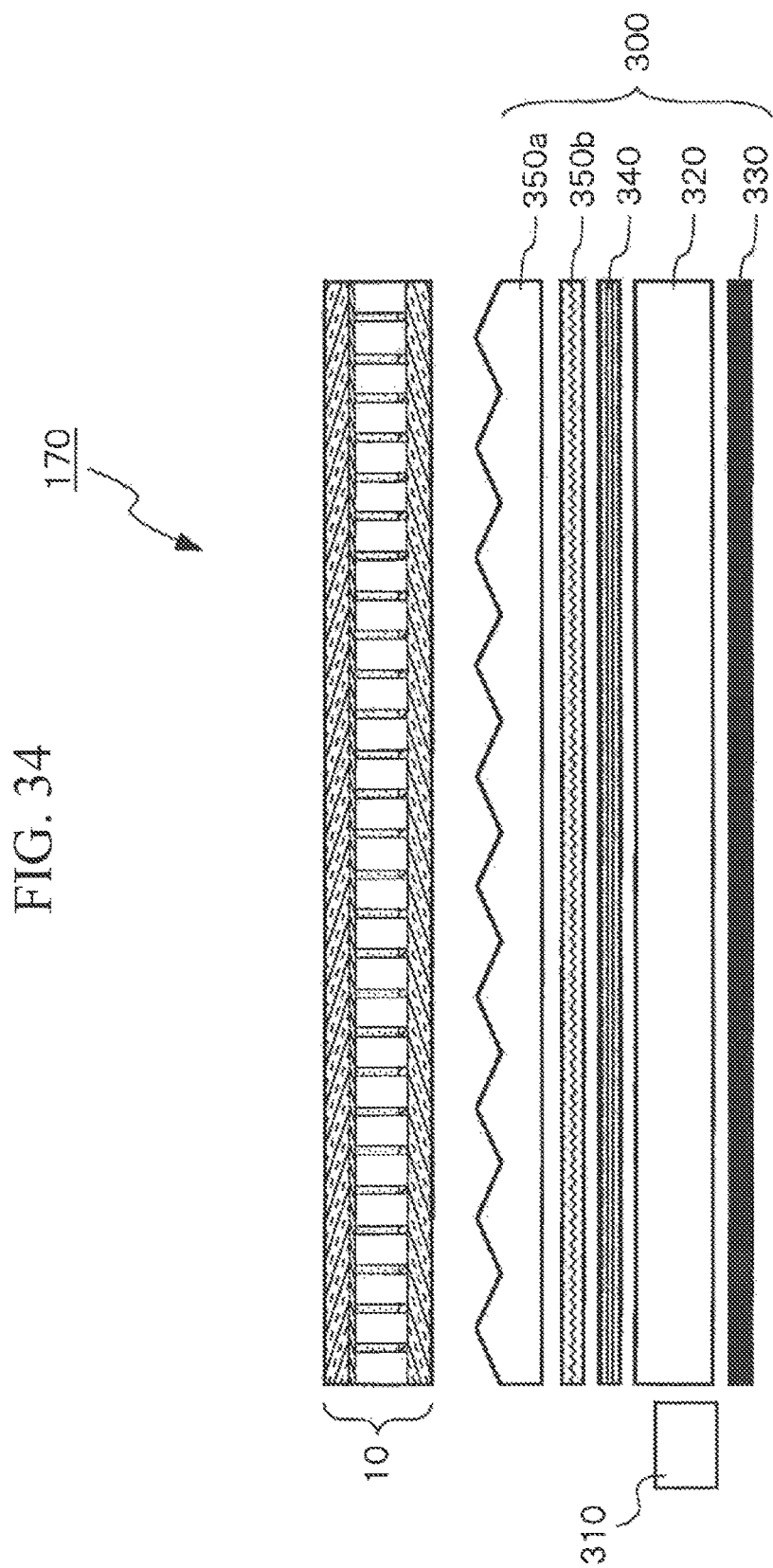
FIG. 34 is a cross-sectional view illustrating the configuration of an illuminating optical device equipped with the optical device disclosed in, for example, FIG. 1 in another embodiment of the present invention.
Figure 36:
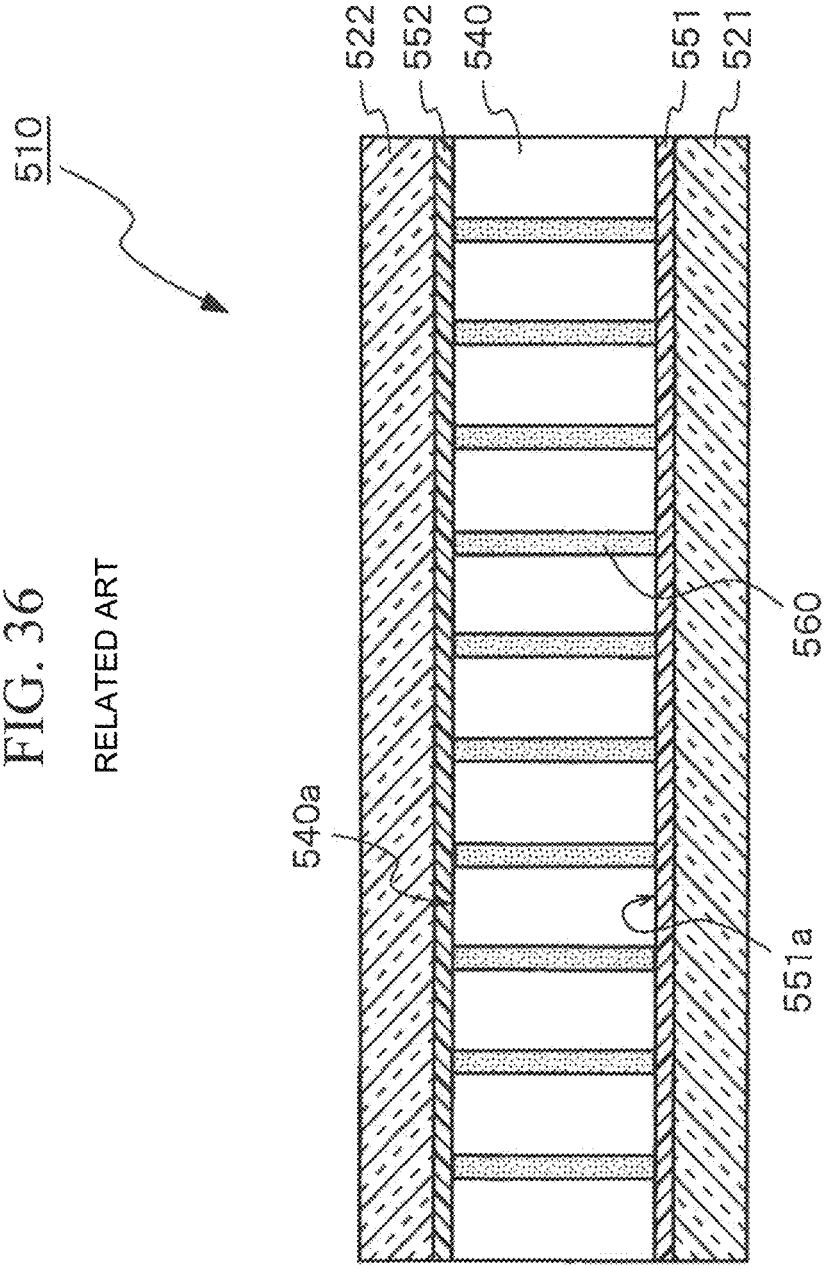
FIG. 36 is a cross-sectional view illustrating, by way of example, an optical device in a related art.
Figure 37:
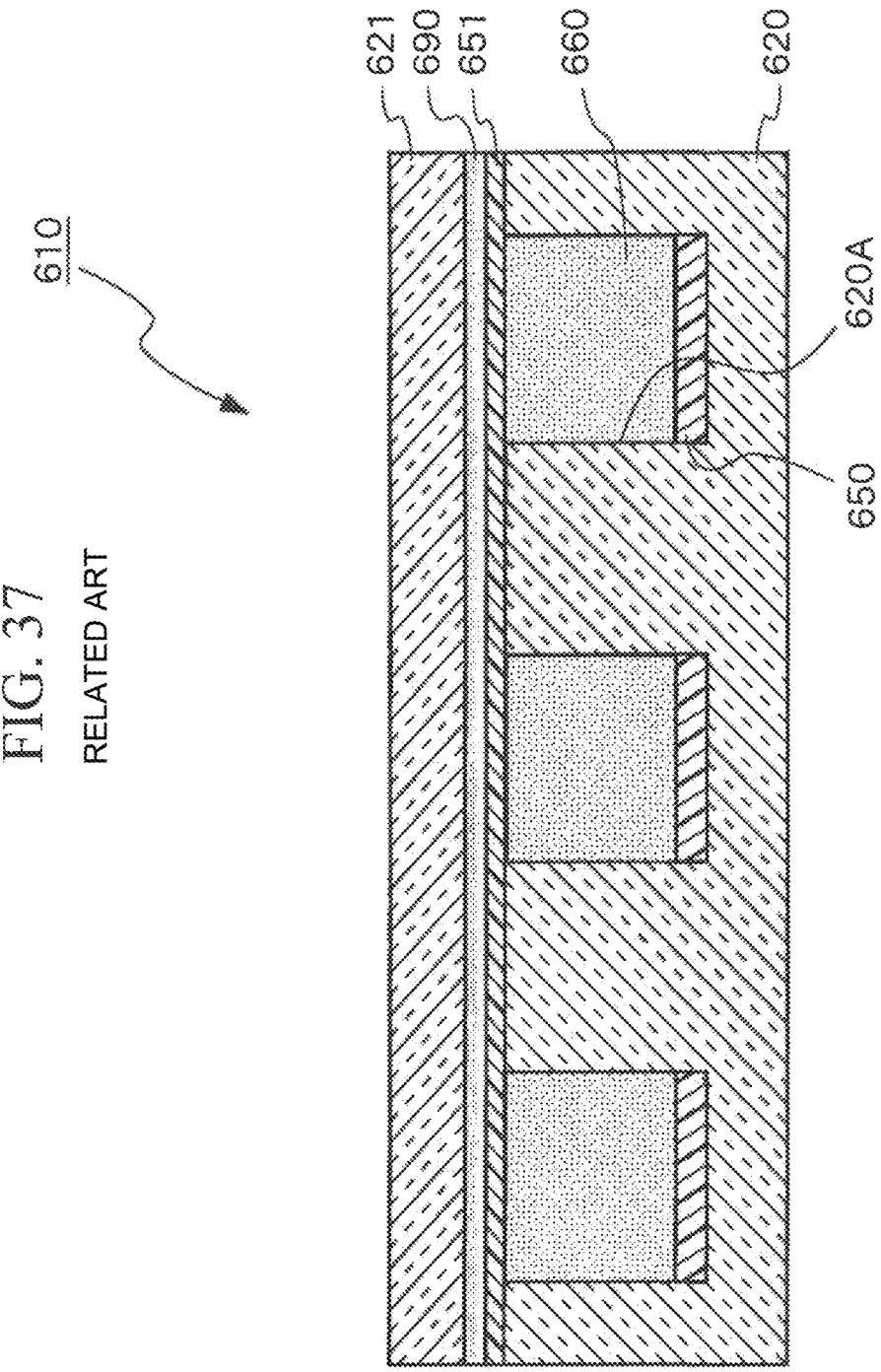
FIG. 37 is a cross-sectional view illustrating electrophoretic display devices in a related art.
Figure 38:
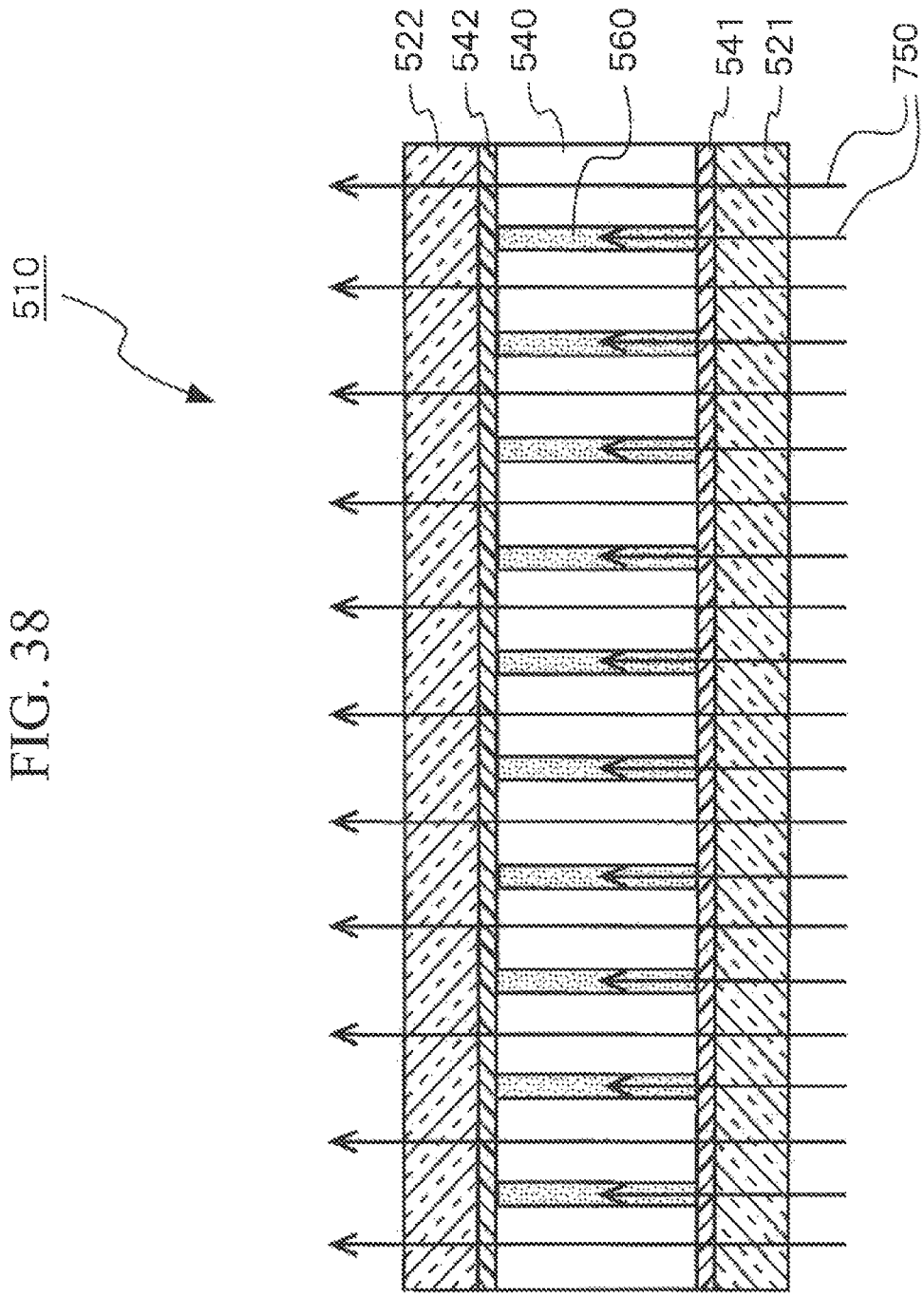
FIG. 38 is a cross-sectional view illustrating trajectories of vertical incident light in the optical device disclosed in FIG. 36.

As illustrated in FIG. 34, the illuminating optical device 170 is composed of a planar light source 300 and an optical device 10. The planar light source 300 includes a light source 310, such as a cold-cathode tube, a light guide plate 320 for uniformly emitting incident light from this light source out of a surface of the plate, a reflection sheet 330 for reflecting light emitted from the back side of this light guide plate 320 in a surface direction, a diffuser panel 340 for diffusing incident light from the light guide plate 320, and first and second prism sheets 350a and 350b for improving the luminance of light input from the light guide plate 320 through this diffuser panel 340, as described above.

The light guide plate 320 composed of acrylic resin or the like is configured so that light input to one end face of the light guide plate 320 from the light source 310 propagates through the interior of the light guide plate 320, and is uniformly emitted out of the surface (predetermined side surface) side of the plate. A reflection sheet 330 for reflecting light emitted from the back side of the light guide plate 320 in the surface direction is provided on the back side. Reflection means (not illustrated) are also provided in the same way as described above on the other end face and the side surfaces of the light guide plate 320.

Light emitted from the surface of the light guide plate 320 enters the optical device 10 through the diffuser panel 340 and the first and second prism sheets 350*a* and 350*b*. Since the luminance of light differs between the left- and right-side ends of the light guide plate 320, the planar light source 300 is configured so that light from the light guide plate 320 is diffused by the diffuser panel 340 and that the luminance of light input from the light guide plate 320 through the diffuser panel 340 is improved by the first and second prism sheets 350*a* and 350*b*.

The above-described illuminating optical device 170 is configured to either focus or not focus light emitted from the planar light source 300 in the front direction of a screen. Consequently, it is possible to select between a wide-angle state of light emission capable of illuminating a wide area and a narrow-angle state of light emission capable of illuminating only the neighborhood of the illuminating optical device 170 immediately thereunder, according to an observer's preferences.

In the present embodiment, a cold-cathode tube is cited as an example of the light source 310 to describe the embodiment. The light source 310 is not limited to this example, however. That is, a white LED, a three-color LED or the like may be used as the light source. A sidelight-type light source is cited as an example of the light source 310 to describe the embodiment (see FIGS. 29 to 32, and 34). The light source 310 is not limited to this example, however. The illuminating optical device 170 may be configured to use a downlight-type light source.

The planar light source 300 is not limited either to the configuration described in the present embodiment. A light source in which light-emitting light sources, such as LED illuminators, organic EL illuminators, inorganic EL illuminators, fluorescent lamps or light bulbs, are planarly laid out may be adopted alternatively.

Note that the above-described respective embodiments are merely preferred specific examples in an optical device, a manufacturing method thereof, and a display device, an electronic device and an illuminating device including the optical device. In addition, various limitations that are technically preferable are placed on the examples in some cases. The technical scope of the present invention is not limited to these illustrative embodiments, however, unless any descriptions that restrict the present invention are given in particular.

This application claims the right of priority based on Japanese Patent Application No. 2014-027430, filed on Jan. 11, 2014, which is hereby incorporated by reference herein in its entirety.

INDUSTRIAL APPLICABILITY

The present invention is widely applicable to liquid crystal display devices, EL displays, plasma displays, FEDs (Field Emission Displays), illuminating optical devices, and the like and capable of effectively controlling the range of emission directions of transmitted light.

REFERENCE SIGNS LIST

10, 11, 12, 13A, 13B, 14, 15 Optical device
11E, 14E, 15E Optical device
21, 22 Transparent substrate
21*a*, 22*a* Principal surface
30 Conductive light shielding pattern
30*a* Surface
35 Electric field-applying means
40 Light transmissive region
40*a* Upper surface
40*b* Side surface
41*a*, 42*a* Light transmissive pattern width
41*b*, 42*b* Light shielding pattern width
50 Transparent conductive film
54, 55 Another transparent conductive film
60 Electrophoretic element
61 Electrophoretic particle
62 Dispersant
70 Photomask
71 Mask pattern
75 Exposure light
80 Protective cover film
90 Adhesive layer
110, 120, 130, 140 Display device
150, 160 Electronic device
170 Illuminating optical device
200 Optical control device (display)
210 Liquid crystal layer
220*a* First substrate
220*b* Second substrate
230 Color filter
240*a* First polarization and retardation plate
240*b* Second polarization and retardation plate
290 Transparent adhesive layer
300 Planar light source
310 Light source
320 Light guide plate
330 Reflection sheet
340 Diffuser panel
350*a* First prism sheet
350*b* Second prism sheet
410, 510, 710, 810 Optical device
421, 422, 521 Transparent substrate
440, 540 Light transmissive region
451, 452, 551 Transparent conductive film
460, 560, 660 Electrophoretic element
522 Another transparent substrate
552 Another transparent conductive film
610 Electrophoretic display device
620 Base material
620A Concave portion
621 Transparent base material
650 Aluminum electrode
651 Transparent electrode
690 Adhesive agent
750 Light (incident light)
780 Reflected light
800 Antireflection pattern
850 External light

The invention claimed is:

1. An optical device comprising:
first and second transparent substrates disposed so that the principal surfaces thereof face each other;
conductive light shielding patterns disposed on the principal surface side of the first transparent substrate;
a transparent conductive film disposed on the principal surface of the second transparent substrate;
a plurality of light transmissive regions disposed on the first transparent substrate; and
an electrophoretic element disposed in gaps between each adjacent light transmissive regions and composed of light shielding electrophoretic particles retaining specific charges and a transmissive dispersant, the optical device being configured such that the dispersion state of the electrophoretic particles is changed by externally adjusting a potential difference between each conductive light shielding pattern and the transparent conductive film, thereby changing the range of outgoing directions of light transmitting through the respective light transmissive regions and the dispersant.

2. The optical device according to claim 1, wherein the light transmissive regions are disposed in positions complementary with the positions of the conductive light shielding patterns.

3. The optical device according to claim 1, configured such that the electrical potential of the conductive light shielding patterns relative to the electrical potential of the transparent conductive film is adjusted so as to be opposite in polarity to the surface charges of the electrophoretic particles, thereby gathering the electrophoretic particles at the nearby the conductive light shielding patterns.

4. The optical device according to claim 1, wherein a protective cover film is formed on the upper surfaces and side surfaces of the light transmissive regions.

5. The optical device according to claim 4, wherein the protective cover film is one of a silicon nitride film, a silicon oxide film, a silicon oxynitride film, a paraxylylene resin, and a methacryl resin.

6. The optical device according to claim 1, wherein a transparent adhesive layer is disposed between the light transmissive regions and the transparent conductive film.

7. The optical device according to claim 1, wherein another transparent conductive film is disposed on the principal surface of the first transparent substrate, and the conductive light shielding patterns are disposed on a surface of the other transparent conductive film.

8. The optical device according to claim 1, wherein another transparent conductive film is disposed on the principal surface of the first transparent substrate on which the conductive light shielding patterns are formed, and the light transmissive regions are disposed on a surface of the other transparent conductive film.

9. The optical device according to claim 1, wherein antireflection patterns are disposed on the surfaces of the conductive light shielding patterns on the principal surface side of the first transparent substrate.

10. A display device comprising:
a display provided with a visual surface for displaying images; and
an optical device according to claim 1 disposed on the visual surface of the display.

11. The display device according to claim 10, wherein the display and the optical device are fixed by a transparent adhesive layer.

12. The display device according to claim 10, wherein the display is one of a liquid crystal display, a plasma display, an inorganic EL display, a field-emission display, a cathode-ray tube, and a fluorescent display tube.

13. An electronic device comprising an electronic device body provided with a display means for displaying images outward, and equipped with a display device according to claim 10 as the display means.

14. A display device comprising:
a liquid crystal display provided with a visual surface for displaying images;
a backlight disposed on the back side of the liquid crystal display to irradiate the liquid crystal display with light; and an optical device according to claim 1 disposed between the liquid crystal display and the backlight.

15. The display device according to claim 14, wherein the liquid crystal display and the optical device are fixed by a transparent adhesive layer.

16. An illuminating device comprising:
an optical device according to claim 1; and
a light source provided on the back side of the first transparent substrate included by the optical device.

17. An optical device comprising:
first and second transparent substrates disposed so that the principal surfaces thereof face each other;
conductive light shielding patterns disposed on the principal surface side of the first transparent substrate;
a transparent conductive film disposed on the principal surface of the second transparent substrate;
a plurality of light transmissive regions disposed on the first transparent substrate;
an electrophoretic element disposed in gaps between each adjacent light transmissive regions and composed of light shielding electrophoretic particles retaining specific charges and a transmissive dispersant; and
an electric field-applying unit configured to apply electric fields, so that the electrical potential of the conductive light shielding patterns relative to the electrical potential of the transparent conductive film is opposite in polarity to the surface charges of the electrophoretic particles.

18. An optical device manufacturing method comprising:
a light shielding pattern formation step of forming conductive light shielding patterns on the principal surface of a first transparent substrate;
a photosensitive resin lamination step of laminating transparent photosensitive resin on the principal surface side of the first transparent substrate on which the conductive light shielding patterns are formed;
an exposure light radiation step of radiating exposure light composed of parallel light parallel to a laminating direction toward the laminated transparent photosensitive resin;
a transmissive region formation step of forming plurally-divided light transmissive regions by performing a development treatment on the transparent photosensitive resin irradiated with the exposure light;
a transparent substrate placement step of placing a second transparent substrate on a surface of which a transparent conductive film is formed, so that the transparent conductive film faces the light transmissive region side; and
an electrophoretic element filling step of filling electrophoretic elements, each of which is a mixture of light shielding electrophoretic particles retaining specific charges and a transmissive dispersant, in gaps present among the light transmissive regions to form a light-absorbing layer,
wherein in the exposure light radiation step, the exposure light is radiated so that at least some of the conductive light shielding patterns are positioned in gaps present among the light transmissive regions.

19. The optical device manufacturing method according to claim 18, wherein the electrophoretic element filling step is carried out in advance of the transparent substrate placement step.

20. The optical device manufacturing method according to claim 18, wherein in the exposure light radiation step, the exposure light is radiated from the side (back side) of the first transparent substrate on the opposite side of the principal surface.

* * * * *